(12) United States Patent
Tsukagoshi

(10) Patent No.: US 9,596,449 B2
(45) Date of Patent: Mar. 14, 2017

(54) TRANSMITTING APPARATUS, TRANSMITTING METHOD, AND RECEIVING APPARATUS

(71) Applicant: Sony Corporation, Tokyo (JP)

(72) Inventor: Ikuo Tsukagoshi, Tokyo (JP)

(73) Assignee: Sony Corporation (JP)

( * ) Notice: Subject to any disclaimer, the term of this patent is extended or adjusted under 35 U.S.C. 154(b) by 265 days.

(21) Appl. No.: 14/110,512

(22) PCT Filed: Jan. 17, 2013

(86) PCT No.: PCT/JP2013/050723
§ 371 (c)(1),
(2) Date: Oct. 8, 2013

(87) PCT Pub. No.: WO2013/121823
PCT Pub. Date: Aug. 22, 2013

(65) Prior Publication Data
US 2014/0028798 A1    Jan. 30, 2014

(30) Foreign Application Priority Data

Feb. 16, 2012  (JP) .................. 2012-032215
Feb. 21, 2012  (JP) .................. 2012-035684

(51) Int. Cl.
*H04N 13/00* (2006.01)
*H04N 19/597* (2014.01)
(Continued)

(52) U.S. Cl.
CPC ....... *H04N 13/0059* (2013.01); *H04N 13/007* (2013.01); *H04N 13/0022* (2013.01);
(Continued)

(58) Field of Classification Search
CPC .................. H04N 19/597; H04N 19/70
(Continued)

(56) References Cited

U.S. PATENT DOCUMENTS 5,625,408 A * 4/1997 Matsugu ............... G06T 7/0022
                                                   348/231.6
6,402,172 B1   6/2002 Suzuki
(Continued)

FOREIGN PATENT DOCUMENTS

EP   2247116 A2   11/2010
JP   63-65574 U    4/1988
(Continued)

OTHER PUBLICATIONS

JPH10191394 Translation.*
(Continued)

*Primary Examiner* — Jamie Atala
*Assistant Examiner* — Nguyen Truong
(74) *Attorney, Agent, or Firm* — Lerner, David, Littenberg, Krumholz & Mentlik, LLP

(57) ABSTRACT

First disparity information (disparity information corresponding to the nearest object reproduction position in a certain area of a picture display screen) and second disparity information (disparity information corresponding to the farthest object reproduction position in the certain area of the picture display screen) which are obtained for each of certain pictures of image data are inserted into a video stream, and the video stream is transmitted. On the basis of the first disparity information and the second disparity information, a receiving side is capable of checking whether or not disparity angles in a same-side direction and a crossing direction are within a certain range in which viewing does not cause any health problems, and reconfiguring left-eye image data and right-eye image data which form a stereo image if necessary.

14 Claims, 75 Drawing Sheets

(51) Int. Cl.
*H04N 19/70* (2014.01)
*H04N 19/46* (2014.01)

(52) U.S. Cl.
CPC ..... *H04N 13/0048* (2013.01); *H04N 13/0066* (2013.01); *H04N 19/46* (2014.11); *H04N 19/597* (2014.11); *H04N 19/70* (2014.11)

(58) Field of Classification Search
USPC .......................................................... 348/43
See application file for complete search history.

(56) References Cited

U.S. PATENT DOCUMENTS

| | | | |
|---|---|---|---|
| 7,475,754 | B2 | 1/2009 | Misaki et al. |
| 2011/0149034 | A1 | 6/2011 | Tsukagoshi |
| 2011/0273532 | A1* | 11/2011 | Kitazato .............. H04N 13/004 348/43 |
| 2012/0120200 | A1* | 5/2012 | Newton .............. H04N 13/0003 348/46 |
| 2013/0100247 | A1* | 4/2013 | Tsukagoshi ........ H04N 13/0059 348/43 |

FOREIGN PATENT DOCUMENTS

| | | | |
|---|---|---|---|
| JP | 7015748 | | 1/1995 |
| JP | 8-133125 A | | 5/1996 |
| JP | 8-142908 A | | 6/1996 |
| JP | 10191394 | | 7/1998 |
| JP | H10191394 | * | 7/1998 |
| JP | 2001-088736 A | | 4/2001 |
| JP | 2004274732 A | | 9/2004 |
| JP | 2005-006114 A | | 1/2005 |
| JP | 2005-094168 A | | 4/2005 |
| JP | 2005094168 | * | 4/2005 |
| JP | 2007-261460 A | | 10/2007 |
| JP | 2008-018901 A | | 1/2008 |
| JP | 2008-174179 A | | 7/2008 |
| JP | 2008-290539 A | | 12/2008 |
| JP | 2004274732 | * | 1/2010 |
| JP | 2010-064637 A | | 3/2010 |
| JP | 2011223481 | * | 4/2010 |
| JP | 2010278743 A | | 12/2010 |
| JP | 2011-166757 A | | 8/2011 |
| JP | 2011155431 | * | 8/2011 |
| JP | 2011155431 A | | 8/2011 |
| JP | 2011211754 | * | 10/2011 |
| JP | 2011211754 A | | 10/2011 |
| JP | 2011-239169 A | | 11/2011 |
| JP | 2012010032 A | | 1/2012 |
| WO | 2008038205 A2 | | 4/2008 |
| WO | 2011013030 A1 | | 2/2011 |
| WO | 2011129242 A1 | | 10/2011 |

OTHER PUBLICATIONS

JP2011155431 Translation.*
JP2004274732 Translation.*
JP2011211754 Translation.*
JP2005094168 Translation.*
JP2011223481 Translation.*
Extended European Search Report for EP Application No. 13748981.1, dated Jun. 22, 2015.
Tudor, P.N., MPEG-2 Video Compression, Electronics & Communication Engineering Journal, 1995.
Flier, M, et al., Multiview Video Compression, IEEE Signal Processing Magazine, 2007.
Choi, J, et al., 2D-Plus-Depth Based Resolution and Frame-rate Up-conversion Technique for Depth Video, IEEE, 2010.
Morvan, Y, Acquisition, Compression and Rendering of Depth Texture for Multi-View Video, Eindhoven University of Technology Library, 2009.
Microfilm of the Specification and Drawings annexed to the request of Japanese utility model Application No. 159336/1986 (Laid-Open #65574/1988) (Toyota Corp.), Apr. 30, 1988 (Apr. 30, 1988), fig. 1 to 3.
Japanese Office Action for Application No. 2013-542274 dated Apr. 26, 2016.
Chinese Office Action for CN Application No. 201380001556.6, dated Nov. 18, 2015.
Japanese Office Action for Application No. 2013542274 dated Sep. 27, 2016.

* cited by examiner

DOWNSIZING PROCESS

DETAILED EXAMPLE OF PARTITIONING PICTURE DISPLAY SCREEN

AVC video descriptor

| Syntax | No. of bits | Mnemonic |
|---|---|---|
| AVC_video_descriptor() { | | |
| descriptor_tag | 8 | uimsbf |
| descriptor_length | 8 | uimsbf |
| profile_idc | 8 | uimsbf |
| constraint_set0_flag | 1 | bslbf |
| constraint_set1_flag | 1 | bslbf |
| constraint_set2_flag | 1 | bslbf |
| constraint_set3_flag | 1 | bslbf |
| constraint_set4_flag | 1 | bslbf |
| constraint_set5_flag | 1 | bslbf |
| AVC_compatible_flags | 2 | bslbf |
| level_idc | 8 | uimsbf |
| AVC_still_present | 1 | bslbf |
| AVC_24_hour_picture_flag | 1 | bslbf |
| Frame_Packing_SEI_not_present_flag | 1 | bslbf |
| depth_info_not_existed_flag | 1 | bslbf |
| reserved | 4 | bslbf |
| } | | |

(b)

Semantics depth_info_not_existed_flag (1)
 Indicating if depth information is existed in video stream.
  '0'    depth information is encoded in the corresponding video stream.
  '1'    depth information is not encoded in the corresponding video stream.

MVC extension descriptor

| Syntax | No. Of bits | Mnemonic |
|---|---|---|
| MVC_extension_descriptor() { | | |
|   descriptor_tag | 8 | uimsbf |
|   descriptor_length | 8 | uimsbf |
|   average_bit_rate | 16 | uimsbf |
|   maximum_bitrate | 16 | uimsbf |
|   reserved | 4 | bslbf |
|   view_order_index_start | 10 | bslbf |
|   view_order_index_end | 10 | bslbf |
|   temporal_id_start | 3 | bslbf |
|   temporal_id_end | 3 | bslbf |
|   no_sei_nal_unit_present | 1 | bslbf |
|   depth_info_not_existed_flag | 1 | bslbf |
| } | | |

(b)

Semantics
depth_info_not_existed_flag (1)
  Indicating if depth information is existed in video stream.
  '0'    depth information is encoded in the corresponding video stream.
  '1'    depth information is not encoded in the corresponding video stream.

FIG. 12 depth_info descriptor (a)

| Syntax | No. of Bits | Format |
|---|---|---|
| depth_info descriptor() { | | |
| descriptor_tag | 8 | uimslbf |
| descriptor_length | 8 | uimslbf |
| depth_info_not_existed_flag | 1 | bslbf |
| reserved | 7 | '0x7f' |
| } | | |

(b)

depth_info_not_existed_flag (1)
  Indicating if depth information is existed in video stream.
  '0'    depth information is encoded in the corresponding video stream.
  '1'    depth information is not encoded in the corresponding video stream.

| Syntax | No. of Bits | Format |
|---|---|---|
| user_data_unregistered (size){ | | |
| uuid_iso_iec_11578 | 128 | uimsbf |
| for( i = 16; i < payloadSize; i++ ) | | |
| user_data_payload_byte | 8 | bslbf |
| } | | |

(b)

| Syntax | No. of Bits | Format |
|---|---|---|
| depth_information_sei_data (){ | | |
| userdata_id | 16 | uimsbf |
| depth_information_sei_length | 8 | bslbf |
| depth_information_sei () | | |
| } | | |

FIG. 15

| Syntax | No. of Bits | Format |
|---|---|---|
| depth_information_sei() { | | |
| partition_type | 3 | bslbf |
| reserved | 1 | 1 |
| partition_count | 4 | bslbf |
| max_disparity_in_picture | 8 | tcimsbf |
| for ( partition = 0 ; partition < partition_count ; partition++) { | | |
| min_disparity_in_partition | 8 | tcimsbf |
| } | | |
| } | | |

FIG. 16

| Syntax | No. of Bits | Format |
|---|---|---|
| depth_information_sei() { | | |
|   partition_type | 3 | bslbf |
|   reserved | 1 | 1 |
|   partition_count | 4 | bslbf |
|   for ( partition = 0 ; partition < partition_count ; partition++) { | | |
|     max_disparity_in_partition | 8 | tcimsbf |
|     min_disparity_in_partition | 8 | tcimsbf |
|   } | | |
| } | | |

FIG. 17

| Syntax | No. of Bits | Format |
|---|---|---|
| depth_information_sei () { | | |
| partition_type | 3 | bslbf |
| reserved | 5 | 0x1f |
| min_partition_count | 4 | bslbf |
| max_partition_count | 4 | bslbf |
| for ( partition = 0 ; partition < min_partition_count ; partition++) { | | |
| min_disparity_in_partition | 8 | tcimsbf |
| } | | |
| for ( partition = 0 ; partition < max_partition_count ; partition++) { | | |
| max_disparity_in_partition | 8 | tcimsbf |
| } | | |
| } | | |

FIG. 18

```
picture_count_for_skipping    unsigned variable
           INDICATES THE NUMBER OF pictures UP TO PRECEDING REFERENCED picture.
partition_type  (3)
           INDICATES THE PARTITION TYPE OF SCREEN.
           '000'     NOT PARTITIONED
           '001'     PARTITIONED INTO TWO EQUAL AREAS IN EACH OF HORIZONTAL AND VERTICAL DIRECTIONS.
           '010'     PARTITIONED INTO FOUR EQUAL AREAS IN EACH OF HORIZONTAL AND VERTICAL DIRECTIONS.
           Others    reserved
partition_enabled_flag (1)
           INDICATES WHETHER THE SCREEN IS PARTITIONED.
           '1'       PARTITIONED.
           '0'       NOT PARTITIONED.
Intra_disparity_flag (1)
           INDICATES WHETHER THE VALUE OF disparity IS A NON-PREDICTION VALUE.
           '1'       NON-PREDICTION VALUE.
           '0'       PREDICTION VALUE.
partition_count (4)
           THE TOTAL NUMBER OF PARTITIONED AREAS. THE VALUE DEPENDENT ON Partition_type.
picture_count (6)
           INDICATES THE NUMBER OF pictures IN THE CASE OF COLLECTIVELY ENCODING A PLURALITY OF pictures.
max_disparity_in_picture  (8) or  signed variable
           THE MAXIMUM disparity VALUE IN THE ENTIRE picture.
max_disparity_in_partition  (8) or  signed variable
           THE MAXIMUM disparity VALUE IN EACH PARTITIONED AREA.
min_disparity_in_partition  (8) or  signed variable
           THE MINIMUM disparity VALUE IN EACH PARTITIONED AREA.
```

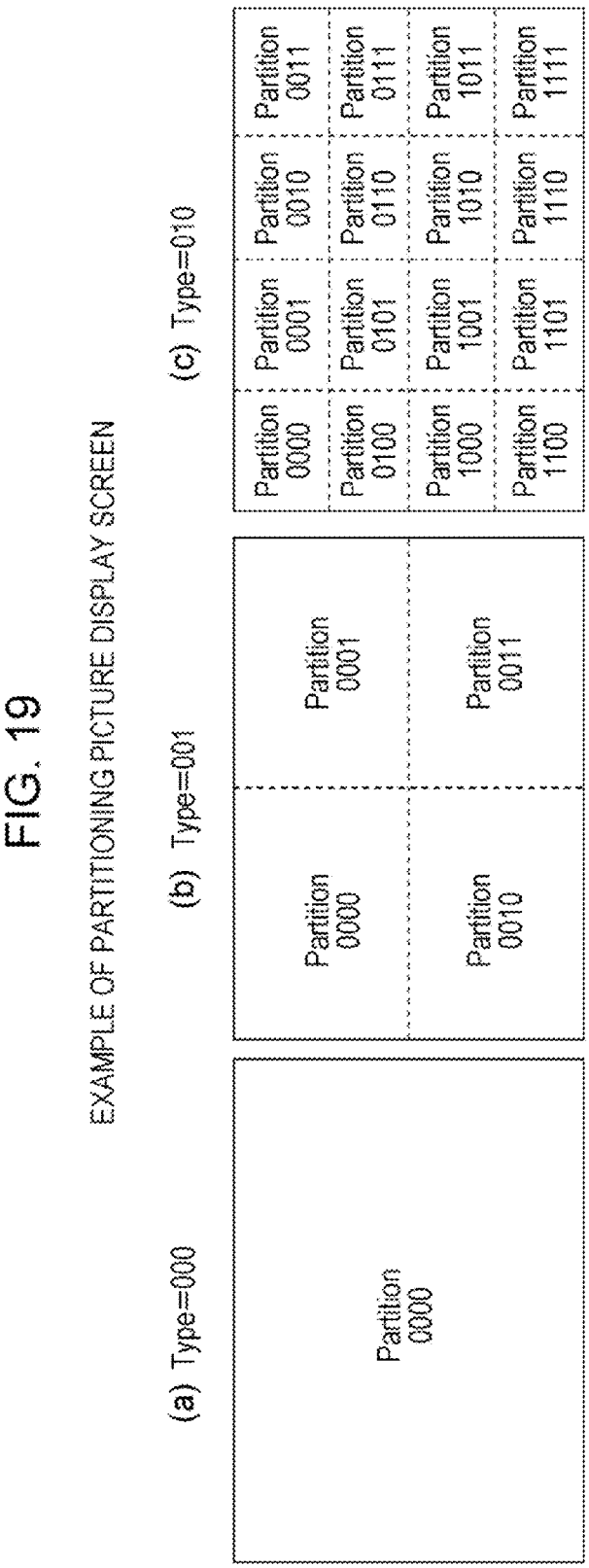

FIG. 20

| Syntax | No. of Bits | Format |
|---|---|---|
| depth_information_sei () { | | |
|   partition_type | 3 | bslbf |
|   reserved | 7 | 0x7f |
|   picture_count | 6 | bslbf |
|   for (picture = 0 ; picture < picture_count ; picture++){ | | |
|     max_disparity_in_picture | 8 | tcimsbf |
|     partition_count | 4 | bslbf |
|     reserved | 4 | 0xf |
|     for ( partition = 0 ;  partition < partition_count ; partition++) { | | |
|       min_disparity_in_partition | 8 | tcimsbf |
|     } | | |
|   } | | |
| } | | |

FIG. 21

| Syntax | No. of Bits | Format |
|---|---|---|
| depth_information_sei() { | | |
|   partition_type | 3 | bslbf |
|   reserved | 7 | 0x7f |
|   picture_count | 6 | bslbf |
|   for (picture = 0 ; picture < picture_count ; picture++){ | | |
|     partition_count | 4 | bslbf |
|     reserved | 4 | 0xf |
|     for ( partition = 0 ; partition < partition_count ; partition++) { | | |
|       max_disparity_in_partition | 8 | tcimsbf |
|       min_disparity_in_partition | 8 | tcimsbf |
|     } | | |
|   } | | |
| } | | |

FIG. 22

| Syntax | No. of Bits | Format |
|---|---|---|
| depth_information_sei() { | | |
|   partition_type | 3 | bslbf |
|   reserved | 7 | 0x7f |
|   picture_count | 6 | bslbf |
|   for ( picture = 0 ; picture < picture_count ; picture++ ){ | | |
|     min_partition_count | 4 | bslbf |
|     max_partition_count | 4 | bslbf |
|     for ( partition = 0 ; partition < min_partition_count ; partition++) { | | |
|       min_disparity_in_partition | 8 | tcimsbf |
|     } | | |
|     for ( partition = 0 ; partition < max_partition_count ; partition++) { | | |
|       max_disparity_in_partition | 8 | tcimsbf |
|     } | | |
|   } | | |
| } | | |

FIG. 23

```
user_data() {
    user_data_start_code                                        32
    depth_information_sei_data_identifier                       32
    while( nextbits() != '0000 0000 0000 0000 0000 0000 0000 0001' ) {
        depth_information_sei_data()
    }
    next_start_code()
}
```

(a)

| Syntax | No. of Bits | Identifier |
|---|---|---|
| depth_information_sei_data() { | | |
| depth_information_sei_Length | 8 | uimsbf |
| depth_information_sei () | | |
| } | | |

(b)

Exp-Golomb CODE se(v) (WITH POSITIVE/NEGATIVE SIGN)

| EXAMPLES OF VARIABLE-LENGTH CODE | VALUE |
|---|---|
| 1 | 0 |
| 0 1 x0 | 1, -1 |
| 0 0 1 x1 x0 | 2, -2, 3, -3 |
| 0 0 0 1 x2 x1 x0 | 4, -4, .., 7, -7 |
| 0 0 0 0 1 x3 x2 x1 x0 | 8, -8, .., 15, -15 |
| 0 0 0 0 0 1 x4 x3 x2 x1 x0 | 16, -16, .., 31, -31 |
| ... | ... |

'010'   REPRESENTS A VALUE 1, AND
'011'   REPRESENTS A VALUE -1.

FIG. 27  Non-Prediction Type (a) Picture Type in Display Order

| Video Slice | B | B | I | B | B | P | B | B | P | I |
|---|---|---|---|---|---|---|---|---|---|---|
|  | -2 | -1 | 0 | 1 | 2 | 3 | 4 | 5 | 6 | 7 |
|  | ← | ← | ← | ← | ← | ← | ← | ← | ← | ← |
| SEI | SEI | SEI | SEI | SEI | SEI | SEI | SEI | SEI | SEI | SEI |
|  | -2 | -1 | 0 | 1 | 2 | 3 | 4 | 5 | 6 | 7 |

(b) SEI non-prediction in Decoding Order

| Video Slice | I | B | B | P | B | B | P | B | B | I |
|---|---|---|---|---|---|---|---|---|---|---|
|  | 0 | -2 | -1 | 3 | 1 | 2 | 6 | 4 | 5 | 7 |
|  | Intra | Intra | Intra | Intra | Intra | Intra | Intra | Intra | Intra | Intra |
| SEI | SEI | SEI | SEI | SEI | SEI | SEI | SEI | SEI | SEI | SEI |
|  | 0 | -2 | -1 | 3 | 1 | 2 | 6 | 4 | 5 | 7 |

FIG. 28

Prediction Type 0

(a) Picture Type in Display Order

| Video Slice | B  | B  | I | B | B | P | B | B | B | P | I |
|---|---|---|---|---|---|---|---|---|---|---|---|
|     | -2 | -1 | 0 | 1 | 2 | 3 | 4 | 5 | 6 | 7 |

| SEI | SEI | SEI | SEI | SEI | SEI | SEI | SEI | SEI | SEI |
|---|---|---|---|---|---|---|---|---|---|
| -2 | -1 | 0 | 1 | 2 | 3 | 4 | 5 | 6 | 7 |

(b) SEI Prediction in Decoding Order

| Video Slice | I | B  | B  | P | B | P | B | B | B | I |
|---|---|---|---|---|---|---|---|---|---|---|---|
|     | 0 | -2 | -1 | 3 | 1 | 2 | 6 | 4 | 5 | 7 |

| SEI | Intra | Delta | Delta | Delta | Delta | Delta | Delta | Delta | Delta | Intra |
|---|---|---|---|---|---|---|---|---|---|---|
|     | SEI | SEI | SEI | SEI | SEI | SEI | SEI | SEI | SEI | SEI |
|     | 0 | -2 | -1 | 3 | 1 | 2 | 6 | 4 | 5 | 7 |

FIG. 29   Prediction Type 1

(a) Picture Type in Display Order

| Video Slice | B | B | I | B | B | P | B | B | P | I |
|---|---|---|---|---|---|---|---|---|---|---|
| | -2 | -1 | 0 | 1 | 2 | 3 | 4 | 5 | 6 | 7 |
| SEI | SEI | SEI | SEI | SEI | SEI | SEI | SEI | SEI | SEI | SEI |
| | -2 | -1 | 0 | 1 | 2 | 3 | 4 | 5 | 6 | 7 |

(b) SEI Prediction in Decoding Order

| Video Slice | I | B | B | P | B | B | P | B | B | I |
|---|---|---|---|---|---|---|---|---|---|---|
| | 0 | -2 | -1 | 3 | 1 | 2 | 6 | 4 | 5 | 7 |
| SEI | SEI Intra | SEI Delta | SEI Delta | SEI Delta | SEI Delta | SEI Delta | SEI Delta | SEI Delta | SEI Delta | SEI Intra |
| | 0 | -2 | -1 | 3 | 1 | 2 | 6 | 4 | 5 | 7 |

FIG. 30

Prediction Type 2

(a) Picture Type in Display Order

| Video Slice | B  | B  | I | B | B | P | B | B | B | P | I |
|---|---|---|---|---|---|---|---|---|---|---|---|
|   | -2 | -1 | 0 | 1 | 2 | 3 | 4 | 5 | 6 | 7 |   |

| SEI | SEI | SEI | SEI | SEI | SEI | SEI | SEI | SEI | SEI | SEI |
|---|---|---|---|---|---|---|---|---|---|---|
|   | -2 | -1 | 0 | 1 | 2 | 3 | 4 | 5 | 6 | 7 |

(b) SEI Prediction in Decoding Order

| Video Slice | I | B  | B  | P | B | B | P | B | B | B | I |
|---|---|---|---|---|---|---|---|---|---|---|---|
|   | 0 | -2 | -1 | 3 | 1 | 2 | 6 | 4 | 5 | 7 |   |

| SEI | Intra | Delta | Delta | Delta | Delta | Delta | Delta | Delta | Delta | Delta | Intra |
|---|---|---|---|---|---|---|---|---|---|---|---|
|   | SEI | SEI | SEI | SEI | SEI | SEI | SEI | SEI | SEI | SEI | SEI |
|   | 0 | -2 | -1 | 3 | 1 | 2 | 6 | 4 | 5 | 7 |   |

FIG. 31

Prediction Type 3

(a) Picture Type in Display Order

| Video Slice | B  | B  | I | B | B | P | B | B | P | I |
|---|---|---|---|---|---|---|---|---|---|---|
|             | -2 | -1 | 0 | 1 | 2 | 3 | 4 | 5 | 6 | 7 |

SEI: SEI 0, SEI 3, SEI 6, SEI 7

Disparity Interpolation (for positions -2, -1, 1, 2, 4, 5)

(b) SEI Prediction in Decoding Order

| Video Slice | I | B  | B  | P | B | B | P | B | B | I |
|---|---|---|---|---|---|---|---|---|---|---|
|             | 0 | -2 | -1 | 3 | 1 | 2 | 6 | 4 | 5 | 7 |

SEI: Intra SEI 0, Delta SEI 3, Delta SEI 6, Intra SEI 7

FIG. 32

| Syntax | No. of Bits | Format |
|---|---|---|
| depth_information_sei () { | | |
|   partition_type | 3 | bslbf |
|   reserved | 1 | 1 |
|   partition_count | 4 | bslbf |
|   max_disparity_in_picture | | se(v) |
|   for ( partition = 0 ; partition < partition_count ; partition++ ) { | | |
|     min_disparity_in_partition | | se(v) |
|   } | | |
| } | | |

FIG. 33

| Syntax | No. of Bits | Format |
|---|---|---|
| depth_information_sei () { | | |
|   partition_type | 3 | bslbf |
|   reserved | 1 | |
|   partition_count | 4 | bslbf |
|   for ( partition = 0 ; partition < partition_count ; partition++) { | | |
|     max_disparity_in_partition | | se(v) |
|     min_disparity_in_partition | | se(v) |
|   } | | |
| } | | |

FIG. 34

| Syntax | No. of Bits | Format |
|---|---|---|
| depth_information_sei() { | | |
|   partition_type | 3 | bslbf |
|   reserved | 5 | 0x1f |
|   min_partition_count | 4 | bslbf |
|   max_partition_count | 4 | bslbf |
|   for ( partition = 0 ; partition < min_partition_count ; partition++) { | | |
|     min_disparity_in_partition | | se(v) |
|   } | | |
|   for ( partition = 0 ; partition < max_partition_count ; partition++) { | | |
|     max_disparity_in_partition | | se(v) |
|   } | | |
| } | | |

FIG. 35

| Syntax | No. of Bits | Format |
|---|---|---|
| depth_information_sei () { | | |
|   partition_type | 3 | bslbf |
|   reserved | 7 | 0x7f |
|   picture_count | 6 | bslbf |
|   for (picture = 0 ; picture < picture_count ; picture++){ | | |
|     max_disparity_in_picture | | se(v) |
|     partition_count | 4 | bslbf |
|     reserved | 4 | 0xf |
|     for ( partition = 0 ; partition < partition_count ; partition++) { | | |
|       min_disparity_in_partition | | se(v) |
|     } | | |
|   } | | |
| } | | |

FIG. 36

| Syntax | No. of Bits | Format |
|---|---|---|
| depth_information_sei() { | | |
|   partition_type | 3 | bslbf |
|   reserved | 7 | 0x7f |
|   picture_count | 6 | bslbf |
|   for (picture = 0 ; picture < picture_count ; picture++){ | | |
|     partition_count | 4 | bslbf |
|     reserved | 4 | 0xf |
|     for ( partition = 0 ; partition < partition_count ; partition++) { | | |
|       max_disparity_in_partition | | se(v) |
|       min_disparity_in_partition | | se(v) |
|     } | | |
|   } | | |
| } | | |

FIG. 37

| Syntax | No. of Bits | Format |
|---|---|---|
| depth_information_sei() { | | |
|   partition_type | 3 | bslbf |
|   reserved | 7 | 0x7f |
|   picture_count | 6 | bslbf |
|   for (picture = 0 ; picture < picture_count ; picture++){ | | |
|     min_partition_count | 4 | bslbf |
|     max_partition_count | 4 | bslbf |
|     for ( partition = 0 ; partition < min_partition_count ; partition++) { | | |
|       min_disparity_in_partition | | se(v) |
|     } | | |
|     for ( partition = 0 ; partition < max_partition_count ; partition++) { | | |
|       max_disparity_in_partition | | se(v) |
|     } | | |
|   } | | |
| } | | |

FIG. 38

| Syntax | No. of Bits | Format |
|---|---|---|
| depth_information_sei () { | | |
|    picture_count_for_skipping | | ue(v) |
|    partition_enabled_flag | 1 | bslbf |
|    reserved | 2 | 11 |
|    Intra_disparity_flag | 1 | bslbf |
|    partition_count | 4 | bslbf |
|    max_disparity_in_picture | | se(v) |
|    for ( partition = 0 ; partition < partition_count ; partition++) { | | |
|       min_disparity_in_partition | | se(v) |
|    } | | |
| } | | |

FIG. 39

Exp-Golomb CODE ue(v) (WITHOUT POSITIVE/NEGATIVE SIGN)

| EXAMPLES OF VARIABLE-LENGTH CODE | VALUE |
|---|---|
| 1 | 0 |
| 0 1 x0 | 1..2 |
| 0 0 1 x1 x0 | 3..6 |
| 0 0 0 1 x2 x1 x0 | 7..14 |
| 0 0 0 0 1 x3 x2 x1 x0 | 15..30 |
| 0 0 0 0 0 1 x4 x3 x2 x1 x0 | 31..62 |
| ... | ... |

'010'   REPRESENTS A VALUE 1, AND
'011'   REPRESENTS A VALUE 2.

FIG. 40

| Syntax | No. of Bits | Format |
|---|---|---|
| depth_information_sei () { | | |
| picture_count_for_skipping | | ue(v) |
| partition_type | 3 | bslbf |
| intra_disparity_flag | 1 | bslbf |
| partition_count | 4 | bslbf |
| max_disparity_in_picture | | se(v) |
| for ( partition = 0 ; partition < partition_count ; partition++) { | | |
| min_disparity_in_partition | | se(v) |
| } | | |
| } | | |

FIG. 60

HDMI PIN ARRAY (IN CASE OF Type-A)

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Utility/HEAC+ |
| 15 | SCL | 16 | SDA |
| 17 | DDC/CEC Ground /HEAC Shield | 18 | +5V Power |
| 19 | Hot Plug Detect/HEAC− | | |

FIG. 61

Vendor Specific InfoFrame

| Packet Byte # | 7 | 6 | 5 | 4 | 3 | 2 | 1 | 0 |
|---|---|---|---|---|---|---|---|---|
| PB0 | Checksum | | | | | | | |
| PB1 | 24bits IEEE Registration Identifier (0x000C03) | | | | | | | |
| PB2 | (least significant byte first) | | | | | | | |
| PB3 | | | | | | | | |
| PB4 | HDMI_Video_Format | | | Rsvd (0) | Rsvd (0) | Rsvd (0) | Rsvd (0) | Rsvd (0) |
| PB5 | 3D_Structure(4bits) | | | | Reserved(0) | | | |
| PB6 | 3D_ext_data(4bits) | | | | 3D_Meta _present | Rsvd (0) | Rsvd (0) | Rsvd (0) |
| PB7 | 3D_Metadata_type(3bits) | | | 3D_Metadata_length(5bits) | | | | |
| PB8 | partition_type (3bits) | | | d_picture (1bit) | partition_count (4bits) | | | |
| PB8+1 | Max_disparity_in_picture (8bits) | | | | | | | |
| PB8+2 | disparity_in_partition 0000 (8bits) | | | | | | | |
| PB8+3 | disparity_in_partition 0001 (8bits) | | | | | | | |
| ... | ... | | | | | | | |

FIG. 62

PRTY (1bit)   INDICATES WHETHER INFORMATION TO BE REFERRED TO BY HDMI sink SIDE IS INCLUDED.
              '1'  INFORMATION TO BE REFERRED TO BY Sink IS ABSOLUTELY INCLUDED.
              '0'  OTHER THAN THE ABOVE. THAT IS, INFORMATION TO BE
                   REFERRED TO BY Sink IS NOT NECESSARILY INCLUDED.

3D_Metadata_type (3bits)   INDICATES THE TYPE OF 3D Meta INFORMATION.
              "001"  INDICATES partitioned disparity information.

3D_Metadata_length (5bits)  INDICATES THE SIZE OF partitioned disparity information.
              THE VALUE OF 3D_Metadata_length RANGES FROM 0x0 TO 0x1F, AND THE VALUE
              OBTAINED BY ADDING 2 TO THE VALUE REPRESENTS THE SIZE OF ENTIRE partitioned disparity information
              AFTER THIS FIELD.
              '00000'  IS 2 (IN DECIMAL NUMBER)
              '11111'  IS 33 (IN DECIMAL NUMBER)

partition_type (3bits)  INDICATES THE partition_type OF TARGET picture.
              '000'  NOT PARTITIONED
              '001'  PARTITIONED INTO TWO EQUAL AREAS IN EACH OF HORIZONTAL AND VERTICAL DIRECTIONS.
              '010'  PARTITIONED INTO FOUR EQUAL AREAS IN EACH OF HORIZONTAL AND VERTICAL DIRECTIONS.
              Others  reserved d_picture (double_picture) (1bit)   REPRESENTS SINGLE PICTURE OR DOUBLE PICTURE.
              '0'  partition disparity FOR SINGLE PICTURE IS TRANSMITTED.
              '1'  partition disparity FOR DOUBLE PICTURE (TWO pictures) IS TRANSMITTED.

partition_count (4bits)   THE TOTAL NUMBER OF PARTITIONED AREAS. THE VALUE DEPENDENT ON Partition_type.
              '0000'  IS 1
              '1111'  IS 16 max_disparity_in_picture (8bits)   THE MAXIMUM disparity VALUE OF THE ENTIRE picture.

disparity_in_partition (8bits)   THE MINIMUM disparity VALUE IN EACH PARTITIONED AREA.

FIG. 63

Vendor Specific InfoFrame

| Packet Byte # | 7 | 6 | 5 | 4 | 3 | 2 | 1 | 0 |
|---|---|---|---|---|---|---|---|---|
| ... | | | | | | | | |
| PB7 | 3D_Metadata_type(3bits) = 010 | | | | 3D_Metadata_length = 01111 | | | |
| PB8 | partition_type = 010 | | | D_picture = 0 | Partition_count = 1111 | | | |
| PB8+1 | Max_disparity_in_picture (8bits) | | | | | | | |
| PB8+2 | disparity_in_partition 0000 (8bits) | | | | | | | |
| PB8+3 | disparity_in_partition 0001 (8bits) | | | | | | | |
| PB8+4 | disparity_in_partition 0010 (8bits) | | | | | | | |
| ... | | | | | | | | |
| PB8+16 | disparity_in_partition 1110 (8bits) | | | | | | | |
| PB8+17 | disparity_in_partition 1111 (8bits) | | | | | | | |

Picture N

FIG. 64

Vendor Specific InfoFrame

| Packet Byte # | 7 | 6 | 5 | 4 | 3 | 2 | 1 | 0 |
|---|---|---|---|---|---|---|---|---|
| ... | | | | | | | | |
| PB7 | 3D_Metadata_type(3bits) | | | 3D_Metadata_length = 11111 | | | | |
| PB8 | partition_type = 010 | | | D_picture = 1 | partition_count = 1111 | | | |
| PB8+1 | Max_disparity_in_picture (8bits) | | | | | | | |
| PB8+2 | disparity_in_partition 0001 (8bits) | | | | | | | |
| PB8+3 | disparity_in_partition 0010 (8bits) | | | | | | | |
| PB8+4 | disparity_in_partition 0011 (8bits) | | | | | | | |
| ... | | | | | | | | |
| PB8+15 | disparity_in_partition 1110 (8bits) | | | | | | | |
| PB8+16 | disparity_in_partition 1111 (8bits) | | | | | | | |
| PB8+17 | Max_disparity_in_picture (8bits) | | | | | | | |
| PB8+18 | disparity_in_partition 0001 (8bits) | | | | | | | |
| ... | | | | | | | | |
| PB8+31 | disparity_in_partition 1110 (8bits) | | | | | | | |
| PB8+32 | disparity_in_partition 1111 (8bits) | | | | | | | |

Picture N: PB8 through PB8+16
Picture (N+1): PB8+17 through PB8+32

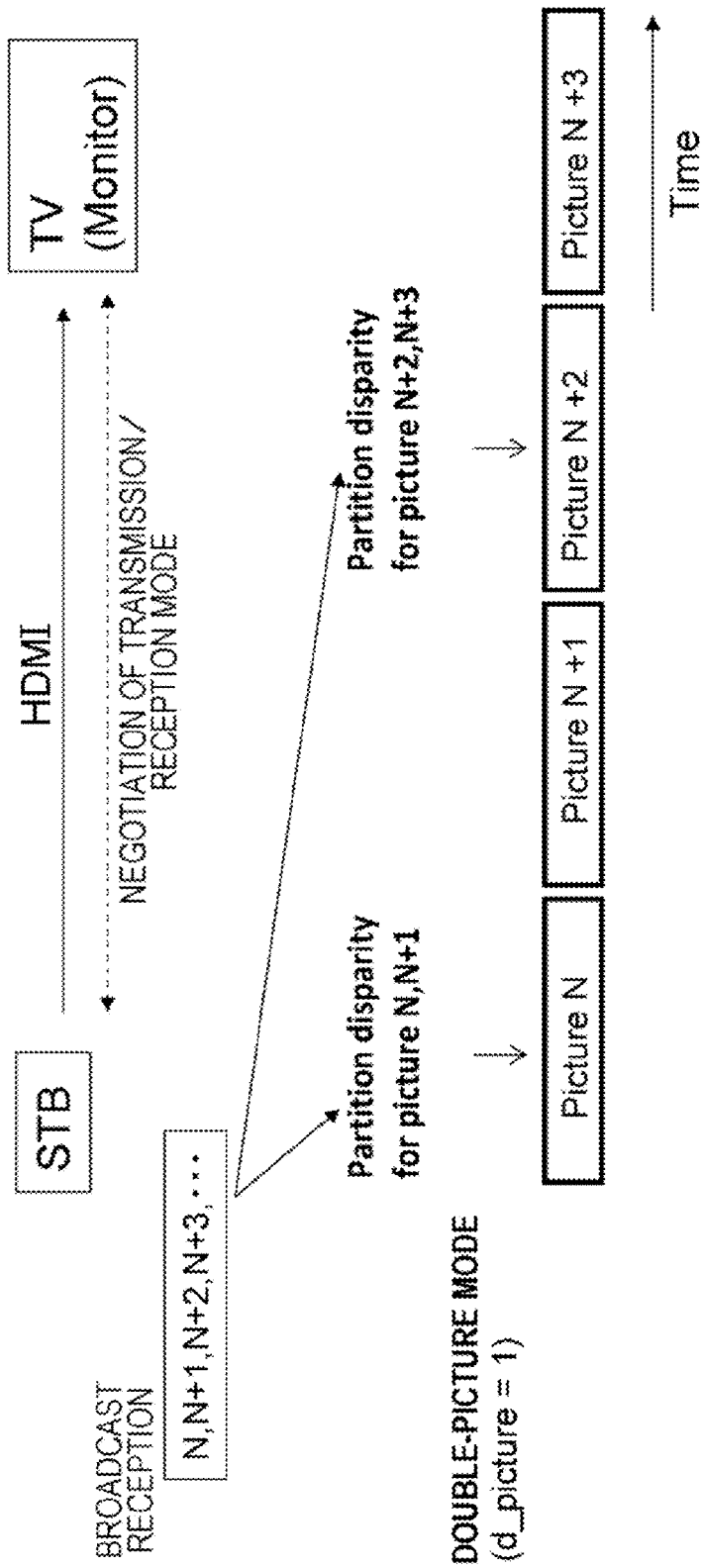

FIG. 69

| Packet Byte # | 7 | 6 | 5 | 4 | 3 | 2 | 1 | 0 |
|---|---|---|---|---|---|---|---|---|
| ... | | | | | | | | |
| PB7 | 3D_Metadata_type(3bits) | | | 3D_Metadata_length = 11010 | | | | |
| PB8 | d_picture = 1 | Picture_reorder = 0 | partition_enable = 1 | Reserved '1' | partition_count = 1111 | | | |
| PB8+1 | Max_disparity_in_picture (8bits) | | | | | | | |
| PB8+2 | Min_disparity_in_partition0001 (8bits) | | | | | | | |
| PB8+3 | Min_disparity_in_partition0010 (8bits) | | | | | | | |
| PB8+4 | Min_disparity_in_partition0011 (8bits) | | | | | | | |
| ... | | | | | | | | |
| PB8+15 | Min_disparity_in_partition1110 (8bits) | | | | | | | |
| PB8+16 | Min_disparity_in_partition1111 (8bits) | | | | | | | |
| PB8+17 | Reserved '1111' | | | | Differential_max_disparity_in_picture(4bits) | | | |
| PB8+18 | Differential_min_disparity_partition0001 (4bits) | | | | Differential_min_disparity_partition0010 (4bits) | | | |
| ... | | | | | | | | |
| PB8+25 | Differential_min_disparity_partition1110 (4bits) | | | | Differential_min_disparity_partition1111 (4bits) | | | |

Vendor Specific InfoFrame

Picture (N): PB8+1 through PB8+16
Picture (N+1): PB8+17 through PB8+25

FIG. 70

Vendor Specific InfoFrame

| Packet Byte # | 7 | 6 | 5 | 4 | 3 | 2 | 1 | 0 | |
|---|---|---|---|---|---|---|---|---|---|
| ... | | | | | | | | | |
| PB7 | 3D_Metadata_type(3bits) | | | 3D_Metadata_length = 1010 | | | | | |
| PB8 | d_picture = 1 | Picture_reorder = 1 | partition_enable = 1 | Reserved '1' | partition_count = 1111 | | | | |
| PB8+1 | Max_disparity_in_picture (8bits) | | | | | | | | ⎫ |
| PB8+2 | Min_disparity_in_partition0001 (8bits) | | | | | | | | ⎬ Picture (N+1) |
| PB8+3 | Min_disparity_in_partition0010 (8bits) | | | | | | | | ⎪ |
| PB8+4 | Min_disparity_in_partition0011 (8bits) | | | | | | | | ⎪ |
| ... | | | | | | | | | ⎪ |
| PB8+15 | Min_disparity_in_partition1110 (8bits) | | | | | | | | ⎪ |
| PB8+16 | Min_disparity_in_partition1111 (8bits) | | | | | | | | ⎭ |
| PB8+17 | Reserved '1111' | | | | Differential_max_disparity_in_picture (4bits) | | | | ⎫ |
| PB8+18 | Differential_min_disparity_partition0001 (4bits) | | | | Differential_min_disparity_partition0010 (4bits) | | | | ⎬ Picture (N) |
| ... | | | | | | | | | ⎪ |
| PB8+25 | Differential_min_disparity_partition1110 (4bits) | | | | Differential_min_disparity_partition1111 (4bits) | | | | ⎭ |

FIG. 71

| | | |
|---|---|---|
| 3D_Metadata_type (3bits) | | INDICATES THE TYPE OF 3D Meta INFORMATION. |
| "001" | | INDICATES partitioned disparity information. |
| 3D_Metadata_length (5bits) | | INDICATES THE SIZE OF partitioned disparity information. |
| | THE VALUE OF 3D_Metadata_length RANGES FROM 0x0 TO 0x16. | |
| '00011' | IS 3 (IN DECIMAL NUMBER) | |
| '11010' | IS 26 (IN DECIMAL NUMBER) | |
| partition_enable (1bit) | | INDICATES WHETHER THE TARGET picture HAS A partition disparity |
| '1' | | PARTITIONED AREAS ARE SPECIFIED IN HORIZONTAL AND VERTICAL DIRECTIONS, AND EACH PARTITIONED AREA HAS A disparity. |
| '0' | | THE ENTIRE SCREEN HAS ONE disparity. |
| d_picture (double_picture) (1bit) | | REPRESENTS SINGLE PICTURE OR DOUBLE PICTURE. |
| '0' | | partition disparity FOR SINGLE PICTURE IS TRANSMITTED. |
| '1' | | partition disparity FOR DOUBLE PICTURE (TWO pictures) IS TRANSMITTED. |
| Picture_reorder (1bit) | | IN THE CASE OF TRANSMITTING DOUBLE PICTURE, INDICATES WHICH OF TWO PICTURES (N, N+1) IS TRANSMITTED FIRST, N IS THE FIRST AND N+1 IS THE SECOND, OR N+1 IS THE FIRST AND N IS THE SECOND. |
| '1' | | THE (N+1) PICTURE IS THE FIRST, AND THE disparity VALUE IS REPRESENTED BY 8 bits. THE N PICTURE IS THE SECOND, AND THE DIFFERENCE FROM THE disparity OF THE (N-1) PICTURE IS REPRESENTED BY 4 bits. |
| '0' | | THE N PICTURE IS THE FIRST, AND THE disparity VALUE IS REPRESENTED BY 8 bits. THE (N+1) PICTURE IS THE SECOND, AND THE DIFFERENCE FROM THE disparity OF THE N PICTURE IS REPRESENTED BY 4 bits. |
| partition_count (4bits) | | THE TOTAL NUMBER OF PARTITIONED AREAS. |
| '0000' | IS 1 | |
| '1111' | IS 16 | |
| max_disparity_in_picture (8bits) | | THE MAXIMUM disparity VALUE OF THE ENTIRE picture. |
| Min_disparity_in_partition (8bits) | | THE MINIMUM disparity VALUE IN EACH PARTITIONED AREA. |

TRANSMITTING APPARATUS, TRANSMITTING METHOD, AND RECEIVING APPARATUS

CROSS-REFERENCE TO RELATED APPLICATION

The present application is a national phase entry under 35 U.S.C. §371 of International Application No. PCT/JP2013/050723 filed Jan. 17, 2013, published on Aug. 22, 2013, as WO 2013/121823 A1, which claims priority from Japanese Patent Application Nos. JP 2012-032215 filed in the Japanese Patent Office on Feb. 16, 2012, and JP 2012-035684 filed in the Japanese Patent Office on Feb. 21, 2012.

TECHNICAL FIELD

The present technology relates to a transmitting apparatus, a transmitting method, and a receiving apparatus, and particularly relates to a transmitting apparatus and so forth for enabling favorable display of a stereo image or favorable overlay display of graphics on a stereo image.

BACKGROUND ART

For example, in PTL 1, a method for transmitting stereo image data using television broadcast waves is suggested. In this case, left-eye image data and right-eye image data which form a stereo image are transmitted, and stereo image display utilizing binocular disparity is performed in a television receiver.

FIG. 77 illustrates the relationship between display positions of left and right images of an object on a screen and a reproduction position of a stereo image formed therefrom in stereo image display utilizing binocular disparity. For example, regarding an object A, a left image La of which is displayed so as to be shifted to the right side and a right image Ra of which is displayed so as to be shifted to the left side on the screen, as illustrated in the figure, left and right lines of sight cross in front of a screen surface, and thus the reproduction position of the stereo image thereof is in front of the screen surface.

Also, for example, regarding an object B, a left image Lb and a right image Rb of which are displayed at the same position on the screen, as illustrated in the figure, left and right lines of sight cross on the screen surface, and thus the reproduction position of the stereo image thereof is on the screen surface. Furthermore, for example, regarding an object C, a left image Lc of which is displayed so as to be shifted to the left side and a right image Rc of which is displayed so as to be shifted to the right side on the screen, as illustrated in the figure, left and right lines of sight cross behind the screen surface, and thus the reproduction position of the stereo image thereof is behind the screen surface.

CITATION LIST

Patent Literature

PTL 1: Japanese Unexamined Patent Application

SUMMARY OF INVENTION

Technical Problem

As described above, in stereo image display, a viewer perceives perspective in a stereo image utilizing binocular disparity. Here, it is necessary that a disparity angle with respect to the nearest object reproduction position (a disparity angle in a crossing direction) and a disparity angle with respect to the farthest object reproduction position (a disparity angle in a same-side direction) be within a certain range so that viewing does not cause any health problems. That is, it is expected that disparity angles will be checked on a receiving side, and, if the disparity angles are out of the certain range, a left-eye image and a right-eye image will be reconfigured so that the disparity angles are within the certain range.

Further, regarding graphics of OSD (On-Screen Display), an application, or the like displayed on an image in an overlaid manner in a receiver (such as a set top box or a television receiver), it is expected that such graphics will be rendered in conjunction with stereo image display, not only in terms of a two-dimensional space, but also in terms of the depth of three dimensions. In the case of displaying graphics on an image in an overlaid manner in a receiver, it is expected that disparity adjustment will be performed in accordance with the perspective of individual objects in the image, so as to maintain perspective consistency.

An object of the present technology is to enable favorable display of a stereo image or favorable overlay display of graphics on a stereo image.

Solution to Problem

A concept of the present technology resides in a transmitting apparatus including:

an image data obtaining unit that obtains left-eye image data and right-eye image data which form a stereo image;

a disparity information obtaining unit that obtains, for each of certain pictures of the obtained image data, disparity information about one of a left-eye image and a right-eye image with respect to the other, the disparity information including first disparity information corresponding to the nearest object reproduction position in a certain area of a picture display screen, and second disparity information corresponding to the farthest object reproduction position in the certain area of the picture display screen;

a disparity information inserting unit that inserts the obtained disparity information into a video stream which is obtained by encoding the obtained image data; and an image data transmitting unit that transmits a container of a certain format, the container including the video stream into which the disparity information has been inserted.

In the present technology, the image data obtaining unit obtains left-eye image data and right-eye image data which form a stereo image. In this case, the image data is obtained by, for example, capturing an image using a camera, or reading it from a storage medium.

The disparity information obtaining unit obtains, for each of certain pictures of image data, disparity information about one of a left-eye image and a right-eye image with respect to the other, the disparity information including first disparity information and second disparity information. In this case, obtainment of disparity information may be performed for at least the picture for which disparity information is to be transmitted, and not necessarily for all the pictures. The first disparity information is disparity information corresponding to the nearest object reproduction position in a certain area of a picture display screen. The second disparity information is disparity information corresponding to the farthest object reproduction position in the certain area of the picture display screen.

For example, the disparity information obtaining unit may obtain first disparity information about each of partitioned areas that are obtained by partitioning the picture display screen using partition information, and obtain second disparity information about the entire picture display screen. Also, for example, the disparity information obtaining unit may obtain first disparity information and second disparity information about each of partitioned areas that are obtained by partitioning the picture display screen using partition information. Furthermore, for example, the disparity information obtaining unit may obtain first disparity information about each of partitioned areas that are obtained by partitioning the picture display screen using first partition information, and obtain second disparity information about each of partitioned areas that are obtained by partitioning the picture display screen using second partition information.

The disparity information inserting unit inserts the obtained first disparity information and second disparity information into a video stream which is obtained by encoding the obtained image data. For example, disparity information is inserted into the video stream in units of pictures or in units of GOPs (Groups of Pictures). Furthermore, disparity information may be inserted in units of other units, for example, in units of scenes.

In this case, the disparity information inserting unit may insert the disparity information into the video stream after performing a compression encoding process. For example, in the compression encoding process, data compression may be performed using a variable-length code. Alternatively, difference data of disparity information between pictures may be obtained, and variable-length encoding may be performed thereon to further increase the compression rate.

Further, in this case, the disparity information inserting unit may further insert, when inserting disparity information into a certain picture in the video stream, identification information identifying whether the disparity information is disparity information about the entire picture display screen or disparity information about each of a certain number of partitioned areas. The identification information enables a receiving side to easily determine whether the disparity information transmitted thereto is disparity information about the entire picture display screen or about each of a plurality of partitioned areas.

The image data transmitting unit transmits a container of a certain format, the container including the video stream into which the disparity information has been inserted. For example, the container may be a transport stream (MPEG-2 TS) adopted in digital broadcast standards. Alternatively, for example, the container may be a container of MP4 used for distribution on the Internet, or a container of another format.

An identification information inserting unit inserts, into a layer of a container, identification information identifying whether a video stream includes disparity information inserted thereinto. For example, the container is a transport stream, and the identification information inserting unit may insert the identification information under a program map table or an event information table. For example, the identification information inserting unit describes identification information in a descriptor that is inserted under the program map table of the event information table.

As described above, in the present technology, first disparity information (disparity information corresponding to the nearest object reproduction position in a certain area of a picture display screen) and second disparity information (disparity information corresponding to the farthest object reproduction position in the certain area of the picture display screen) that are obtained for each of certain pictures of image data are inserted into a video stream, and the video stream is transmitted. Accordingly, on the basis of the first disparity information and the second disparity information, a receiving side is capable of checking whether or not a disparity angle with respect to the nearest object reproduction position (a disparity angle in a crossing direction) and a disparity angle with respect to the farthest object reproduction position (a disparity angle in a same-side direction) are within a certain range in which viewing does not cause any health problems.

Further, another concept of the present technology resides in a receiving apparatus including:

an image data receiving unit that receives a container of a certain format, the container including a video stream, wherein the video stream is obtained by encoding left-eye image data and right-eye image data which form a stereo image, and wherein the video stream includes inserted thereinto, for each of certain pictures of the image data, disparity information about one of a left-eye image and a right-eye image with respect to the other, the disparity information including first disparity information corresponding to the nearest object reproduction position in a certain area of a picture display screen, and second disparity information corresponding to the farthest object reproduction position in the certain area of the picture display screen, the receiving apparatus further including:

an information obtaining unit that obtains the left-eye image data and the right-eye image data and also obtains the first disparity information and the second disparity information from the video stream included in the container; and a control unit that provides an instruction to reconfigure at least the left-eye image data and the right-eye image data so that a disparity angle is within a certain range, on the basis of the obtained first disparity information and second disparity information.

In the present technology, the image data receiving unit receives a container of a certain format, the container including a video stream. The video stream is obtained by encoding left-eye image data and right-eye image data which form a stereo image. Also, the video stream includes inserted thereinto, for each of certain pictures of the image data, disparity information about one of a left-eye image and a right-eye image with respect to the other, the disparity information including first disparity information and second disparity information. The first disparity information is disparity information corresponding to the nearest object reproduction position in a certain area of a picture display screen. The second disparity information is disparity information corresponding to the farthest object reproduction position in the certain area of the picture display screen.

The information obtaining unit obtains, from the video stream included in the container, the left-eye image data and the right-eye image data and also obtains the first disparity information and the second disparity information inserted into a certain picture of the image data. Further, the control unit provides an instruction to reconfigure the left-eye image data and the right-eye image data so that a disparity angle is within a certain range, on the basis of the obtained first disparity information and second disparity information.

As described above, in the present technology, there is provided an instruction to reconfigure left-eye image data and right-eye image data so that a disparity angle is within a certain range, on the basis of first disparity information and second disparity information. Thus, the left-eye image data and the right-eye image data can be reconfigured so that a disparity angle with respect to the nearest object reproduction position (a disparity angle in a crossing direction) and a disparity angle with respect to the farthest object reproduction position (a disparity angle in a same-side direction) are within a certain range in which viewing does not cause any health problems.

Further, a still another concept of the present technology resides in a transmitting apparatus including:

an image data obtaining unit that obtains left-eye image data and right-eye image data which form a stereo image;

a disparity information obtaining unit that obtains, for each of certain pictures of the obtained image data, disparity information about one of a left-eye image and a right-eye image with respect to the other;

a compression encoding unit that performs a compression encoding process on the obtained disparity information;

a disparity information inserting unit that inserts the compression-encoded disparity information into a video stream which is obtained by encoding the obtained image data; and an image data transmitting unit that transmits a container of a certain format, the container including the video stream into which the disparity information has been inserted.

In the present technology, the image data obtaining unit obtains left-eye image data and right-eye image data which form a stereo image. In this case, the image data is obtained by, for example, capturing an image using a camera, or reading it from a storage medium.

The disparity information obtaining unit obtains, for each of certain pictures of the obtained image data, disparity information about one of a left-eye image and a right-eye image with respect to the other. In this case, for example, the disparity information is generated on the basis of left-eye image data and right-eye image data, or is obtained by reading it from a storage medium.

The compression encoding unit performs a compression encoding process on the obtained disparity information. For example, the compression encoding unit may perform, as the compression encoding process, a process using a variable-length code on the obtained disparity information about the individual pictures. Alternatively, for example, the compression encoding unit may perform, as the compression encoding process, a process of obtaining difference data between a reference picture and a referenced picture among the obtained individual pictures, and performing variable-length encoding on the difference data. In this case, for example, the compression encoding unit may obtain difference data by regarding a preceding picture in display order as a referenced picture. Alternatively, in this case, for example, the compression encoding unit may obtain difference data by regarding a preceding picture in decoding order as a referenced picture.

The disparity information inserting unit inserts the compression-encoded disparity information into a video stream which is obtained by encoding the obtained image data. For example, disparity information is inserted into the video stream in unit of pictures or in units of GOPs (Groups of Pictures). Furthermore, disparity information may be inserted in units of other units, for example, in units of scenes.

For example, the disparity information inserting unit may further insert, when inserting the disparity information into a certain picture in the video stream, identification information identifying whether the inserted disparity information is intra data or difference data. In this case, a receiving side is capable of easily determining whether the inserted disparity information is intra data or difference data.

Also, for example, the disparity information inserting unit may insert the disparity information for an I picture, a P picture, and a referenced B picture in the video stream, and, in a case where the inserted disparity information is difference data, may further insert information representing the number of pictures up to a referenced picture. In this case, a receiving side is capable of easily determining a referenced picture.

As described above, in the present technology, disparity information obtained for each of certain pictures of image data is inserted into a video stream and the video stream is transmitted. Accordingly, the depth of graphics displayed on a stereo image in an overlaid manner on a receiving side can be favorably controlled in units of pictures (frames). Further, in the present technology, disparity information inserted into a video stream has been compression-encoded, so that the amount of data can be reduced.

Further, another concept of the present technology resides in a receiving apparatus including:

an image data receiving unit that receives a container of a certain format, the container including a video stream, wherein the video stream is obtained by encoding left-eye image data and right-eye image data which form a stereo image, and wherein the video stream includes inserted thereinto, for each of certain pictures of the image data, disparity information about one of a left-eye image and a right-eye image with respect to the other, the receiving apparatus further including:

an information obtaining unit that obtains the left-eye image data and the right-eye image data and also obtains the disparity information from the video stream included in the container; and a disparity information interpolating unit that generates disparity information about a picture for which the disparity information obtained by the information obtaining unit does not exist, by performing interpolation using the obtained disparity information about a preceding picture and a subsequent picture.

In the present technology, the image data receiving unit receives a container of a certain format, the container including a video stream. The video stream is obtained by encoding left-eye image data and right-eye image data which form a stereo image. Also, the video stream includes inserted thereinto, for each of certain pictures of the image data, disparity information about one of a left-eye image and a right-eye image with respect to the other.

The information obtaining unit obtains the left-eye image data and the right-eye image data and also obtains the disparity information inserted into a certain picture of the image data, from the video stream included in the container. Also, the disparity information interpolating unit generates disparity information about a picture for which disparity information does not exist, by performing interpolation using the obtained disparity information about a preceding picture and a subsequent picture.

As described above, in the present technology, disparity information about a picture for which disparity information does not exist is generated by performing interpolation using the obtained disparity information about a preceding picture and a subsequent picture. Thus, for example, the depth of graphics displayed on a stereo image in an overlaid manner can be favorably controlled in units of pictures (frames). In this case, when disparity information about a picture generated through interpolation is generated at decimal precision, if the disparity information corresponds to disparity information of sub-pixels, dynamic update of the depth of graphics can be performed more smoothly.

Further, still another concept of the present technology resides in a receiving apparatus including:

an image data receiving unit that receives a container of a certain format, the container including a video stream, wherein the video stream is obtained by encoding left-eye image data and right-eye image data which form a stereo image, and wherein the video stream includes inserted thereinto, for each of certain pictures of the image data, disparity information about one of a left-eye image and a right-eye image with respect to the other, the disparity information including first disparity information corresponding to the nearest object reproduction position in a certain area of a picture display screen, and second disparity information corresponding to the farthest object reproduction position in the certain area of the picture display screen, the receiving apparatus further including:

an information obtaining unit that obtains the left-eye image data and the right-eye image data and also obtains the first disparity information and the second disparity information from the video stream included in the container; and a transmitting unit that transmits, to an external apparatus, the obtained left-eye image data and right-eye image data and the obtained first disparity information and second disparity information in association with each other.

In the present technology, the image data receiving unit receives a container of a certain format, the container including a video stream. For example, the container may be a transport stream (MPEG-2 TS) adopted in digital broadcast standards. Alternatively, for example, the container may be a container of MP4 used for distribution on the Internet, or a container of another format.

The video stream is obtained by encoding left-eye image data and right-eye image data which form a stereo image. Further, the video stream includes inserted thereinto, for each of certain pictures of the image data, disparity information about one of a left-eye image and a right-eye image with respect to the other, the disparity information including first disparity information and second disparity information. The first disparity information is disparity information corresponding to the nearest object reproduction position in a certain area of a picture display screen. On the other hand, the second disparity information is disparity information corresponding to the farthest object reproduction position in the certain area of the picture display screen.

The information obtaining unit obtains the left-eye image data and the right-eye image data and also obtains the first disparity information and the second disparity information inserted into a certain picture of the image data, from the video stream included in the container. The transmitting unit transmits, to an external apparatus, the obtained left-eye image data and right-eye image data and the obtained first disparity information and second disparity information in association with each other.

For example, the transmitting unit transmits image data to an external apparatus using differential signals through a certain number of channels, and inserts disparity information into a blanking period of the image data, thereby transmitting the disparity information to the external apparatus. In this case, for example, the transmitting unit inserts disparity information into an information packet of a certain format located in the blanking period of the image data.

For example, the receiving apparatus may further include an information reconfiguration unit that reconfigures image data and disparity information so that a disparity angle is within a certain range, on the basis of the obtained first disparity information and second disparity information. The transmitting unit may transmit, to the external apparatus, the reconfigured left-eye image data and right-eye image data and the reconfigured first disparity information and second disparity information in association with each other.

As described above, in the present technology, left-eye image data and right-eye image data and first disparity information and second disparity information obtained from a video stream included in a reception container are transmitted to an external apparatus in association with each other. Thus, the external apparatus is capable of checking, on the basis of the first disparity information and the second disparity information, whether or not a disparity angle with respect to the nearest object reproduction position (a disparity angle in a crossing direction) and a disparity angle with respect to the farthest object reproduction position (a disparity angle in a same-side direction) are within a certain range in which viewing does not cause any health problems.

Further, in the present technology, for example, the transmitting unit may transmit, in units of two pictures, disparity information about a first picture and a second picture which are sequentially adjacent to each other. At least the disparity information about the first picture or the second picture may be difference data with respect to disparity information about an immediately preceding picture. In this way, either of disparity information about the first picture and disparity information about the second picture is difference data, and thus the amount of transmission data can be reduced.

Further, in the present technology, for example, the receiving apparatus may further include a determining unit that determines, on the basis of difference data between the disparity information about the first picture and the disparity information about the second picture, which of the disparity information about the first picture and the disparity information about the second picture is to be difference data. In this case, for example, when the difference between the disparity information about the first picture and the disparity information about the second picture is large due to scene change or the like, the disparity information about the first picture can be determined to be difference data, and the amount of transmission data can be further reduced.

Further, in the present technology, for example, the disparity information transmitted by the transmitting unit may include, added thereto, identification information indicating whether the disparity information about the first picture is difference data and whether the disparity information about the second picture is difference data. In this case, it can be easily determined whether the disparity information about the first picture is difference data and whether the disparity information about the second picture is difference data.

Advantageous Effects of Invention

According to the present technology, display of a stereo image or overlay display of graphics on a stereo image can be favorably performed.

BRIEF DESCRIPTION OF DRAWINGS

FIG. 10 includes diagrams illustrating an example structure (Syntax) of an AVC video descriptor and main definition content (semantics).

FIG. 11 includes diagrams illustrating an example structure (Syntax) of an MVC extension descriptor and main definition content (semantics).

FIG. 12 includes diagrams illustrating an example structure (Syntax) of a graphics depth info descriptor (graphics_depth_info_descriptor) and main definition content (semantics).

FIG. 13 illustrates an example of an access unit at the head of a GOP and an access unit at the position other than the head of a GOP in a case where the encoding scheme is AVC.

FIG. 14 includes diagrams illustrating an example structure (Syntax) of "depth_information_for_graphics SEI message" and an example structure (Syntax) of "depth_information_for_graphics_data( )".

FIG. 15 is a diagram illustrating an example structure (Syntax) of "depth_information_for_graphics( )" in the case of inserting disparity information for each picture in units of pictures.

FIG. 16 is a diagram illustrating an example structure (Syntax) of "depth_information_for_graphics( )" in the case of inserting disparity information for each picture in units of pictures.

FIG. 17 is a diagram illustrating an example structure (Syntax) of "depth_information_for_graphics( )" in the case of inserting disparity information for each picture in units of pictures.

FIG. 18 is a diagram illustrating content (Semantics) of main information in an example structure (Syntax) of "depth_information_for_graphics( )".

FIG. 19 includes diagrams illustrating examples of partitioning a picture display screen.

FIG. 20 is a diagram illustrating an example structure (Syntax) of "depth_information_for_graphics( )" in the case of collectively encoding disparity information for a plurality of pictures.

FIG. 21 is a diagram illustrating an example structure (Syntax) of "depth_information_for_graphics( )" in the case of collectively encoding disparity information for a plurality of pictures.

FIG. 22 is a diagram illustrating an example structure (Syntax) of "depth_information_for_graphics( )" in the case of collectively encoding disparity information for a plurality of pictures.

FIG. 23 includes diagrams illustrating an example structure (Syntax) of "user_data( )" and an example structure (Syntax) of "depth_information_for_graphics_data( )".

FIG. 27 is a diagram describing compression encoding of a non-prediction type (Non-Prediction Type).

FIG. 28 is a diagram describing compression encoding of a prediction type 0 (Non-Prediction Type 0).

FIG. 29 is a diagram describing compression encoding of a prediction type 1 (Non-Prediction Type 1).

FIG. 30 is a diagram describing compression encoding of a prediction type 2 (Non-Prediction Type 2).

FIG. 31 is a diagram describing compression encoding of a prediction type 3 (Non-Prediction Type 3).

FIG. 32 is a diagram illustrating an example structure (Syntax) of "depth_information_sei( )" in the case of inserting compression-encoded disparity information for each picture in units of pictures.

FIG. 33 is a diagram illustrating an example structure (Syntax) of "depth_information_sei( )" in the case of inserting compression-encoded disparity information for each picture in units of pictures.

FIG. 34 is a diagram illustrating an example structure (Syntax) of "depth_information_sei( )" in the case of inserting compression-encoded disparity information for each picture in units of pictures.

FIG. 35 is a diagram illustrating an example structure (Syntax) of "depth_information_sei( )" in the case of collectively encoding compression-encoded disparity information for a plurality of pictures.

FIG. 36 is a diagram illustrating an example structure (Syntax) of "depth_information_sei( )" in the case of collectively encoding compression-encoded disparity information for a plurality of pictures.

FIG. 37 is a diagram illustrating an example structure (Syntax) of "depth_information_sei( )" in the case of collectively encoding compression-encoded disparity information for a plurality of pictures.

FIG. 38 is a diagram illustrating another example structure (Syntax) of "depth_information_sei( )".

FIG. 39 is a diagram illustrating the configuration of "Exp-Golomb code ue(v)" as a variable-length code.

FIG. 40 is a diagram illustrating another example structure (Syntax) of "depth_information_sei( )".

FIG. 60 is a diagram illustrating a pin array (type-A) of HDMI terminals to which HDMI cables of a source apparatus and a sink apparatus are connected.

FIG. 61 is a diagram illustrating an example of a packet structure of HDMI Vendor Specific InfoFrame in the case of using HDMI Vendor Specific InfoFrame for transmitting disparity information.

FIG. 62 is a diagram illustrating the content of main information in the example of the packet structure of HDMI Vendor Specific InfoFrame.

FIG. 63 is a diagram illustrating an example structure of VS_Info in a case where the number of partitioned areas is "16" in a single-picture mode.

FIG. 64 is a diagram illustrating an example structure of VS_Info in a case where the number of partitioned areas is "16" in a double-picture mode.

FIG. 68 is a diagram schematically illustrating the case of performing reception in units of GOPs (a plurality of pictures) and transmission in a double-picture mode.

FIG. 69 is a diagram illustrating another example of the packet structure of VS_Info (HDMI Vendor Specific InfoFrame).

FIG. 70 is a diagram illustrating another example of the packet structure of VS_Info (HDMI Vendor Specific InfoFrame).

FIG. 71 is a diagram illustrating the content of main information in the example of the packet structure of HDMI Vendor Specific InfoFrame.

DESCRIPTION OF EMBODIMENTS

Hereinafter, an embodiment for implementing the invention (hereinafter referred to as an "embodiment") will be described. Note that the description will be given in the following order.

1. Embodiment
2. Modification

1. Embodiment

Image Transmitting/Receiving System

Figure 1:
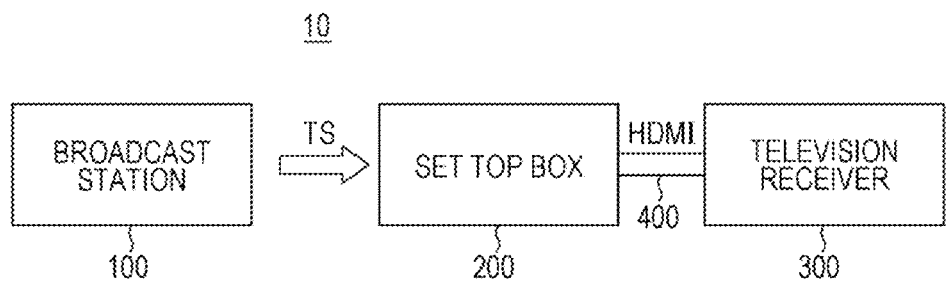
FIG. 1 is a block diagram illustrating an example configuration of an image transmitting/receiving system according to an embodiment.

FIG. 1 illustrates an example configuration of an image transmitting/receiving system 10 according to an embodiment. The image transmitting/receiving system 10 includes a broadcast station 100, a set top box (STB) 200, and a television receiver 300 serving as a monitor. The set top box 200 and the television receiver (TV) 300 are connected to each other via an HDMI (High Definition Multimedia Interface) cable 400.

"Description of Broadcast Station"

The broadcast station 100 transmits a transport stream TS serving as a container by broadcast waves. The transport stream TS includes a video stream which is obtained by encoding left-eye image data and right-eye image data which form a stereo image. For example, the left-eye image data and the right-eye image data are transmitted as one video stream. In this case, for example, the left-eye image data and the right-eye image data are subjected to an interleaving process so as to be formed as image data of a side-by-side format or a top-and-bottom format, and the image data is included in one video stream.

Alternatively, for example, the left-eye image data and the right-eye image data are transmitted as different video streams. In this case, for example, the left-eye image data is included in an MVC base view stream, and the right-eye image data is included in an MVC nonbase view stream.

Disparity information (Disparity data) about one of a left-eye image and a right-eye image with respect to the other, the disparity information being obtained for each of certain pictures of image data, is inserted into a video stream. In this case, it is assumed that disparity information is obtained for at least a picture for which disparity information is to be transmitted.

Here, disparity information for each picture includes first disparity information and second disparity information. The first disparity information is disparity information corresponding to the nearest object reproduction position in a certain area of a picture display screen. On the other hand, the second disparity information is disparity information corresponding to the farthest object reproduction position in the certain area of the picture display screen.

When it is assumed that the position of a screen corresponds to zero disparity, in a case where an object reproduction position is in front of the screen, the disparity information is obtained as a negative value (see DPa in FIG. 71). On the other hand, in a case where an object reproduction position is behind the screen, the disparity information is obtained as a positive value (see DPc in FIG. 71). Thus, for example, among pieces of disparity information about a certain area, a piece of disparity information having a minimum value is used as the first disparity information. Also, for example, among pieces of disparity information about the certain area, a piece of disparity information having a maximum value is used as the second disparity information.

In this case, the following obtaining methods may be used to obtain first disparity information and second disparity information, for example.

(1) First disparity information about each of partitioned areas, which are obtained by partitioning a picture display screen using partition information, is obtained, and second disparity information about the entire picture display screen is obtained.

(2) First disparity information and second disparity information about each of partitioned areas, which are obtained by partitioning a picture display screen using partition information, are obtained.

(3) First disparity information about each of partitioned areas, which are obtained by partitioning a picture display screen using first partition information, is obtained, and second disparity information about each of partitioned areas, which are obtained by partitioning the picture display screen using second partition information, is obtained.

(4) First disparity information about an entire picture display screen is obtained, and second disparity information about the entire picture display screen is obtained.

Figure 2:
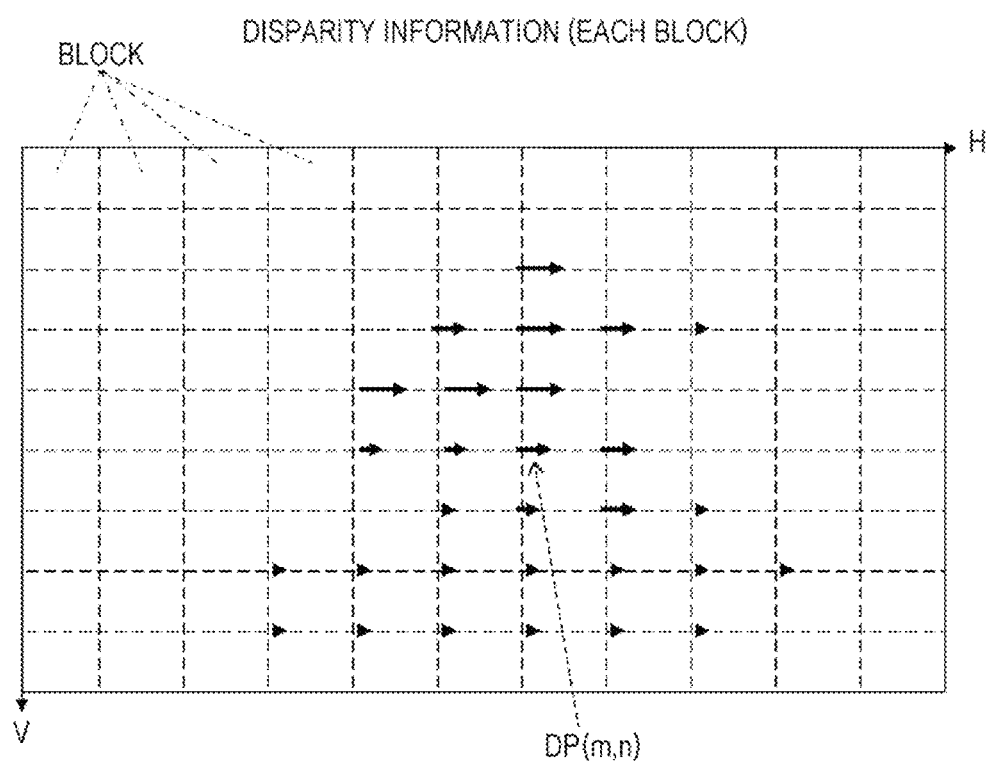
FIG. 2 is a diagram illustrating an example of disparity information (disparity vector) about each block.

Disparity information about the entire picture display screen or each of partitioned areas is obtained by performing a downsizing process on disparity information about each block. FIG. 2 illustrates an example of disparity information (disparity vector) about each block.

Figure 3:
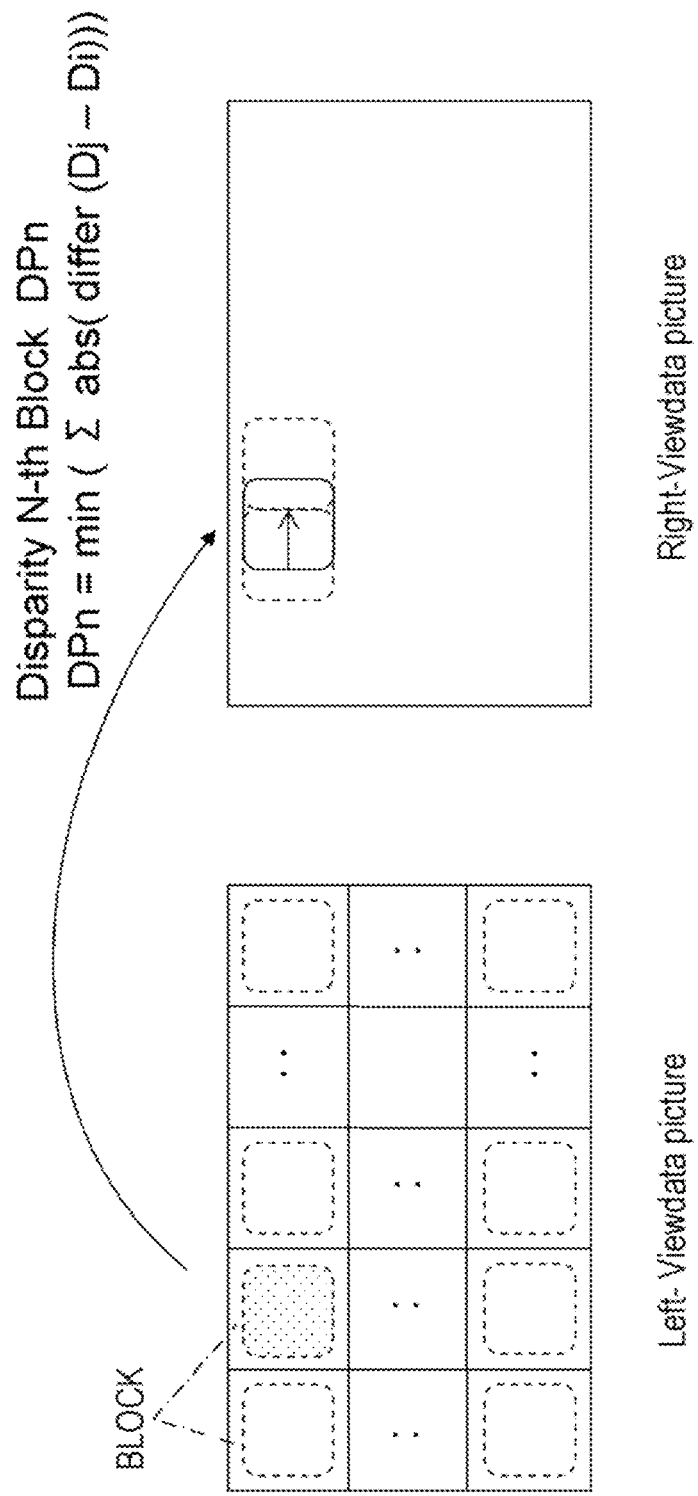
FIG. 3 is a diagram describing an example of a method for generating disparity information in units of blocks.

FIG. 3 illustrates an example of a method for generating disparity information in units of blocks. This example is an example of obtaining disparity information indicating a right-eye view (Right-View) from a left-eye view (Left-View). In this case, for example, 4*4, 8*8, or 16*16 pixel blocks (disparity detection blocks) are set in a left-eye view picture.

As illustrated in the figure, the left-eye view picture is regarded as a detection image, and a right-eye view picture is regarded as a reference image. For each block of the left-eye view picture, block search of the right-eye view picture is performed so that the sum of absolute values of differences between pixels is minimized, and disparity data is obtained.

That is, disparity information DPn about an N-th block is obtained by performing block search so that the sum of absolute values of differences in the N-th block is minimized, for example, as expressed by the following equation (1). Note that, in equation (1), Dj represents a pixel value in the right-eye view picture, and Di represents a pixel value in the left-eye view picture.

$$DPn = \min(\Sigma abs(\text{differ}(Dj-Di))) \quad (1)$$

Figure 4:
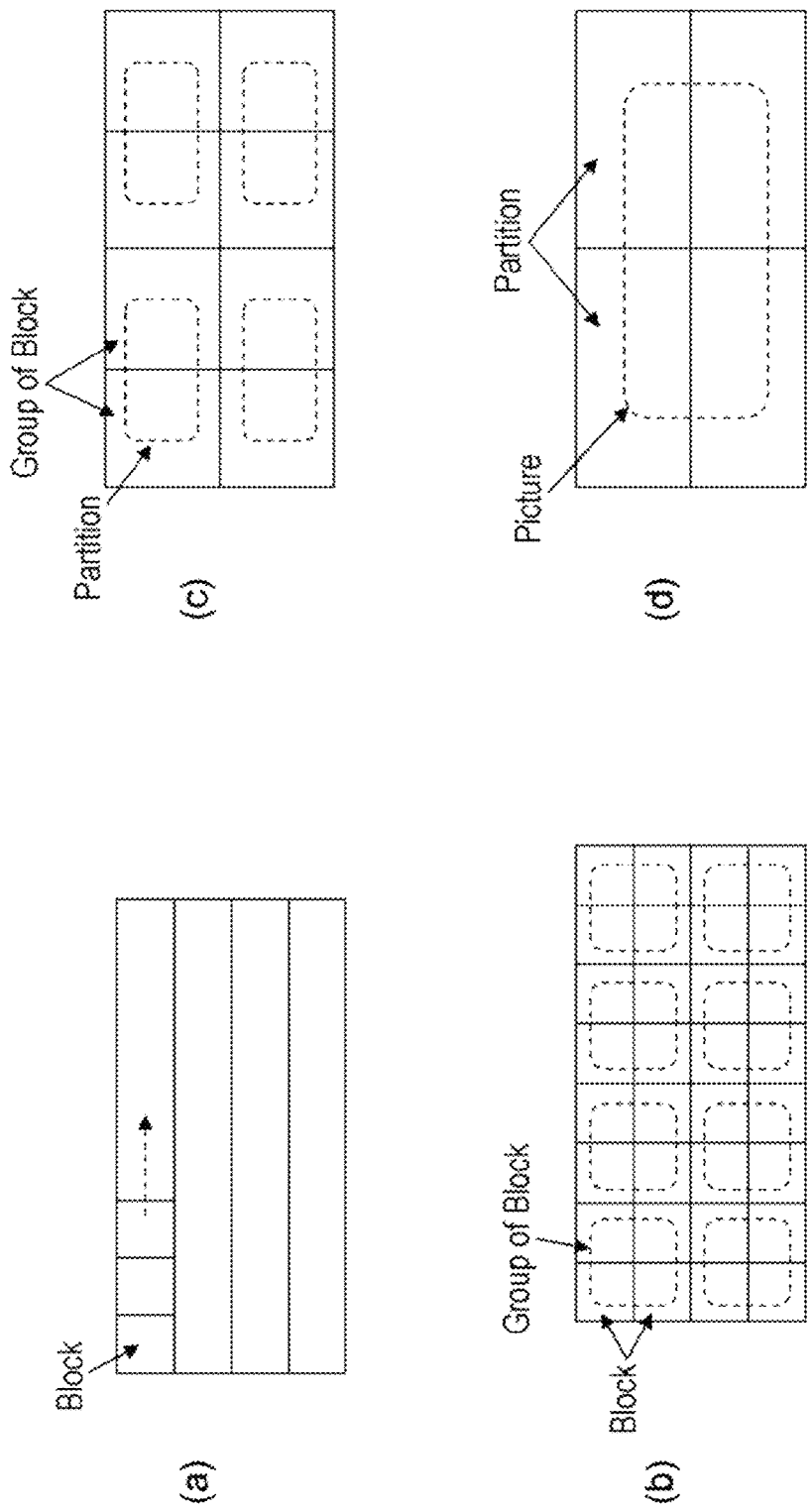
FIG. 4 includes diagrams describing an example of a downsizing process for obtaining disparity information about certain partitioned areas from disparity information about individual blocks.

FIG. 4 illustrates an example of a downsizing process. FIG. 4(a) illustrates disparity information about each block obtained in the manner described above. On the basis of the disparity information about each block, first disparity information and second disparity information about each group (Group Of Block) are obtained, as illustrated in FIG. 4(b). A group corresponds to a higher layer of blocks, and is obtained by grouping a plurality of adjacent blocks. In the example in FIG. 4(b), each group is constituted by four blocks grouped together by a broken-line frame. Then, first disparity information about each group is obtained, for example, by selecting, from among pieces of disparity information about all the blocks in the group, a piece of disparity information having a minimum value. Also, second disparity information about each group is obtained, for example, by selecting, from among pieces of disparity information about all the blocks in the group, a piece of disparity information having a maximum value.

Subsequently, on the basis of disparity vectors of the individual groups, first disparity information and second disparity information about each partition is obtained, as illustrated in FIG. 4(c). A partition corresponds to a higher layer of groups, and is obtained by grouping a plurality of adjacent groups. In the example in FIG. 4(c), each partition is constituted by two groups grouped together by a broken-line frame. Then, first disparity information about each partition is obtained, for example, by selecting, from among pieces of first disparity information about all the groups in the partition, a piece of first disparity information having a minimum value. Also, second disparity information about each partition is obtained, for example, by selecting, from among pieces of second disparity information about all the groups in the partition, a piece of second disparity information having a maximum value.

Subsequently, on the basis of the disparity information about the individual partitions, first disparity information and second disparity information about an entire picture (an entire picture display screen) positioned in the highest layer are obtained, as illustrated in FIG. 4(d). In the example in FIG. 4(d), the entire picture includes four partitions grouped together by a broken-line frame. Then, first disparity information about the entire picture is obtained, for example, by selecting, from among pieces of first disparity information about all the partitions included in the entire picture, a piece of first disparity information having a minimum value. Also, second disparity information about the entire picture is obtained, for example, by selecting, from among pieces of second disparity information about all the partitions included in the entire picture, a piece of second disparity information having a maximum value.

Figure 5:
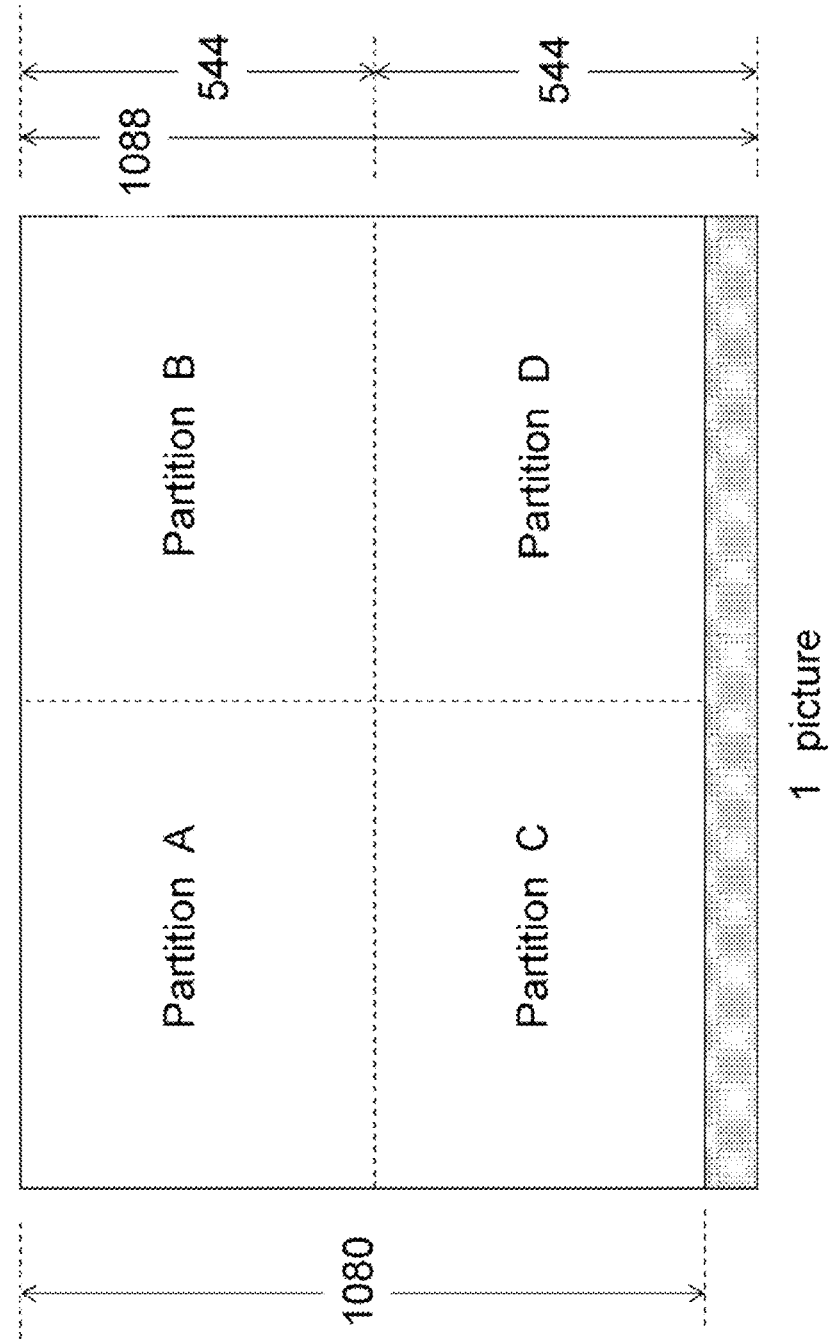
FIG. 5 is a diagram describing that a picture display screen is partitioned so that a partitioned area does not straddle a border between encoding blocks.

The picture display screen is partitioned on the basis of partition information, and disparity information about each partitioned area is obtained, as described above. In this case, the picture display screen is partitioned such that a partitioned area does not straddle a boundary between encoding blocks. FIG. 5 illustrates a detailed example of partitioning a picture display screen. This example is an example of a 1920*1080 pixel format, and is an example in which the picture display screen is partitioned into two areas in each of the horizontal and vertical directions, so that four partitioned areas, that is, Partition A, Partition B, Partition C, and Partition D, are obtained. On a transmitting side, encoding is performed in units of 16×16 blocks, and thus eight lines formed of blank data are added, and encoding is performed on image data of 1920 pixels*1088 lines. Thus, regarding the vertical direction, the picture display screen is partitioned into two areas on the basis of 1088 lines.

Figure 6:
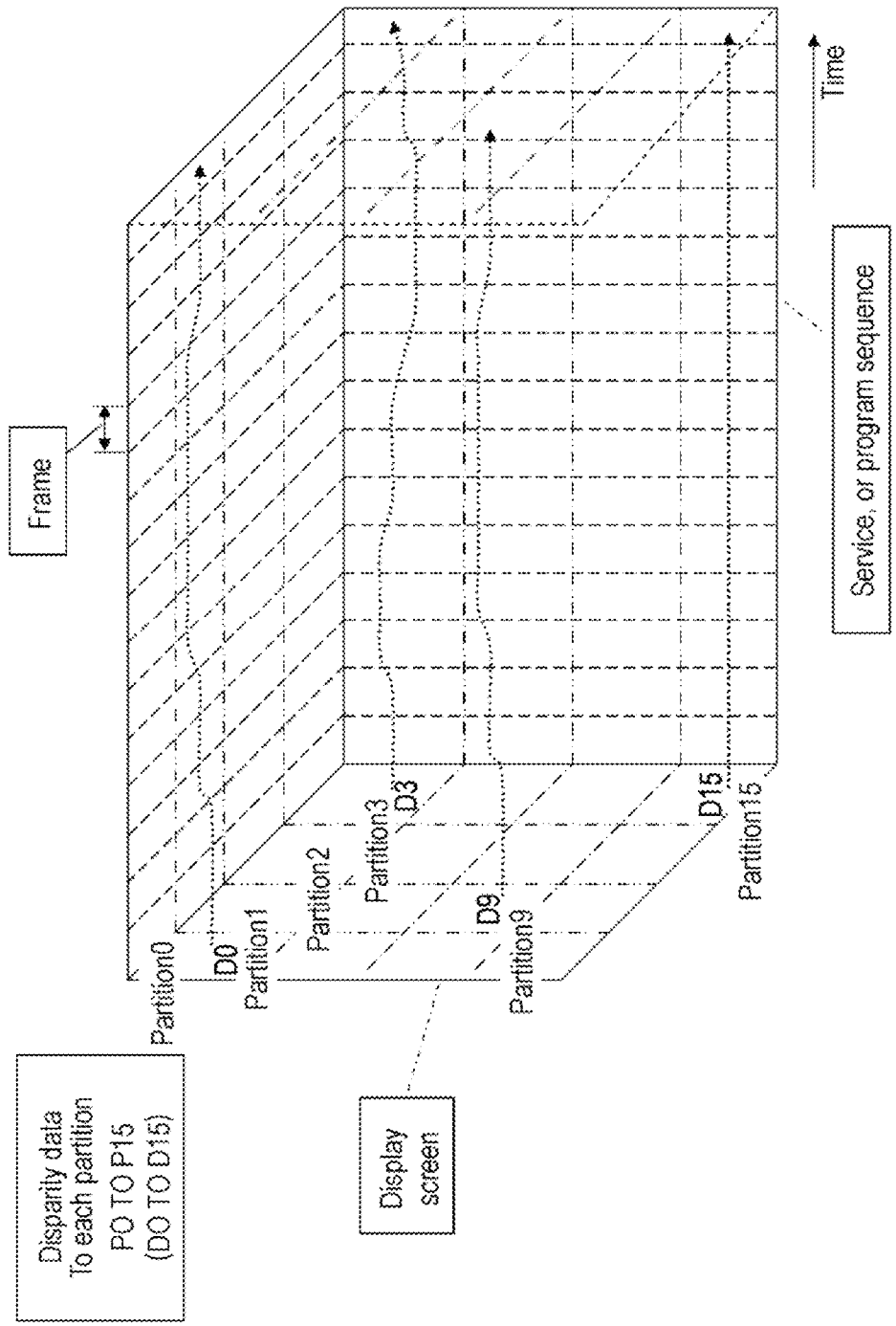
FIG. 6 is a diagram schematically illustrating an example of transitions of disparity information in individual partitioned areas of each picture.

As described above, disparity information (first disparity information and second disparity information) about the entire picture display screen or each partitioned area (Partition), which is obtained for each of certain pictures (frames) of image data, is inserted into a video stream. FIG. 6 schematically illustrates an example of transitions of disparity information about individual partitioned areas. In this example, the picture display screen is partitioned into four areas in each of the horizontal and vertical directions, so that sixteen partitioned areas, that is, Partition 0 to Partition 15, exist. In this example, for simplifying the figure, only transitions of pieces of disparity information D0, D3, D9, and D15 about Partition 0, Partition 3, Partition 9, and Partition 15 are illustrated. The values of the pieces of disparity information may change over time (D0, D3, and D9) or may be fixed (D15).

Figure 7:
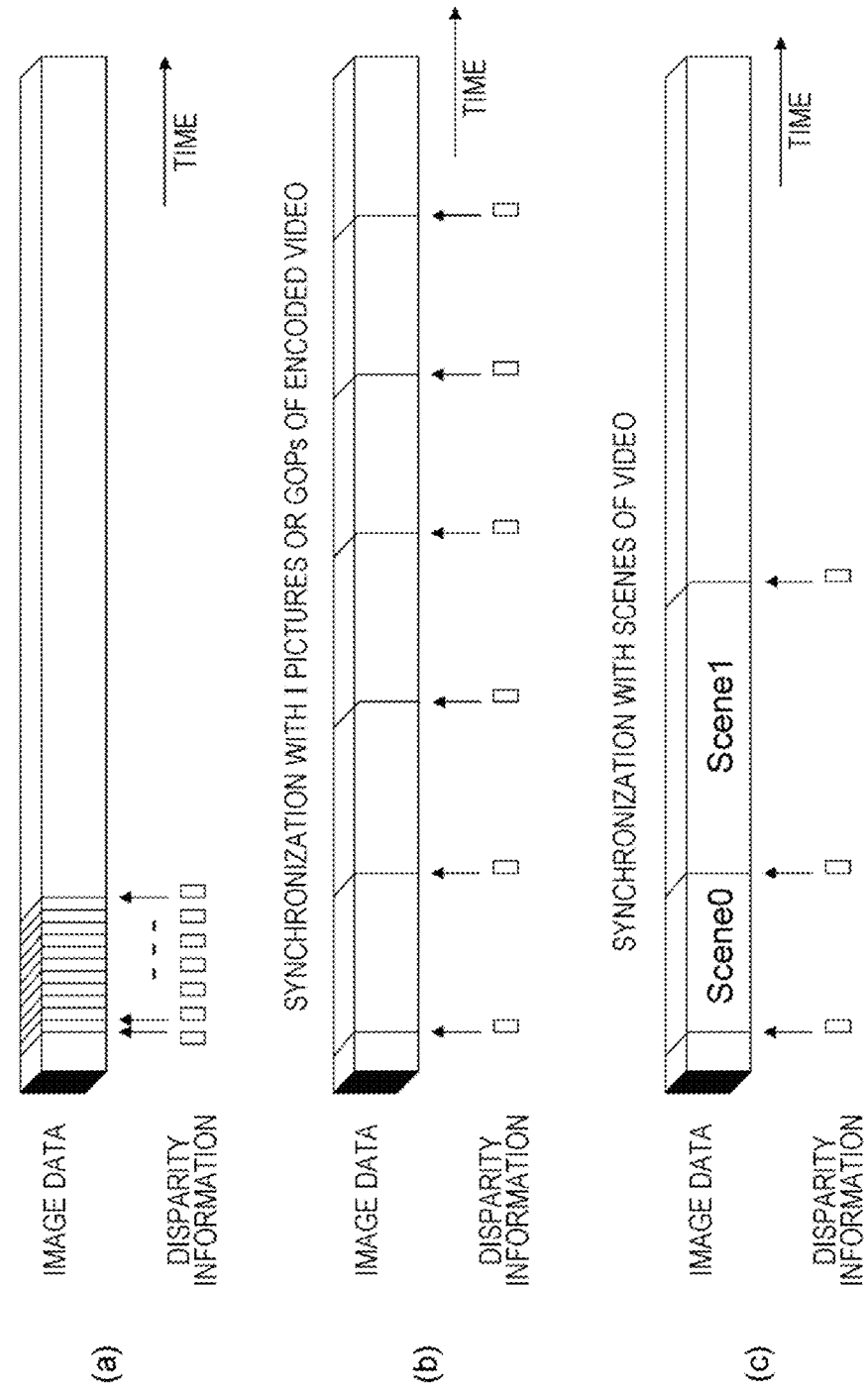
FIG. 7 includes diagrams describing timings to insert disparity information, which is obtained for each picture of image data, into a video stream.

Disparity information obtained for each of certain pictures of image data is inserted into a video stream in units of pictures, in units of GOPs, or the like. FIG. 7(a) illustrates an example of synchronization with picture encoding, that is, an example in which disparity information is inserted into a video stream in units of pictures. In this example, a delay that occurs at the time of transmitting image data is small, which is suitable for live broadcasting in which image data captured by a camera is transmitted.

FIG. 7(b) illustrates an example of synchronization with I pictures (Intra pictures) or GOPs (Groups Of Pictures) of encoded video, that is, an example in which disparity information is inserted into a video stream in units of GOPs. In this example, a larger delay occurs at the time of transmitting image data than in the example in FIG. 7(a). However, pieces of disparity information about a plurality of pictures (frames) are collectively transmitted, so that the number of processes of obtaining disparity information on a receiving side can be reduced. FIG. 7(c) illustrates an example of synchronization with scenes of video, that is, an example in which disparity information is inserted into a video stream in units of scenes. Note that the examples in FIG. 7(a) to FIG. 7(c) are merely examples, and disparity information may be inserted in units of other units.

Alternatively, identification information for identifying whether or not a video stream includes disparity information (first disparity information and second disparity information) inserted thereinto may be inserted into a layer of a transport stream TS. The identification information is inserted, for example, under a program map table (PMT) or an event information table (EIT) included in the transport stream TS. The identification information enables a receiving side to easily identify whether or not the video stream includes disparity information inserted thereinto. The details of the identification information will be described below.

"Example Configuration of Transmission Data Generating Unit"

Figure 8:
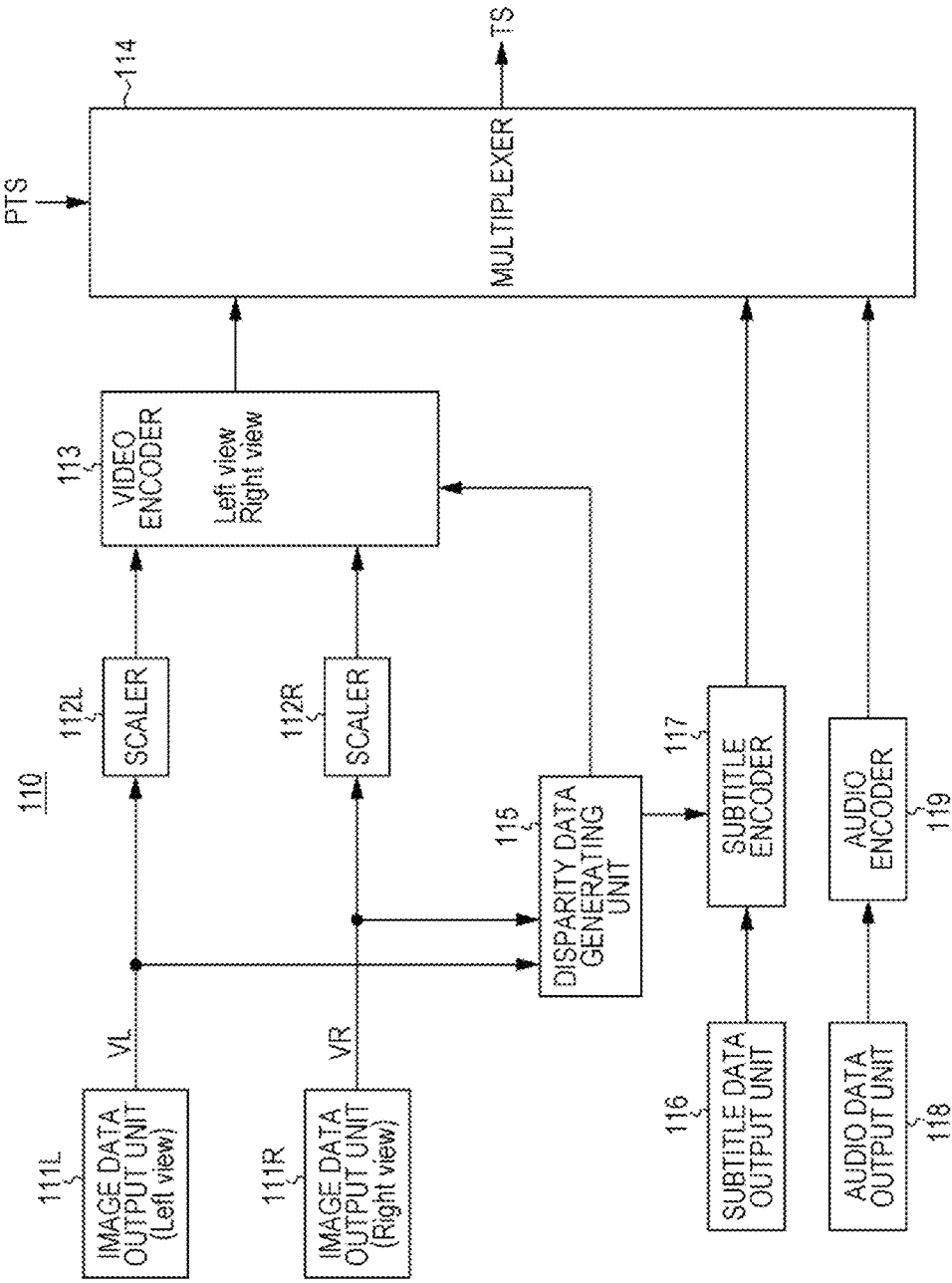
FIG. 8 is a block diagram illustrating an example configuration of a transmission data generating unit that generates a transport stream in a broadcast station.

FIG. 8 illustrates an example configuration of a transmission data generating unit 110 that generates the above-described transport stream TS in the broadcast station 100. The transmission data generating unit 110 includes image data output units 111L and 111R, scalers 112L and 112R, a video encoder 113, a multiplexer 114, and a disparity data generating unit 115. The transmission data generating unit 110 also includes a subtitle data output unit 116, a subtitle encoder 117, an audio data output unit 118, and an audio encoder 119.

The image data output units 111L and 111R respectively output left-eye image data VL and right-eye image data VR which form a stereo image. The image data output units 111L and 111R are constituted by, for example, a camera that captures an image of a subject and outputs image data, an image data reader that reads out image data from a storage medium and outputs the image data, or the like. Each of the image data VL and the image data VR is, for example, image data having a full HD size of 1920*1080.

The scalers 112L and 112R respectively perform a scaling process on the image data VL and the image data VR in the horizontal direction or vertical direction if necessary. For example, in the case of forming image data of a side-by-side format or a top-and-bottom format in order to transmit the image data VL and the image data VR as one video stream, the scalers 112L and 112R respectively scale down the image data VL and the image data VR to one-half in the horizontal direction or vertical direction, and output the scaled down image data. Alternatively, for example, in the case of transmitting the image data VL and the image data VR as different video streams, such as an MVC base view stream and an MVC nonbase view stream, the scalers 112L and 112R respectively output the image data VL and the image data VR as they are, without performing a scaling process thereon.

The video encoder 113 performs encoding on the left-eye image data and the right-eye image data output from the scalers 112L and 112R, in accordance with, for example, MPEG-4 AVC (MVC), MPEG-2 video, or HEVC (High Efficiency Video Coding), thereby obtaining encoded video data. Also, the video encoder 113 generates a video stream including the encoded data by using a stream formatter (not illustrated) provided in the subsequent stage. In this case, the video encoder 113 generates one or two video streams (video elementary streams) including the encoded video data of the left-eye image data and the right-eye image data.

The disparity data generating unit 115 generates disparity information for each picture (frame) on the basis of the left-eye image data VL and the right-eye image data VR output from the image data output units 111L and 111R. The disparity data generating unit 115 obtains, for each picture, disparity information about each block, as described above. Note that, in a case where the image data output units 111L and 111R are constituted by an image data reader including a storage medium, the disparity data generating unit 115 may be configured to read out disparity information about each block from the storage medium together with image data, so as to obtain the disparity information. Alternatively, a method for detecting disparity information by using a result of block matching performed between the right-eye image data and the left-eye image data in the video encoder 113 may be used.

Furthermore, the disparity information generating unit 115 performs a downsizing process on disparity information about each block, thereby generating first disparity information and second disparity information about an entire picture display screen or each of partitioned areas (Partitions) obtained by partitioning the picture display screen. Note that information about a method for obtaining first disparity information and second disparity information is given to the disparity information generating unit 115 by, for example, a user operation. That is, information about generation of disparity information about the entire picture display screen, or generation of disparity information about each of partitioned areas obtained by partitioning the picture display screen into a certain number of areas, is given.

The video encoder 113 inserts first disparity information and second disparity information about each picture generated by the disparity data generating unit 115 into a video stream. In this case, for example, disparity information about each picture is inserted into the video stream in units of pictures or in units of GOPs (see FIG. 7). Note that, in a case where left-eye image data and right-eye image data are transmitted as different pieces of video data, the disparity information may be inserted into only any one of the video streams.

The subtitle data output unit 116 outputs data of a subtitle (caption) to be overlaid on an image. The subtitle data output unit 116 is constituted by, for example, a personal computer or the like. The subtitle encoder 117 generates a subtitle stream (subtitle elementary stream) including the subtitle data output from the subtitle data output unit 116. Note that the subtitle encoder 117 refers to disparity information about each block generated by the disparity data generating unit 115, and adds disparity information corresponding to a display position of the subtitle to the subtitle data. That is, the subtitle data included in the subtitle stream includes disparity information corresponding to the display position of the subtitle.

The audio data output unit 118 outputs audio data corresponding to image data. The audio data output unit 118 is constituted by, for example, a microphone or an audio data reader that reads out audio data from a storage medium and outputs the audio data. The audio encoder 119 performs encoding on the audio data output from the audio data output unit 118 in accordance with MPEG-2 Audio, AAC, or the like, thereby generating an audio stream (audio elementary stream).

The multiplexer 114 forms the elementary streams generated by the video encoder 113, the subtitle encoder 117, and the audio encoder 119 into PES packets and multiplexes the PES packets, thereby generating a transport stream TS. In this case, a PTS (Presentation Time Stamp) is inserted into the header of each PES (Packetized Elementary Stream) packet, for synchronized reproduction on a receiving side.

The multiplexer 114 inserts the above-described identification information into a layer of the transport stream TS. The identification information is information for identifying whether or not the video stream includes disparity information (first disparity information and second disparity information) inserted thereinto. The identification information is inserted, for example, under a program map table (PMT), an event information table (EIT), or the like included in the transport stream TS.

The operation of the transmission data generating unit 110 illustrated in FIG. 8 will be briefly described. The left-eye image data VL and the right-eye image data VR that are output from the image data output units 111L and 111R and form a stereo image are respectively supplied to the scalers 112L and 112R. The scalers 112L and 112R perform a scaling process in the horizontal direction or vertical direction on the image data VL and the image data VR, respectively, if necessary. The left-eye image data and the right-eye image data output from the scalers 112L and 112R are supplied to the video encoder 113.

In the video encoder 113, encoding is performed on the left-eye image data and the right-eye image data in accordance with, for example, MPEG-4 AVC (MVC), MPEG-2 video, HEVC, or the like, so that encoded video data is obtained. Also, in the video encoder 113, a video stream including the encoded data is generated by a stream formatter provided in the subsequent state. In this case, one or two video streams including the encoded video data of the left-eye image data and the right-eye image data are generated.

Further, the left-eye image data VL and the right-eye image data VR that are output from the image data output units 111L and 111R and form a stereo image are supplied to the disparity data generating unit 115. In the disparity data generating unit 115, disparity information about each block is obtained for each picture. Further, in the disparity data generating unit 115, a downsizing process is performed on disparity information about each block, so that first disparity information and second disparity information about the entire picture display screen or each of partitioned areas obtained by partitioning the picture display screen are generated.

The first disparity information and the second disparity information for each picture generated by the disparity data generating unit 115 are supplied to the video encoder 113. In the video encoder 113, the first disparity information and the second disparity information for each picture are inserted into the video stream in units of pictures or in units of GOPs.

Further, the subtitle data output unit 116 outputs data of a subtitle (caption) to be overlaid on an image. The subtitle data is supplied to the subtitle encoder 117. In the subtitle encoder 117, a subtitle stream including the subtitle data is generated. In this case, in the subtitle encoder 117, disparity information about each block generated by the disparity data generating unit 115 is referred to, and disparity information corresponding to a display position is added to the subtitle data.

Further, the audio data output unit 118 outputs audio data corresponding to image data. The audio data is supplied to the audio encoder 119. In the audio encoder 119, encoding is performed on the audio data in accordance with MPEG-2 Audio, AAC, or the like, so that an audio stream is generated.

The video stream obtained by the video encoder 113, the subtitle stream obtained by the subtitle encoder 117, and the audio stream obtained by the audio encoder 119 are supplied to the multiplexer 114. In the multiplexer 114, the elementary streams supplied from the individual encoders are formed into PES packets and the PES packets are multiplexed, so that a transport stream TS is generated. In this case, a PTS is inserted into each PES header, for synchronized reproduction on a receiving side. Also, in the multiplexer 114, identification information for identifying whether or not the video stream includes disparity information inserted thereinto is inserted, for example, under PMT, or under EIT.

[Identification Information, Structure of Disparity Information, and TS Configuration]

Figure 9:
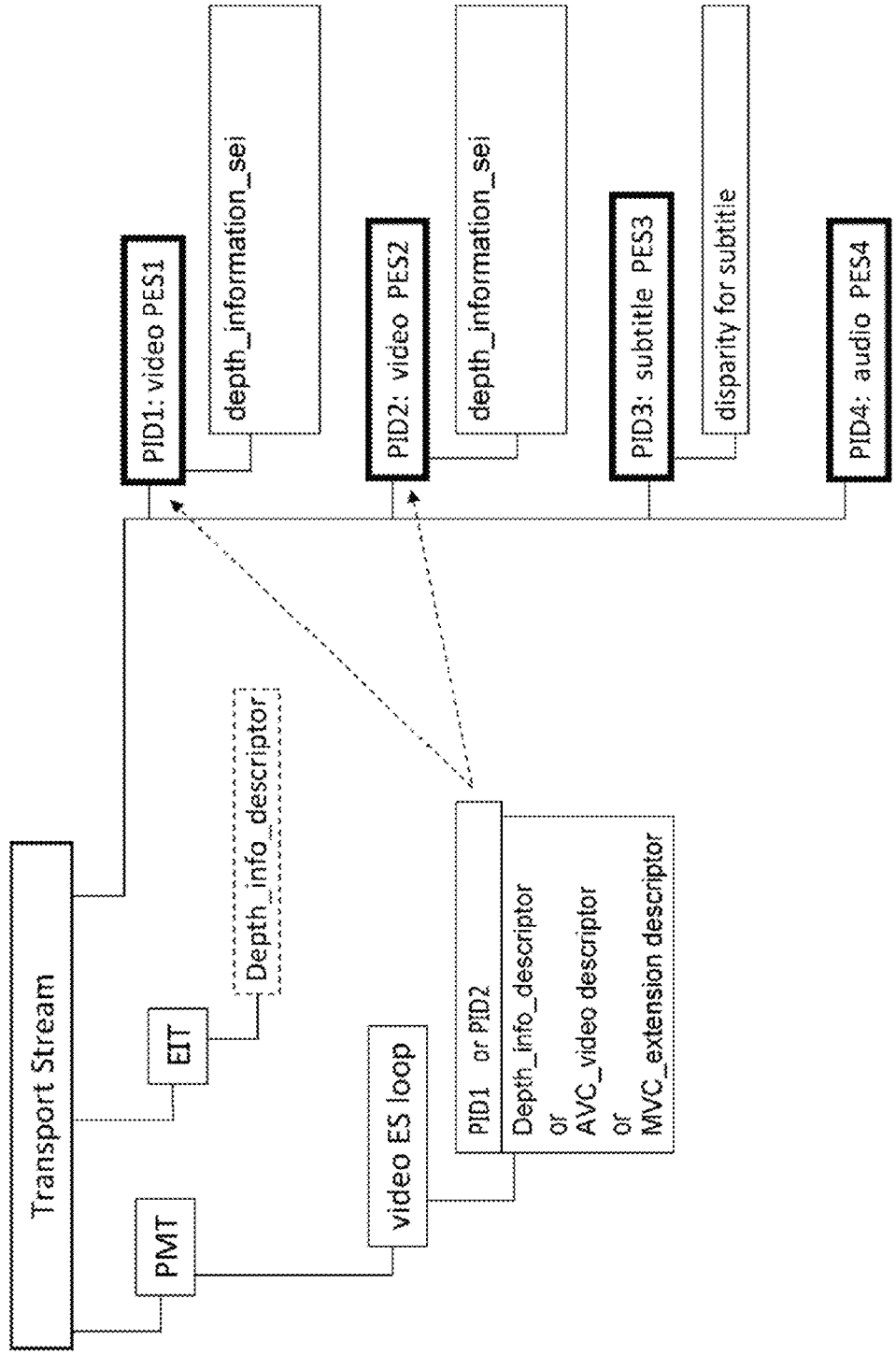
FIG. 9 is a diagram illustrating an example configuration of a transport stream.

FIG. 9 illustrates an example configuration of a transport stream TS. In this example configuration, left-eye image data and right-eye image data are transmitted as different video streams. That is, a PES packet "video PES1" of a video stream generated by encoding left-eye image data and a PES packet "video PES2" of a video stream generated by encoding right-eye image data are included. Also, in this example configuration, a PES packet "subtitle PES3" of a subtitle stream generated by encoding subtitle data (including disparity information) and a PES packet "audio PES4" of an audio stream generated by encoding audio data are included.

In a user data area of a video stream, depth information SEI (depth_information_sei( )) including first disparity information and second disparity information for each picture has been inserted. For example, in a case where disparity information for each picture is inserted in units of pictures, the depth information SEI is inserted into a user data area of each picture of a video stream. Also, for example, in a case where disparity information for each picture is inserted in units of GOPs, the depth information SEI is inserted into a user data area of a picture corresponding to the head of a GOP of a video stream or a position at which sequence parameter information is inserted. Note that, although depth information SEI is inserted into both of the two video streams in this example configuration, depth information SEI may be inserted into only one of the video streams.

The transport stream TS includes a PMT (Program Map Table) serving as PSI (Program Specific Information). The PSI is information indicating to which program each elementary stream included in the transport stream TS belongs. Also, the transport stream TS includes an EIT (Event Information Table) serving as SI (Serviced Information) that manages event units.

Under the PMT, an elementary loop having information related to each elementary stream exists. In this elementary loop, information such as a packet identifier (PID) is located for each stream, and also a descriptor describing information related to the elementary stream is located.

In the above-described case of inserting identification information identifying whether or not the video stream includes disparity information (first disparity information and second disparity information) inserted thereinto, the identification information is described, for example, in a descriptor inserted under a video elementary loop of the program map table. This descriptor is, for example, an existing AVC video descriptor (AVC video descriptor) or an MVC extension descriptor (MVC_extension_descriptor), or a newly defined depth info descriptor (Depth_info_descriptor). Note that the depth info descriptor may be inserted under the EIT, as indicated by broken lines in the figure.

FIG. 10(a) illustrates an example structure (Syntax) of an AVC video descriptor in which identification information is described. This descriptor is applicable in a case where video is of an MPEG-4 AVC frame compatible format. This descriptor has already been included in the H.264/AVC standard. Here, 1-bit flag information "depth_info_not_existed_flag [0]" is newly defined in this descriptor.

As shown in the definition content (semantics) in FIG. 10(b), the flag information indicates whether or not the corresponding video stream includes, inserted thereinto, depth information SEI (depth_information_sei( )) including disparity information for each picture. If the flag information is "0", it indicates that the video stream includes depth information SEI. On the other hand, if the flag information is "1", it indicates that the video stream does not include depth information SEI.

FIG. 11(a) illustrates an example structure (Syntax) of an MVC extension descriptor in which identification information is described. This descriptor is applicable in a case where video is of an MPEG-4 AVC Annex H MVC format. This descriptor has already been included in the H.264/AVC standard. Here, 1-bit flag information "depth_info_not_existed_flag" is newly defined in this descriptor.

As shown in the definition content (semantics) in FIG. 11(b), the flag information indicates whether or not the corresponding video stream includes, inserted thereinto, depth information SEI (depth_information_sei( )) including disparity information for each picture. If the flag information is "0", it indicates that the video stream includes depth information SEI. On the other hand, if the flag information is "1", it indicates that the video stream does not include depth information SEI.

FIG. 12(a) illustrates an example structure (Syntax) of a depth info descriptor (depth_info_descriptor). An 8-bit field "descriptor_tag" indicates that this descriptor is "depth_info_descriptor". An 8-bit field "descriptor_length" indicates the number of bytes of the subsequent data. Also, in this descriptor, 1-bit flag information "depth_info_not_existed_flag" is described.

As shown in the definition content (semantics) in FIG. 12(b), the flag information indicates whether or not the corresponding video stream includes, inserted thereinto, depth information SEI (depth_information_sei( )) including disparity information for each picture. If the flag information is "0", it indicates that the video stream includes depth information SEI. On the other hand, if the flag information is "1", it indicates that the video stream does not include depth information SEI.

Next, a description will be given of the case of inserting depth information SEI (depth_information_sei( )) including disparity information for each picture into a user data area of a video stream.

Figure 13:
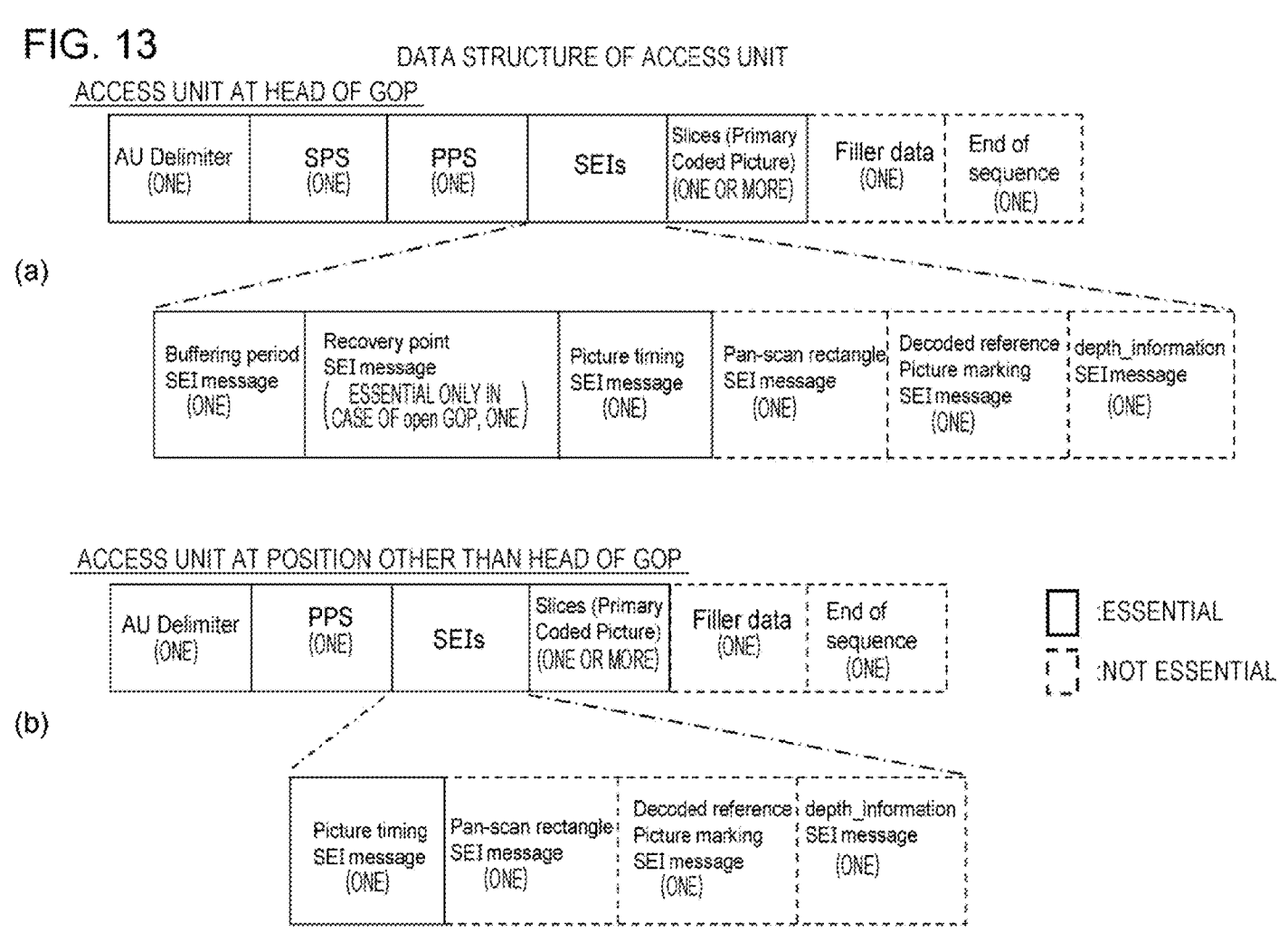

For example, in a case where the encoding scheme is AVC, "depth_information_sei( )" is inserted as "depth_information SEI message" into the portion of "SEIs" of an access unit. FIG. 13(a) illustrates an access unit at the head of a GOP (Group Of Pictures), and FIG. 13(b) illustrates an access unit at the position other than the head of a GOP. In a case where disparity information for each picture is inserted in units of GOPs, "depth_information SEI message" is inserted into only the access unit at the head of a GOP.

FIG. 14(a) illustrates an example structure (Syntax) of "depth_information SEI message". "uuid_iso_iec_11578" has an UUID value indicated by "ISO/IEC 11578:1996 AnnexA.". "depth_information_sei_data( )" is inserted into the field "under_data_payload_byte". FIG. 14(b) illustrates an example structure (Syntax) of "depth_information_sei_data( )". Depth information SEI (depth_information_sei( )) is inserted thereinto. "userdata_id" is an identifier of "depth_information_sei ( )" represented by unsigned 16 bits.

Each of FIG. 15, FIG. 16, and FIG. 17 illustrates an example structure (Syntax) of "depth_information_sei( )" in the case of inserting disparity information for each picture in units of pictures. FIG. 18 illustrates the content (Semantics) of main information in these example structures.

FIG. 15 illustrates an example structure (Syntax) corresponding to the above-described obtaining method (1) "first disparity information about each of partitioned areas, which are obtained by partitioning a picture display screen using partition information, is obtained, and second disparity information about the entire picture display screen is obtained".

A 3-bit field "partition_type" indicates the partition type of a picture display screen. "000" indicates that the picture display screen is not partitioned, "001" indicates that the picture display screen is partitioned into two equal areas in each of the horizontal direction and vertical direction, and "010" indicates that the picture display screen is partitioned into four equal areas in each of the horizontal direction and vertical direction.

A 4-bit field "partition_count" indicates the total number of partitioned areas (Partitions), which is a value dependent on the above-described "partition_type". For example, in a case where "partition_type=000", the total number of partitioned areas (Partitions) is "1", as illustrated in FIG. 19(a). Also, for example, in a case where "partition_type=001", the total number of partitioned areas (Partitions) is "4", as illustrated in FIG. 19(b). Also, for example, in a case where "partition_type=010", the total number of partitioned areas (Partitions) is "16", as illustrated in FIG. 19(c).

An 8-bit field "max_disparity_in_picture" indicates second disparity information about the entire picture display screen, that is, the maximum disparity information (disparity value) about the entire picture. An 8-bit field "min_disparity_in_partition" indicates first disparity information about each partitioned area (Partition), that is, the minimum disparity information (disparity value) about each partitioned area.

FIG. 16 illustrates an example structure (Syntax) corresponding to the above-described obtaining method (2) "first disparity information and second disparity information about each of partitioned areas, which are obtained by partitioning a picture display screen using partition information, are obtained". In FIG. 16, a description of the parts corresponding to those in FIG. 15 is omitted as appropriate.

A 3-bit field "partition_type" indicates the partition type of the picture display screen. A 4-bit field "partition_count" indicates the total number of partitioned areas (Partitions), which is a value dependent on the above-described "partition_type". An 8-bit field "max_disparity_in_partition" indicates second disparity information about each partitioned area (Partition), that is, the maximum disparity information (disparity value) about each partitioned area. An 8-bit field "min_disparity_in_partition" indicates first disparity information about each partitioned area (Partition), that is, the minimum disparity information (disparity value) about each partitioned area.

FIG. 17 illustrates an example structure (Syntax) corresponding to the above-described obtaining method (3) "first disparity information about each of partitioned areas, which are obtained by partitioning a picture display screen using first partition information, is obtained, and second disparity information about each of partitioned areas, which are obtained by partitioning the picture display screen using second partition information, is obtained". In FIG. 17, a description of the parts corresponding to those in FIG. 15 and FIG. 16 is omitted as appropriate.

A 3-bit field "partition_type" indicates the partition type of the picture display screen regarding obtainment of first disparity information. A 4-bit field "min_partition_count" indicates the total number of partitioned areas (Partitions) in which first disparity information is obtained, which is a value dependent on the above-described "partition_type". An 8-bit field "min_disparity_in_partition" indicates first disparity information about each partitioned area (Partition), that is, the minimum disparity information (disparity value) about each partitioned area.

A 4-bit field "max_partition_count" indicates the total number of partitioned areas (Partitions) in which second disparity information is obtained. An 8-bit field "max_disparity_in_partition" indicates second disparity information about each partitioned area (Partition), that is, the maximum disparity information (disparity value) about each partitioned area.

Each of FIG. 20, FIG. 21, and FIG. 22 illustrates an example structure (Syntax) of "depth_information_sei( )" in the case of collectively encoding a plurality of pictures, such as the case of inserting disparity information for each picture in units of GOPs. FIG. 18 illustrates the content (Semantics) of main information in these example structures.

FIG. 20 illustrates an example structure (Syntax) corresponding to the above-described obtaining method (1) "first disparity information about each of partitioned areas, which are obtained by partitioning a picture display screen using partition information, is obtained, and second disparity information about the entire picture display screen is obtained". In FIG. 20, a detailed description of the parts corresponding to those in FIG. 15 is omitted as appropriate.

A 6-bit field "picture_count" indicates the number of pictures. The "depth_information_sei( )" includes pieces of first disparity information and second disparity information, the number of which corresponds to the number of pictures. A 4-bit field "partition_count" indicates the total number of partitioned areas (Partitions). An 8-bit field "max_disparity_in_picture" indicates second disparity information about the entire picture display screen, that is, the maximum disparity information (disparity value) about the entire picture. An 8-bit field "min_disparity_in_partition" indicates first disparity information about each partitioned area (Partition), that is, the minimum disparity information (disparity value) about each partitioned area. Although a detailed description is omitted, the other part of the example structure illustrated in FIG. 20 is the same as the example structure illustrated in FIG. 15.

FIG. 21 illustrates an example structure (Syntax) corresponding to the above-described obtaining method (2) "first disparity information and second disparity information about each of partitioned areas, which are obtained by partitioning a picture display screen using partition information, are obtained". In FIG. 21, a description of the parts corresponding to those in FIG. 16 and FIG. 20 is omitted as appropriate.

A 6-bit field "picture_count" indicates the number of pictures. The "depth_information_sei( )" includes pieces of first disparity information and second disparity information, the number of which corresponds to the number of pictures. A 4-bit field "partition_count" indicates the total number of partitioned areas (Partitions). An 8-bit field "max_disparity_in_partition" indicates second disparity information about each partitioned area (Partition), that is, the maximum disparity information (disparity value) about each partitioned area. An 8-bit field "min_disparity_in_partition" indicates first disparity information about each partitioned area (Partition), that is, the minimum disparity information (disparity value) about each partitioned area. Although a detailed description is omitted, the other part of the example structure in FIG. 21 is the same as the example structure illustrated in FIG. 16.

FIG. 22 illustrates an example structure (Syntax) corresponding to the above-described obtaining method (3) "first disparity information about each of partitioned areas, which are obtained by partitioning a picture display screen using first partition information, is obtained, and second disparity information about each of partitioned areas, which are obtained by partitioning the picture display screen using second partition information, is obtained". In FIG. 22, a description of the parts corresponding to those in FIG. 17, FIG. 20, and FIG. 21 is omitted as appropriate.

A 6-bit field "picture_count" indicates the number of pictures. The "depth_information_sei( )" includes pieces of first disparity information and second disparity information, the number of which corresponds to the number of pictures. A 4-bit field "min_partition_count" indicates the total number of partitioned areas (Partitions) in which first disparity information is obtained, and a 4-bit field "max_partition_count" indicates the total number of partitioned areas (Partitions) in which second disparity information is obtained.

An 8-bit field "min_disparity_in_partition" indicates first disparity information about each partitioned area (Partition), that is, the minimum disparity information (disparity value) about each partitioned area. An 8-bit field "max_disparity_in_partition" indicates second disparity information about each partitioned area (Partition), that is, the maximum disparity information (disparity value) about each partitioned area. Although a detailed description is omitted, the other part of the example structure illustrated in FIG. 22 is the same as the example structure illustrated in FIG. 17.

A description has been given above of the case where the encoding scheme is AVC. For example, in a case where the encoding scheme is MPEG-2 video, "depth_information_sei( )" is inserted as user data "user_data( )" into a user data area of a picture header portion. FIG. 23(a) illustrates an example structure (Syntax) of "user_data( )". A 32-bit field "user_data_start_code" is a start code of the user data (user_data), which is a fixed value "0x000001B2".

The 32-bit field subsequent to the start code is an identifier for identifying the content of user data. Here, the identifier is "depth_information_sei_data_identifier", which enables the user data to be identified as "depth_information_sei_data". As a data body after the identifier, "depth_information_sei_data( )" is inserted. FIG. 23(b) illustrates an example structure (Syntax) of "depth_information_sei_data( )". "depth_information_sei( )" is inserted thereinto (see FIG. 15 to FIG. 17 and FIG. 20 to FIG. 22).

A description has been given of an example of inserting disparity information into a video stream in a case where the encoding scheme is AVC or MPEG-2 video. Although a detailed description is omitted, disparity information may be inserted into a video stream using a similar structure also in another encoding scheme having a similar structure, such as HEVC.

"Another Example Configuration of Transmission Data Generating Unit"

Regarding the above-described transmission data generating unit 110 illustrated in FIG. 8, an example of inserting disparity information (first disparity information and second disparity information) for each picture generated by the disparity data generating unit 115 into a video stream as is has been described. However, disparity information for each picture may be inserted into a video stream after the amount of data thereof has been reduced by performing a compression encoding process.

Figure 24:
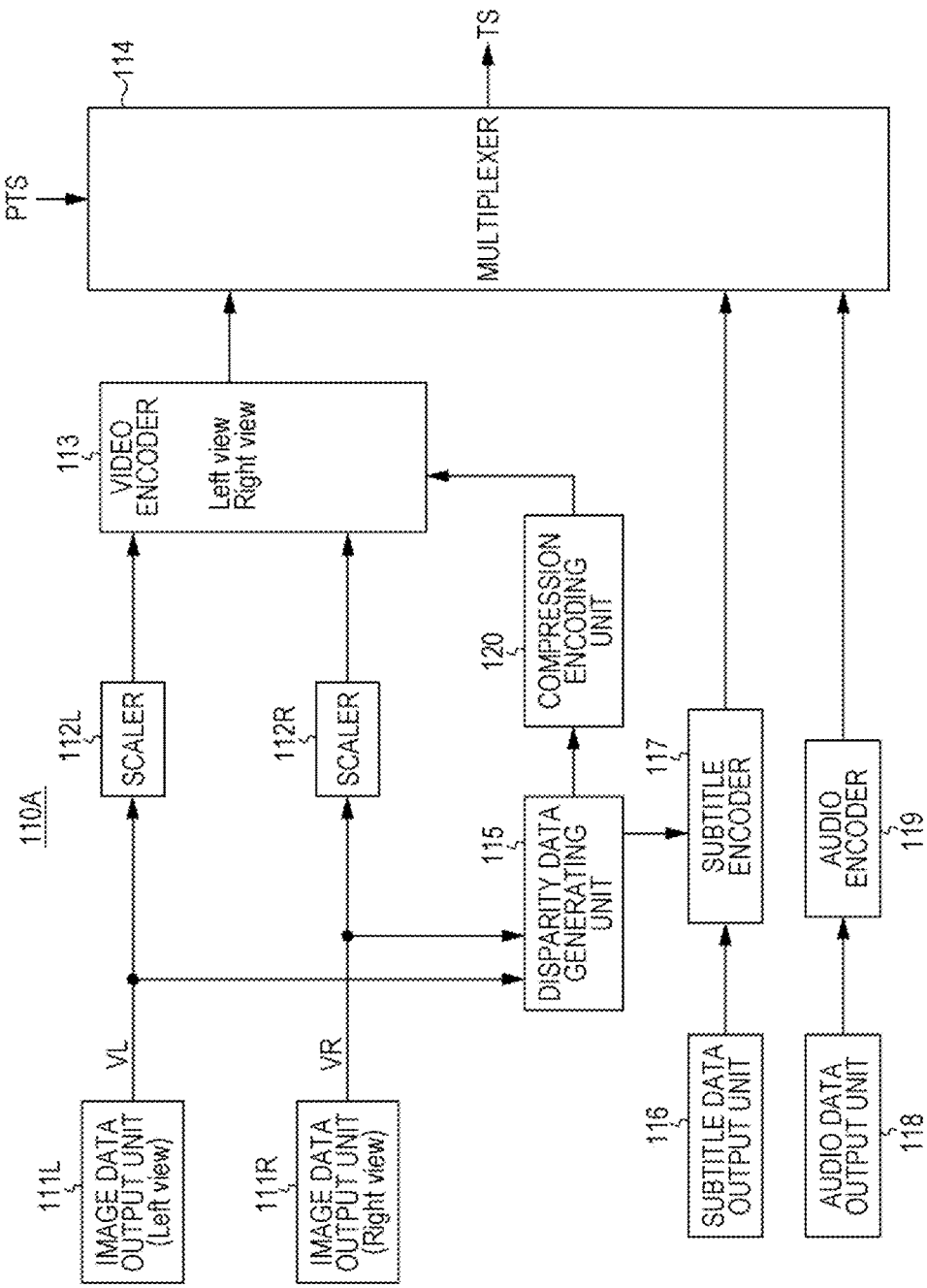
FIG. 24 is a block diagram illustrating another example configuration of the transmission data generating unit that generates a transport stream in the broadcast station.

FIG. 24 illustrates an example configuration of a transmission data generating unit 110A in that case. In FIG. 24, the parts corresponding to those in FIG. 8 are denoted by the same reference numerals, and the detailed description thereof is omitted. The transmission data generating unit 110A includes a compression encoding unit 120. The compression encoding unit 120 performs a compression encoding process on disparity information (first disparity information and second disparity information) for each picture generated by the disparity data generating unit 115, so as to reduce the amount of data.

The compression encoding unit 120 performs, for example, a process using a variable-length code as a compression encoding process. The video encoder 113 inserts disparity information (first disparity information and second disparity information) for each picture that has undergone compression encoding performed by the compression encoding unit 120 into a video stream. The other parts of the transmission data generating unit 110A illustrated in FIG. 24 are configured similarly to the transmission data generating unit 110 illustrated in FIG. 8, and operate in a similar manner.

Figures 25, 26:
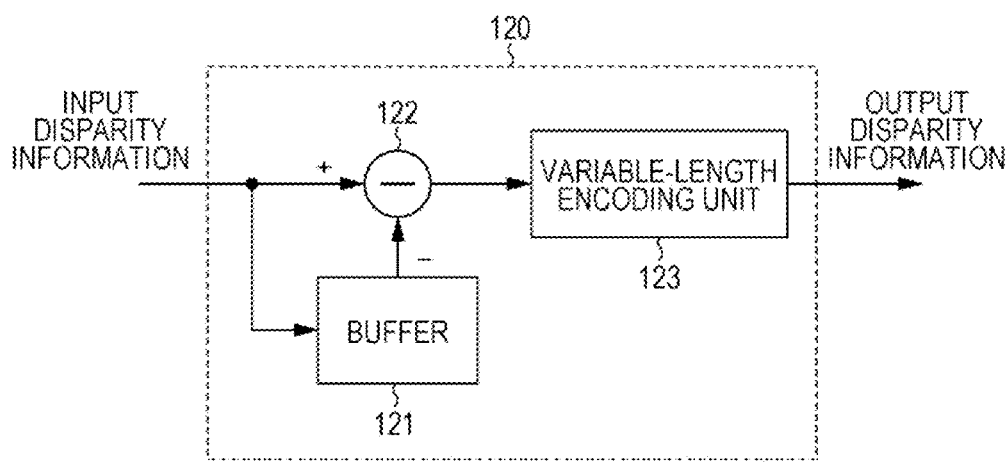
FIG. 25 is a block diagram illustrating an example of a schematic configuration of a compression encoding unit.
FIG. 26 is a diagram illustrating the configuration of "Exp-Golomb code se(v)" as a variable-length code.

FIG. 25 illustrates an example of a schematic configuration of the compression encoding unit 120. The compression encoding unit 120 includes a buffer 121, a subtracter 122, and a variable-length encoding unit 122. The buffer 121 temporarily stores disparity information for each picture input thereto. The subtracter 122 obtains difference data between pictures. The variable-length encoding unit 122 performs variable-length encoding. The variable-length encoding unit 120 uses, as a variable-length code, "Exp-Golomb code se(v)" illustrated in FIG. 26, for example, but another variable-length code may also be used.

The compression encoding unit 120 performs a compression encoding process in accordance with either a non-prediction type or a prediction type. First, a compression encoding process of a non-prediction type will be described. In this case, the encoding processing unit 120 performs variable-length encoding on disparity information for each picture input thereto. Thus, in the compression encoding process of the non-prediction type, in the compression encoding unit 120 illustrated in FIG. 25, disparity information for each picture input thereto is supplied as is to the variable-length encoding unit 123.

FIG. 27 illustrates the case of only the non-prediction type, in which prediction is not performed. FIG. 27(a) illustrates an example of display order of video slices of I pictures, P pictures, and B pictures. Disparity information for each picture (represented by "SEI" in the figure) exists for each video slice. FIG. 27(b) illustrates the decoding order (encoding order) of each picture. Disparity information for each picture undergoes variable-length encoding as is, that is, in the state of intra data (represented by "Intra" in the figure).

In the case of the non-prediction type, SEI prediction is not performed, and thus it is necessary to perform SEI buffering in units of access units. However, since SEI prediction is not performed, the encoding efficiency is lower than in the case of performing prediction.

Next, a compression encoding process of a prediction type will be described. In this case, in the encoding processing unit 120, among the pieces of disparity information for individual pictures input thereto, difference data between reference pictures and referenced pictures is obtained, and variable-length encoding is performed on the difference data. Thus, in the compression encoding process of the prediction type, in the compression encoding unit 120 illustrated in FIG. 25, difference data between reference pictures and referenced pictures is obtained by the subtracter 122, and is supplied to the variable-length encoding unit 123.

As the prediction type, the type of predictively referring to SEI in display order (prediction type 0) may be used. FIG. 28 illustrates the case of the prediction type 0. FIG. 28(a) illustrates an example of display order of video slices of I pictures, P pictures, and B pictures. In the figure, an arrow indicates a prediction target at the time of performing prediction. Disparity information for each picture (represented by "SEI" in the figure) exists for each video slice.

FIG. 28(b) illustrates the decoding order (encoding order) of each picture. Regarding disparity information for each picture, disparity information for an I picture undergoes variable-length encoding as is, that is, in the state of intra data (represented by "Intra" in the figure). Regarding disparity information for a B picture and a P picture, which follow the I picture, the immediately preceding picture in display order is regarded as a referenced picture and difference data is obtained (represented by "Delta" in the figure), and the difference data undergoes variable-length encoding. In FIG. 28(b), the arrow from each picture indicates the referenced picture that the picture refers to.

In the case of the prediction type 0, SEI prediction is performed in display order, and thus the value of difference data can be suppressed to be small and the encoding efficiency can be maximized. However, SEI prediction order does not match video encoding order, and thus it is necessary to keep SEI stored in the buffer. In addition, this is not suitable for special reproduction, such as B skip.

Also, the type of predictively referring to SEI in decoding order may be used as the prediction type. Further, as this prediction type, the type of performing SEI prediction in conjunction with a video picture type (prediction type 1) may be used. FIG. 29 illustrates the case of the prediction type 1. FIG. 29(a) illustrates an example of display order of video slices of I pictures, P pictures, and B pictures. Disparity information for each picture (represented by "SEI" in the figure) exists for each video slice.

FIG. 29(b) illustrates the decoding order of individual pictures. Disparity information for an I picture undergoes variable-length encoding as is, that is, in the state of intra data (represented by "Intra" in the figure). Regarding disparity information for a B picture and a P picture, which follow the I picture, a picture with a video picture type is regarded as a referenced picture in decoding order and difference data (represented by "Delta" in the figure) is obtained, and the difference data undergoes variable-length encoding. In FIG. 29(b), the arrow from each picture indicates the referenced picture that the picture refers to.

In the case of the prediction type 1, SEI prediction order matches video encoding order, including the picture type of video. This is suitable for live encoding, and is adaptable to special reproduction, such as B skip. However, SEI prediction is performed over a plurality of frames, and thus the encoding efficiency may be lower than that of the above-described prediction type 0.

Also, as the prediction type, the type of predictively referring to SEI in decoding order and referring to SEI that is decoded immediately previously (prediction type 2) may be used. FIG. 30 illustrates the case of the prediction type 2. FIG. 30(a) illustrates an example of display order of video slices of I pictures, P pictures, and B pictures. Disparity information for each picture (represented by "SEI" in the figure) exists for each video slice.

FIG. 30(b) illustrates the decoding order (encoding order) of each picture. Disparity information for an I picture undergoes variable-length encoding as is, that is, in the state of intra data (represented by "Intra" in the figure). Regarding disparity information for a B picture and a P picture, which follow the I picture, the immediately preceding picture in decoding order is regarded as a referenced picture and difference data (represented by "Delta" in the figure) is obtained, and the difference data undergoes variable-length encoding. In FIG. 30(b), the arrow from each picture indicates the referenced picture that the picture refers to.

In the case of the prediction type 2, SEI prediction order matches video encoding order, but SEI prediction does not depend on the picture type of video. This is suitable for live encoding, but SEI prediction is performed over a plurality of frames, and thus the encoding efficiency may be lower than that of the above-described prediction type 0.

Also, as the prediction type, the type of predictively referring to SEI in decoding order, performing SEI prediction with a video picture type, and transmitting disparity information for only referenced pictures, such as an I picture and a P picture (prediction type 3), may be used. FIG. 31 illustrates the case of the prediction type 3. FIG. 31(a) illustrates an example of display order of video slices of I pictures, P pictures, and B pictures. Disparity information for each picture (represented by "SEI" in the figure) exists for each video slice.

FIG. 31(b) illustrates the decoding order of individual pictures. Disparity information for an I picture undergoes variable-length encoding as is, that is, in the state of intra data (represented by "Intra" in the figure). Also, regarding disparity information for a P picture, and a referenced B picture (not illustrated) which follow the I picture, a picture with a video picture type is regarded as a referenced picture in decoding order and difference data (represented by "Delta" in the figure) is obtained, and the difference data undergoes variable-length encoding. In FIG. 31(b), the arrow from each picture indicates the referenced picture that the picture refers to. SEI information for a picture in which SEI information is not encoded (B picture) is interpolated by a decoder using two pieces of SEI information encoded by the preceding and subsequent referenced pictures in display order.

In the case of the prediction type 3, SEI prediction order matches video encoding order, including the picture type of video. This is suitable for live encoding, and is adaptable to special reproduction, such as B skip. Disparity information for only referenced pictures, such as an I picture, a P picture, and a referenced B picture, is encoded and transmitted, and thus the encoding efficiency increases. However, SEI prediction is performed over a plurality of frames, and thus the encoding efficiency is lower than that of the above-described prediction type 0. Further, non-encoded SEI information is interpolated and is allocated to each picture, and thus it is necessary to clearly present the number of pictures corresponding to a time distance to the picture for which disparity information is predicted.

In the case of transmitting an AVC video stream (frame compatible, or MVC) using an MPEG2-TS container, an AUD (Access Unit Delimiter) is attached to the head of each access unit. Information of an AUD is "primary_pic_type", and is represented by a value "primary_pic_type=1" in the case of I or P. This means that the corresponding access unit (normally I picture) is a referenced picture. The packet order of video is constituted by "AUD"-"SPS"-"PPS"-"SEI"-"Slice". Therefore, the decoder uses information of an AUD in order to correctly decode information about content of SEI before decoding "Slice". Note that, in the case of AVC, referenced pictures include a referenced B picture as well as an I picture and a P picture, as described above.

In the case of the above-described prediction type 3, disparity information for only referenced pictures, such as an I picture, a P picture, and a referenced B picture, is encoded and transmitted. Thus, on a decoder side (receiving side), disparity information for a picture whose disparity information is not transmitted is obtained by using, for example, interpolation based on disparity information for the preceding and subsequent pictures. For example, in FIG. 31(b), disparity information for pictures corresponding to B1 and B2 is obtained on the basis of the disparity information transmitted by "SEI0" and "SEI3". In a case where an interpolation value is a decimal fraction, a decoder (receiver) compatible with "subpixel disparity" is capable of performing dynamic update of a graphics display position more smoothly.

Each of FIG. 32, FIG. 33, and FIG. 34 illustrates an example structure (Syntax) of "depth_information_sei( )" in the case of inserting compression-encoded disparity information for each picture in units of pictures. FIG. 18 illustrates the content (Semantics) of main information in these examples of structures. Although a detailed description is omitted, these example structures are the same as the above-described example structures (Syntax) illustrated in FIG. 15, FIG. 16, and FIG. 17, except that disparity information has undergone compression encoding.

Each of FIG. 35, FIG. 36, and FIG. 37 illustrates an example structure (Syntax) of "depth_information_sei( )" in the case of collectively encoding a plurality of pictures, as in the case of inserting compression-encoded disparity information for each picture in units of GOPs. FIG. 18 illustrates the content (Semantics) of main information in these example structures. Although a detailed description is omitted, these example structures are the same as the above-described example structures (Syntax) illustrated in FIG. 20, FIG. 21, and FIG. 22, except that disparity information has undergone compression encoding.

FIG. 38 illustrates an example structure (Syntax) of "depth_information_sei( )" that is applicable in the case of the prediction type 3. FIG. 18 illustrates the content (Semantics) of main information in the example structure. A field "picture_count_for_skipping" indicates the number of pictures up to a preceding referenced picture with which disparity information is predicted. Note that the information in this field may be inserted after variable-length encoding has been performed on the number of pictures using, for example, "Exp-Golomb code ue(v)" illustrated in FIG. 39.

1-bit flag information "partition_enabled_flag" indicates whether or not the screen is partitioned. When the flag information is "1", it indicates that the picture display screen is partitioned. When the flag information is "0", it indicates that the screen is not partitioned. The flag information enables a receiving side to easily determine whether transmitted disparity information corresponds to the entire picture display screen or each of a plurality of partitioned areas.

Note that, in the above-described individual example structures (Syntax) illustrated in FIG. 15 to FIG. 17, FIG. 20 to FIG. 22, and FIG. 32 to FIG. 37, the 3-bit field "partition_type" may be replaced with the 1-bit flag information "partition_enabled_flag". Alternatively, the 3-bit field "partition_type" may be handled as flag information similar to "partition_enabled_flag". In that case, when any of the 3 bits is "1", it indicates that the picture display screen is partitioned. When all the 3 bits are "0", it indicates that the screen is not partitioned.

Referring back to FIG. 38, 1-bit flag information "Intra_disparity_flag" indicates whether or not the value of disparity information (disparity) is a non-prediction value (intra data). When the flag information is "1", it indicates that the value of disparity information is a non-prediction value (intra data). When the flag information is "0", it indicates that value of disparity information is prediction value (difference data). In addition, also in the above-described individual example structures (Syntax) illustrated in FIG. 32 to FIG. 37, the 1-bit flag information "Intra_disparity_flag" may further be added. In this case, a receiving side is capable of easily determining whether inserted disparity information is intra data or difference data.

A 4-bit field "partition_count" indicates the total number of partitioned areas (Partitions). A field "max_disparity_in_partition" indicates second disparity information about each partitioned area (Partition), that is, the maximum disparity information (disparity value) about each partitioned area. A field "min_disparity_in_partition" indicates first disparity information about each partitioned area (Partition), that is, the minimum disparity information (disparity value) about each partitioned area.

The example structure (Syntax) of "depth_information_sei( )" illustrated in FIG. 38 corresponds to the example structure (Syntax) of "depth_information_sei( )" illustrated in FIG. 32. Although illustration is omitted, the structures corresponding to the example structures (Syntax) of "depth_information_sei( )" illustrated in FIG. 33 to FIG. 37 may be similarly considered. Also, instead of the example structure (Syntax) of "depth_information_sei( )" illustrated in FIG. 38, the example structure (Syntax) of "depth_information_sei( )" illustrated in FIG. 40 may be used. In this case, the 3-bit field "partition_type" is handled as flag information similar to, for example, "partition_enabled_flag".

"Description of Set Top Box"

The set top box 200 receives a transport stream TS that is transmitted by broadcast waves from the broadcast station 100. Also, the set top box 200 decodes a video stream included in the transport stream TS, and generates left-eye image data and right-eye image data which form a stereo image. Also, the set top box 200 extracts disparity information (first disparity information and second disparity information) for each picture of image data, which has been inserted into the video stream.

The set top box 200 checks, on the basis of the first disparity information and the second disparity information, whether or not a disparity angle with respect to the nearest object reproduction position (a disparity angle in a crossing direction) and a disparity angle with respect to the farthest object reproduction position (a disparity angle in a same-side direction) are within a certain range in which viewing does not cause any health problems. Then, if the disparity angles are out of the certain range, the set top box 200 reconfigures the left-eye image data and the right-eye image data so that the disparity angles are within the certain range, and corrects the first disparity information and the second disparity information.

Also, in the case of displaying graphics (STB graphics) on an image in an overlaid manner, the set top box 200 obtains the data of a left-eye image and a right-eye image on which graphics are overlaid, by using the image data, disparity information (first disparity information), and graphics data. In this case, the set top box 200 gives disparity corresponding to the display position of the graphics to the graphics to be overlaid on the left-eye image and the right-eye image in units of pictures, thereby obtaining the data of the left-eye image on which graphics are overlaid, and the data of the right-eye image on which graphics are overlaid.

As a result of giving disparity to the graphics in the above-described manner, the graphics (STB graphics) displayed on a stereo image in an overlaid manner can be displayed in front of an object in a stereo image at the display position. Accordingly, in the case of displaying graphics of OSD, an application, EPG of program information, or the like on an image in an overlaid manner, perspective consistency for individual objects in the image can be maintained.

Figure 41:
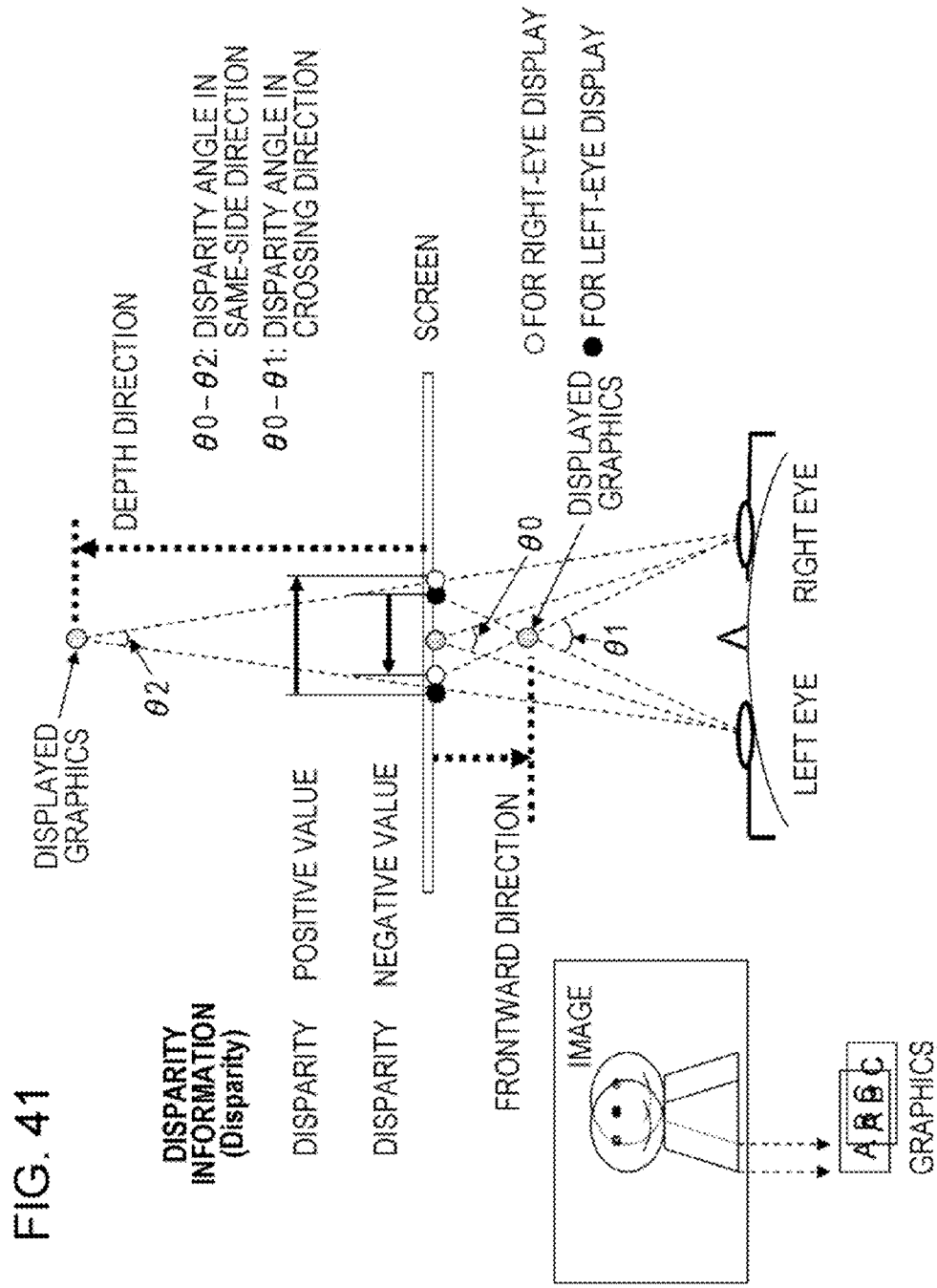
FIG. 41 is a diagram illustrating a concept of controlling the depth of graphics using disparity information.

FIG. 41 illustrates a concept of controlling the depth of graphics using disparity information. In a case where disparity information is a negative value, disparity is given so that graphics for left-eye display are shifted to the right side and graphics for right-eye display are shifted to the left side on a screen. In this case, the display position of the graphics is in front of the screen. On the other hand, in a case where disparity information is a positive value, disparity is given so that graphics for left-eye display are shifted to the left side and graphics for right-eye display are shifted to the right side on the screen. In this case, the display position of the graphics is behind the screen.

As described above, the video stream includes, inserted thereinto, disparity information obtained for each picture of image data. Thus, the set top box 200 is capable of accurately controlling the depth of graphics based on disparity information, by using disparity information synchronized with display timing of the graphics.

Also, FIG. 41 illustrates a disparity angle in the same-side direction (θ0-θ2) and a disparity angle in the crossing direction (θ0-θ1). In the set top box 200, it is checked whether or not these disparity angles are within the certain range in which viewing does not cause any health problems, on the basis of the first disparity information and the second disparity information for each picture inserted into the video stream.

Figure 42:
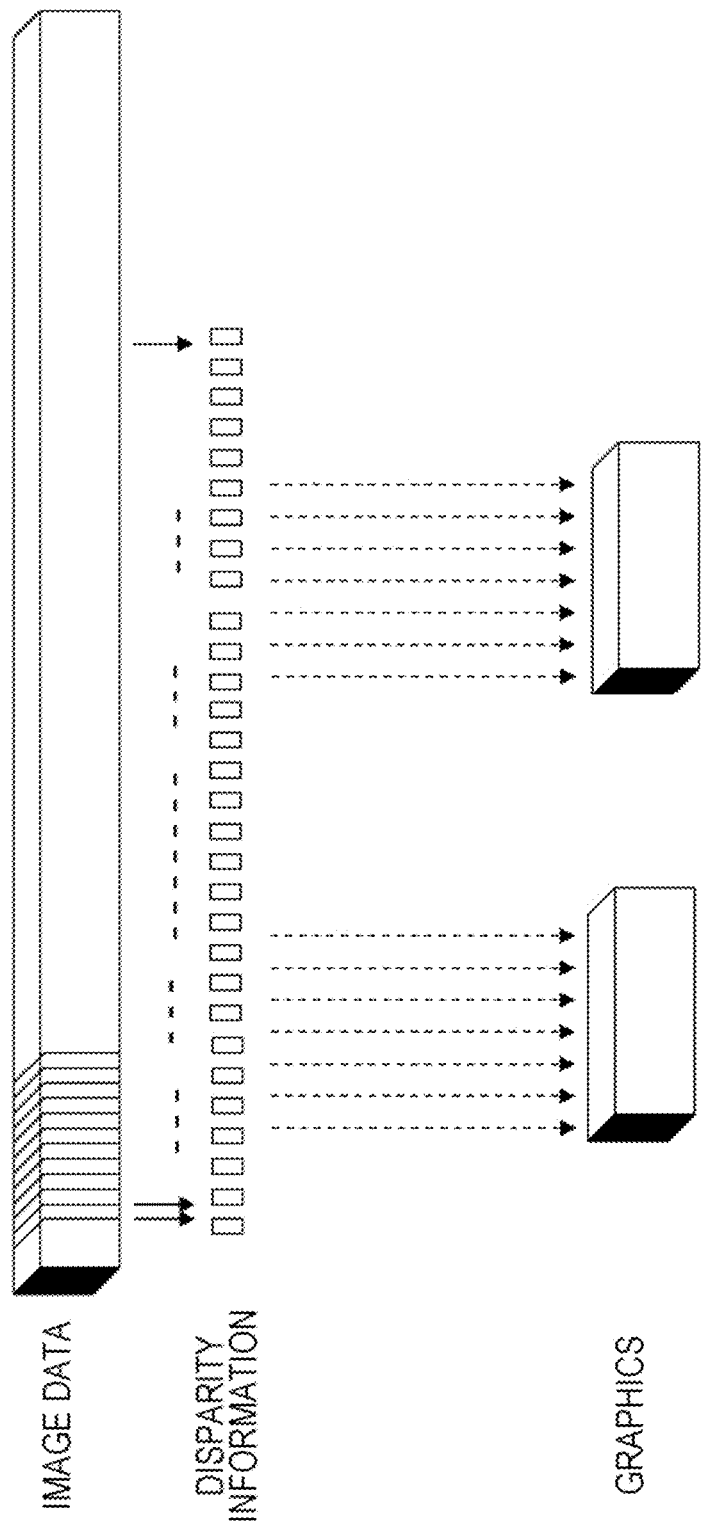
FIG. 42 is a diagram illustrating that pieces of disparity information are sequentially obtained at picture timings of image data in a case where a video stream includes disparity information inserted thereinto in units of pictures.
Figure 43:
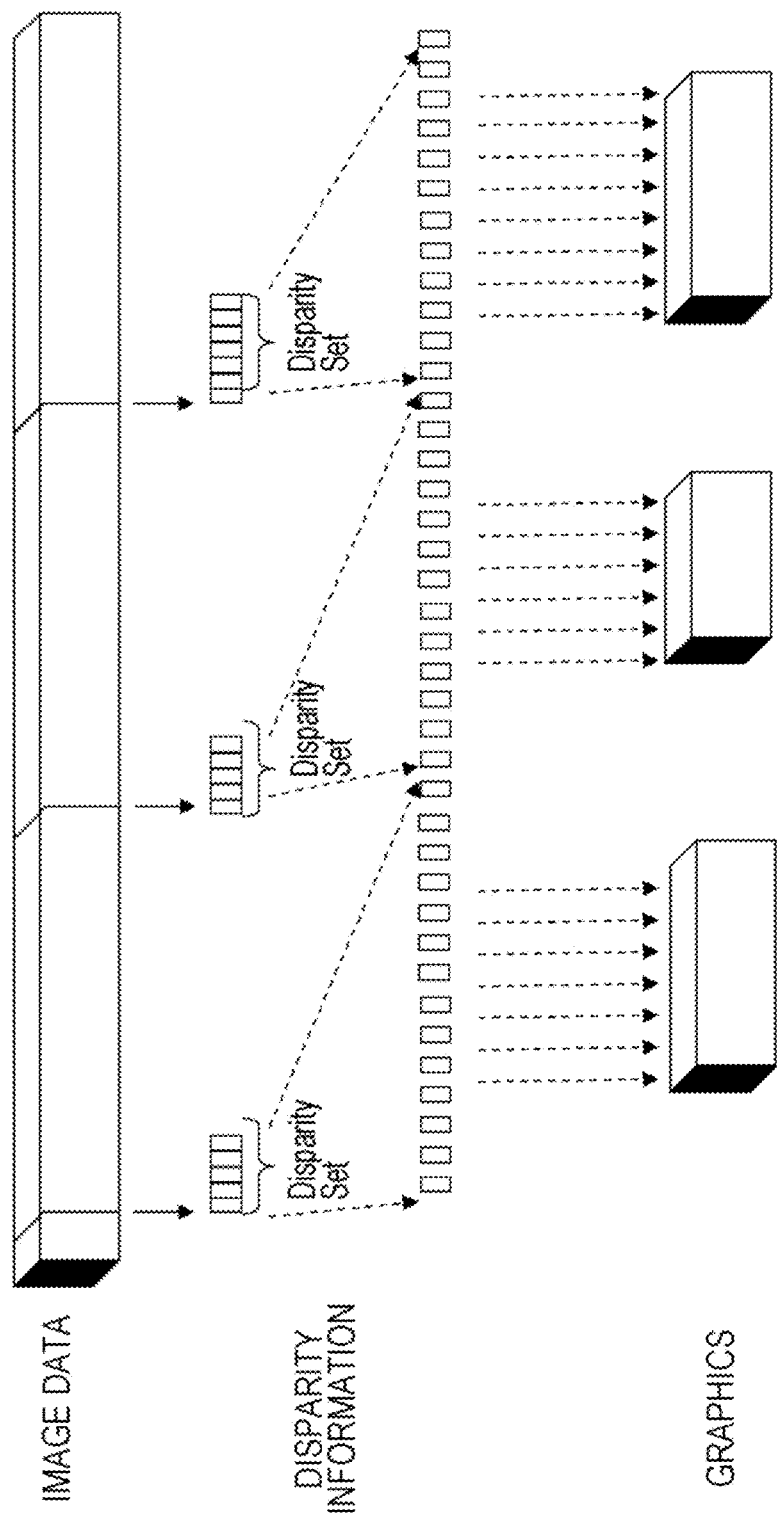
FIG. 43 is a diagram illustrating that pieces of disparity information for individual pictures in a GOP are collectively obtained at the timing of the head of the GOP of image data in a case where a video stream includes disparity information inserted thereinto in units of GOPs.

FIG. 42 illustrates an example of a case where a video stream includes disparity information inserted thereinto in units of pictures. In the set top box 200, pieces of disparity information are sequentially obtained at picture timings of image data. For displaying graphics, disparity information (first disparity information) corresponding to the display timing of the graphics is used, and appropriate disparity is given to the graphics. Also, FIG. 43 illustrates, for example, an example of a case where a video stream includes disparity information inserted thereinto in units of GOPs. In the set top box 200, at the timing of the head of each GOP of image data, pieces of disparity information (disparity information set) for individual pictures in the GOP are collectively obtained. For displaying graphics (STB graphics), disparity information (first disparity information) corresponding to the display timing of the graphics is used, and appropriate disparity is given to the graphics.

Figure 44:
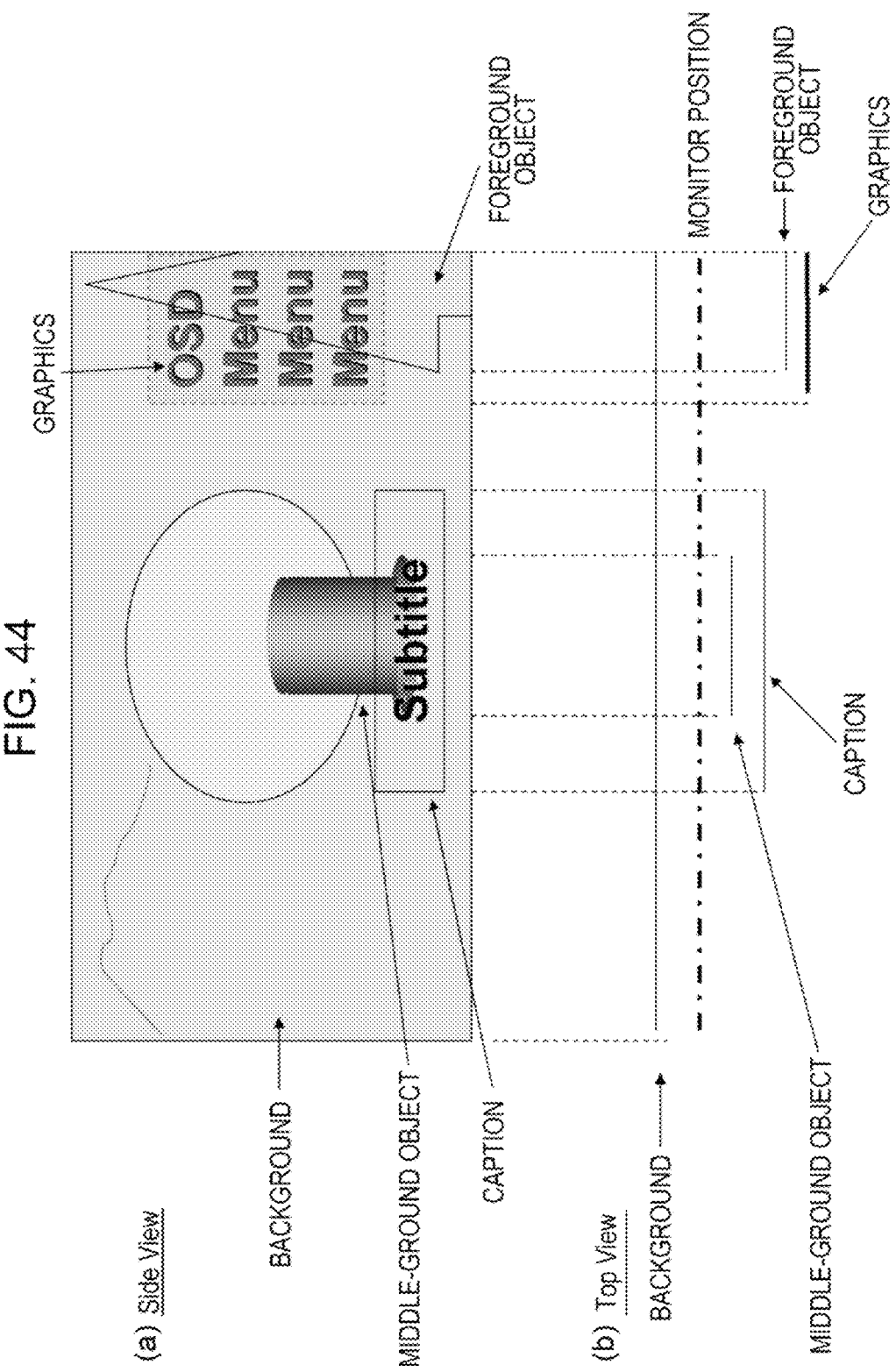
FIG. 44 includes diagrams illustrating a display example of a caption (subtitle) and OSD graphics on an image.

"Side View" in FIG. 44(a) illustrates a display example of a caption (subtitle) and OSD graphics on an image. In this display example, a caption and graphics are overlaid on an image formed of a background, a middle-ground object, and a foreground object. "Top View" in FIG. 44(b) illustrates the perspective of the background, the middle-ground object, the foreground object, the caption, and the graphics. FIG. 44(b) illustrates that the caption and the graphics are perceived as being in front of the objects corresponding to the display position. Note that, although not illustrated, in a case where the display positions of the caption and graphics overlap, appropriate disparity is given to the graphics so that the graphics are perceived as being in front of the caption, for example.

"Example Configuration of Set Top Box"

Figure 45:
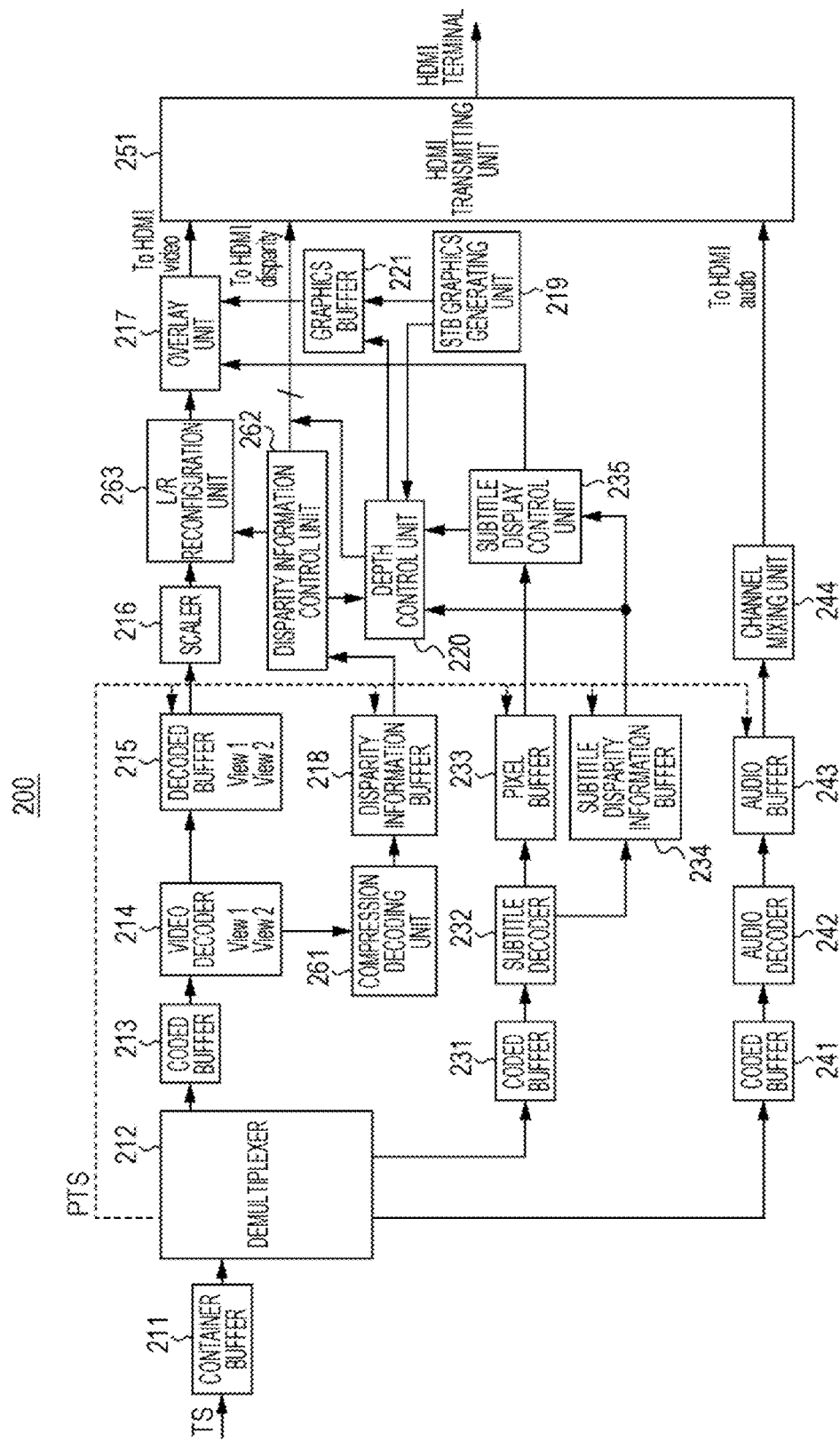
FIG. 45 is a block diagram illustrating an example configuration of a set top box.

FIG. 45 illustrates an example configuration of the set top box 200. The set top box 200 includes a container buffer 211, a demultiplexer 212, a coded buffer 213, a video decoder 214, a decoded buffer 215, a scaler 216, an L/R reconfiguration unit 263, and an overlay unit 217. Also, the set top box 200 includes a compression decoding unit 261, a disparity information buffer 218, a disparity information control unit 262, a set top box (STB) graphics generating unit 219, a depth control unit 220, and a graphics buffer 221.

Also, the set top box 200 includes a coded buffer 231, a subtitle decoder 232, a pixel buffer 233, a subtitle disparity information buffer 234, and a subtitle display control unit 235. Furthermore, the set top box 200 includes a coded buffer 241, an audio decoder 242, an audio buffer 243, a channel mixing unit 244, and an HDMI transmitting unit 251.

The container buffer 211 temporarily stores a transport stream TS received by a digital tuner or the like (not illustrated). The transport stream TS includes a video stream, a subtitle stream, and an audio stream. The video stream includes one or two video streams obtained by encoding left-eye image data and right-eye image data.

For example, image data of a side-by-side format or a top-and-bottom format may be formed of left-eye image data and right-eye image data, and may be transmitted as one video stream. Also, for example, left-eye image data and right-eye image data may be transmitted as different video streams, for example, an MVC base view stream and an MVC nonbase view stream.

The demultiplexer 212 extracts, from the transport stream TS that is temporarily stored in the container buffer 211, individual streams of video, subtitle, and audio. Also, the demultiplexer 212 extracts, from the transport stream TS, identification information (flag information "graphics_depth_info_not_existed_flag[0]") indicating whether or not the video stream includes disparity information inserted thereinto, and transmits the identification information to a control unit (CPU) that is not illustrated. If the identification information indicates that the video stream includes disparity information, the video decoder 214 obtains the disparity information (first disparity information and second disparity information) from the video stream under the control by the control unit (CPU), as described below.

The coded buffer 213 temporarily stores the video stream extracted by the demultiplexer 212. The video decoder 214 performs a decoding process on the video stream stored in the coded buffer 213, thereby obtaining left-eye image data and right-eye image data. Also, the video decoder 214 obtains disparity information (first disparity information and second disparity information) for each picture of the image data inserted into the video stream. The decoded buffer 215 temporarily stores the left-eye image data and the right-eye image data obtained by the video decoder 214.

The compression decoding unit 261 receives the disparity information (first disparity information and second disparity information) for each picture of the image data obtained by the video decoder 214, and, if the received disparity information is compression-encoded, performs a decoding process. If the received disparity information is not compression-encoded, the compression decoding unit 261 regards the received disparity information as disparity information to be output.

Figure 46:
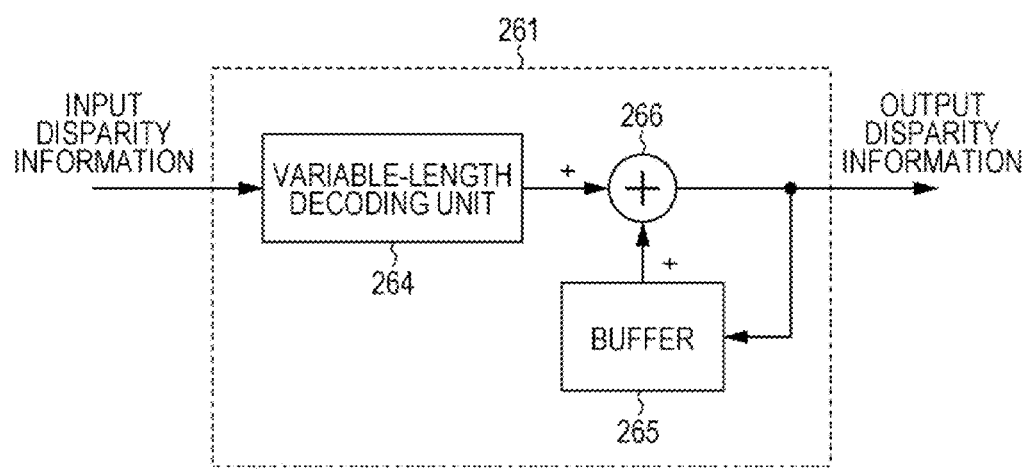
FIG. 46 is a block diagram illustrating an example of a schematic configuration of a compression decoding unit.

The compression decoding unit 261 performs a process opposite to the process performed by the compression encoding unit 120 in the transmission data generating unit 110A illustrated in FIG. 24. FIG. 46 illustrates an example of a schematic configuration of the compression decoding unit 261. The compression decoding unit 261 includes a variable-length decoding unit 264, a buffer 265, and an adding unit 266. The variable-length decoding unit 264 performs variable-length decoding on the compression-encoded input disparity information. The buffer 265 temporarily stores the decoded disparity information to be output. The adding unit 266 adds difference data of a reference picture to disparity information of a referenced picture, thereby obtaining disparity information to be output for the reference picture.

Referring back to FIG. 45, the disparity information buffer 218 temporarily stores the compression-decoded disparity information (first disparity information and second disparity information). The disparity information control unit 262 checks, on the basis of the first disparity information and the second disparity information for each picture stored in the disparity information buffer 218, whether or not a disparity angle with respect to the nearest object reproduction position (a disparity angle in a crossing direction) and a disparity angle with respect to the farthest object reproduction position (a disparity angle in a same-side direction) are within a certain range in which viewing does not cause any health problems.

If the disparity angles are out of the certain range, the disparity information control unit 262 instructs the L/R reconfiguration unit 263 to reconfigure the left-eye image data and the right-eye image data so that the disparity angles are within the certain range. Also, the disparity information control unit 262 corrects the first disparity information and/or the second disparity information in accordance with the reconfigured left-eye image data and right-eye image data, and outputs the first disparity information and/or the second disparity information. Note that, in a case where the disparity angles are within the certain range, the disparity information control unit 262 does not instruct the L/R reconfiguration unit 263 to reconfigure the left-eye image data and the right-eye image data, and outputs the first disparity information and the second disparity information as they are without correcting them.

Figure 47:
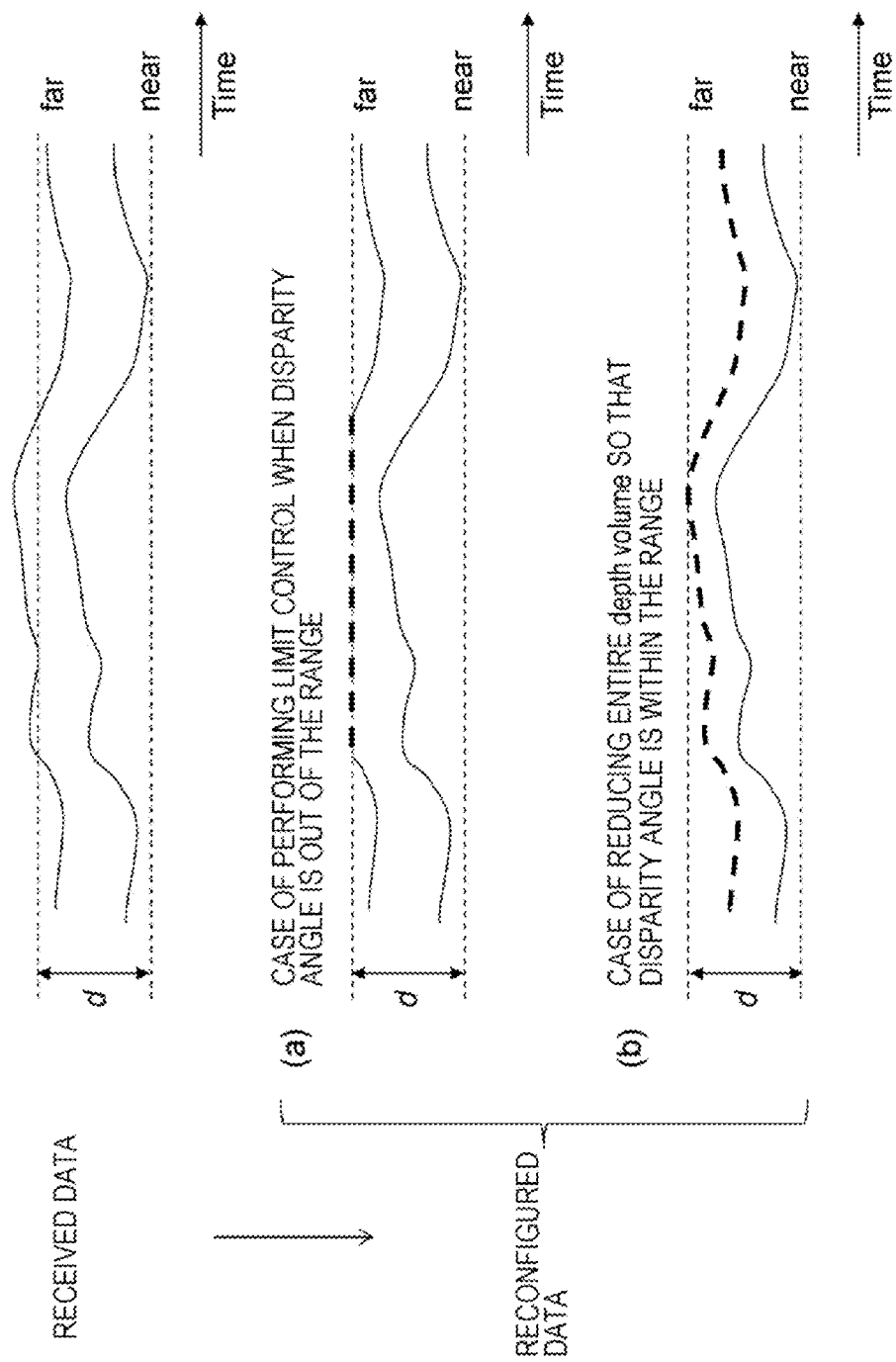
FIG. 47 is a diagram describing checking of disparity angles and reconfiguration of image data.

The upper portion of FIG. 47 illustrates an example of a temporal transition of disparity angles on the near side and the far side of received data (left-eye image data and right-eye image data). A range "d" represents the range of disparity angles at which viewing does not cause any health problems. In this example, there is a period in which the disparity angle is out of the range d on the far side.

The lower portion of FIG. 47 illustrates an example of a temporal transition of disparity angles on the near side and the far side of reconfigured data (left-eye image data and right-eye image data). (a) is an example of the case of performing limit control when the disparity angle is out of the range d. (b) is an example of the case of reducing the entire depth volume so that the disparity angles are within the range d.

Figure 48:
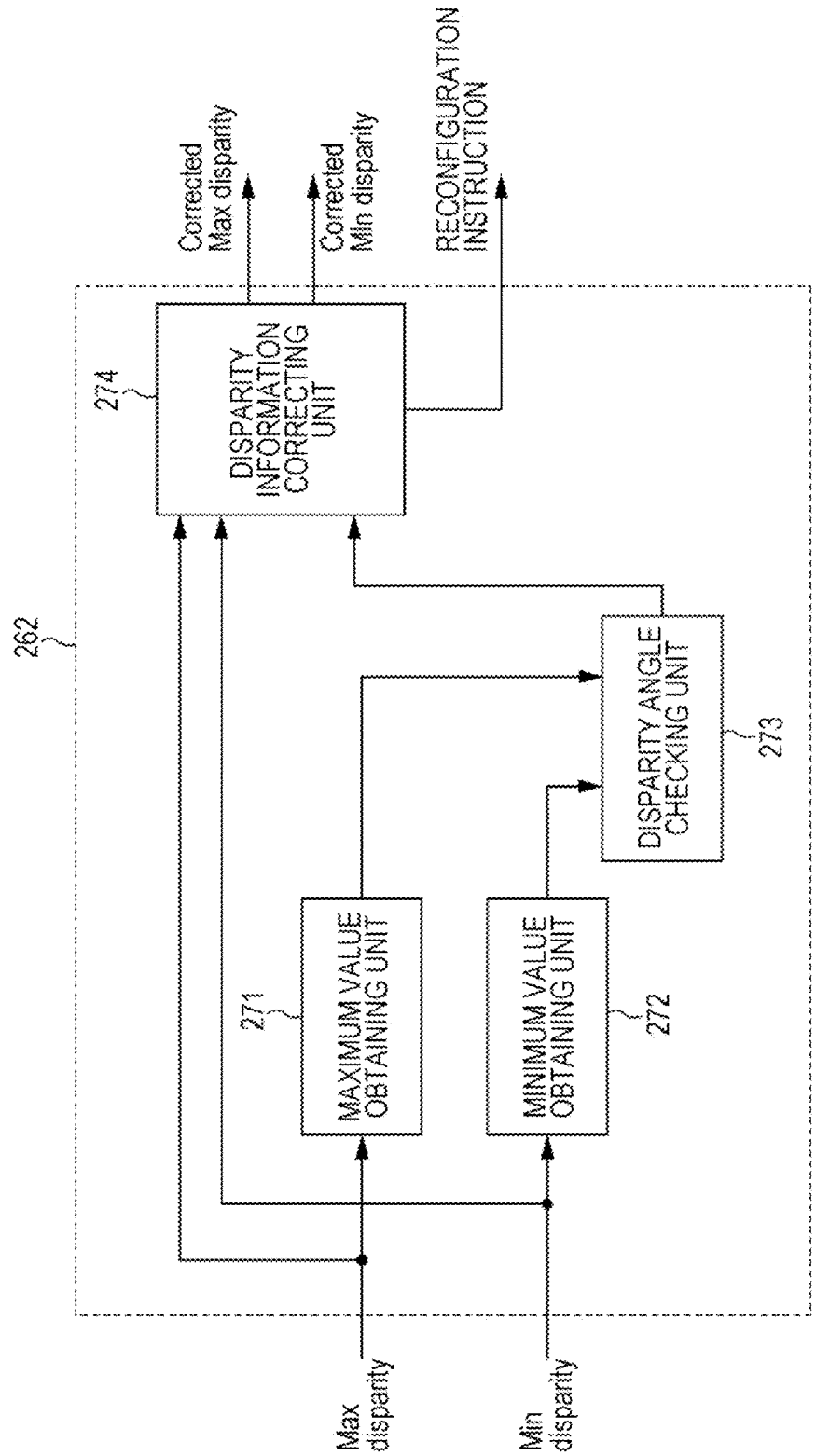
FIG. 48 is a block diagram illustrating an example configuration of a disparity information control unit.

FIG. 48 illustrates an example configuration of the disparity information control unit 262. The disparity information control unit 262 includes a maximum value obtaining unit 271, a minimum value obtaining unit 272, a disparity angle checking unit 272, and a disparity information correcting unit 274. The maximum value obtaining unit 271 selects a piece of second disparity information having a maximum value from among received pieces of second disparity information (Max disparity), and supplies it to the disparity angle checking unit 273. The number of pieces of received second disparity information is one in a case where the second disparity information is about the entire picture screen, and is plural in a case where the second disparity information is about each of a plurality of partitioned areas. The minimum value obtaining unit 272 selects a piece of first disparity information having a minimum value from among received pieces of first disparity information (Min disparity), and supplies it to the disparity angle checking unit 273. The number of pieces of received first disparity information is one in a case where the first disparity information is about the entire picture screen, and is plural in a case where the first disparity information is about each of a plurality of partitioned areas.

The disparity angle checking unit 273 checks, on the basis of the first disparity information and the second disparity information, whether or not the disparity angle on the near side and the disparity angle on the far side are within the range d (see FIG. 47) of disparity angles at which viewing does not cause any health problems, and supplies the check result to the disparity information correcting unit 274. If the disparity angles are out of the range d, the disparity information correcting unit 274 instructs the L/R reconfiguration unit 263 to reconfigure the received left-eye image data and right-eye image data so that the disparity angles are within the range d.

Further, the disparity information correcting unit 274 is supplied with the received first disparity information (Min disparity) and second disparity information (Max disparity). The disparity information correcting unit 274 performs a correction process on the first disparity information and the second disparity information in response to the above-described instruction to reconfigure the left-eye image data and the right-eye image data, and outputs the corrected first disparity information (Corrected Min disparity) and second disparity information (Corrected Max disparity). Note that, if the disparity angles are within the range d, the disparity information correcting unit 274 does not instruct the L/R reconfiguration unit 263 to reconfigure the left-eye image data and the right-eye image data, and outputs the first disparity information and the second disparity information as they are without correcting them.

Referring back to FIG. 45, the scaler 216 performs a scaling process in the horizontal direction or vertical direction on the left-eye image data and the right-eye image data output from the decoded buffer 215, if necessary. For example, in a case where the left-eye image data and the right-eye image data are transmitted as image data of a side-by-side format or a top-and-bottom format in one video stream, the scaler 216 2× scales up the image data in the horizontal direction or vertical direction and outputs the image data. Also, for example, in a case where the left-eye image data and the right-eye image data are transmitted as different video streams, such as an MVC base view stream and an MVC nonbase view stream, the scaler 216 does not perform a scaling process and outputs the left-eye image data and the right-eye image data as they are.

The L/R reconfiguration unit 263 reconfigures left-eye image data and right-eye image data. That is, in a case where either of a disparity angle in the same-side direction and a disparity angle in the crossing direction is out of the certain range in which viewing does not cause any health problems, the L/R reconfiguration unit 263 reconfigures the left-eye image data and the right-eye image data so that the disparity angle is within the certain range, in response to a reconfiguration instruction from the above-described disparity information control unit 262.

The coded buffer 231 temporarily stores the subtitle stream extracted by the demultiplexer 214. The subtitle decoder 232 performs a process opposite to the process performed by the subtitle encoder 117 of the above-described transmission data generating unit 110 (see FIG. 8). That is, the subtitle decoder 232 performs a decoding processes on the subtitle stream stored in the coded buffer 231, thereby obtaining subtitle data.

The subtitle data includes bitmap data of a subtitle (caption), display position information about the subtitle "Subtitle rendering position (x2, y2)", and disparity information about the subtitle (caption) "Subtitle disparity". The pixel buffer 233 temporarily stores the bitmap data of the subtitle (caption) and the display position information about the subtitle (caption) "Subtitle rendering position (x2, y2)", which are obtained by the subtitle decoder 232. The subtitle disparity information buffer 234 temporarily stores the disparity information about the subtitle (caption) "Subtitle disparity" obtained by the subtitle decoder 232.

The subtitle display control unit 235 generates pieces of bitmap data of a subtitle "Subtitle data" for left-eye display and right-eye display to which disparity is given, on the basis of the bitmap data of the subtitle (caption) and the display position information and disparity information about the subtitle (caption). The set top box (STB) graphics generating unit 219 generates graphics data of OSD, an application, EPG, or the like. The graphics data includes graphics bitmap data "Graphics data" and display position information about the graphics "Graphics rendering position (x1, y1)".

The graphics buffer 221 temporarily stores the graphics bitmap data "Graphics data" generated by the set top box graphics generating unit 219. The overlay unit 217 respectively overlays, on the left-eye image data and the right-eye image data, the pieces of bitmap data of the subtitle "Subtitle data" for left-eye display and right-eye display generated by the subtitle display control unit 235.

Also, the overlay unit 217 respectively overlays, on the left-eye image data and the right-eye image data, pieces of graphics bitmap data "Graphics data" stored in the graphics buffer 221. At this time, disparity is given by the depth control unit 220 (described below) to the pieces of graphics bitmap data "Graphics data" that are overlaid on the left-eye image data and the right-eye image data, respectively. Here, in a case where the graphics bitmap data "Graphics data" shares the same pixels as the bitmap data of the subtitle "Subtitle data", the overlay unit 217 overwrites the graphics data on the subtitle data.

The depth control unit 220 gives disparity to the pieces of graphics bitmap data "Graphics data" overlaid on the left-eye image data and the right-eye image data, respectively. Thus, the depth control unit 220 generates display position information about graphics "Rendering position" for left-eye display and right-eye display for each picture of image data, and performs shift control of an overlay position of the pieces of graphics bitmap data "Graphics data" stored in the graphics buffer 221 on the left-eye image data and the right-eye image data.

Figure 49:
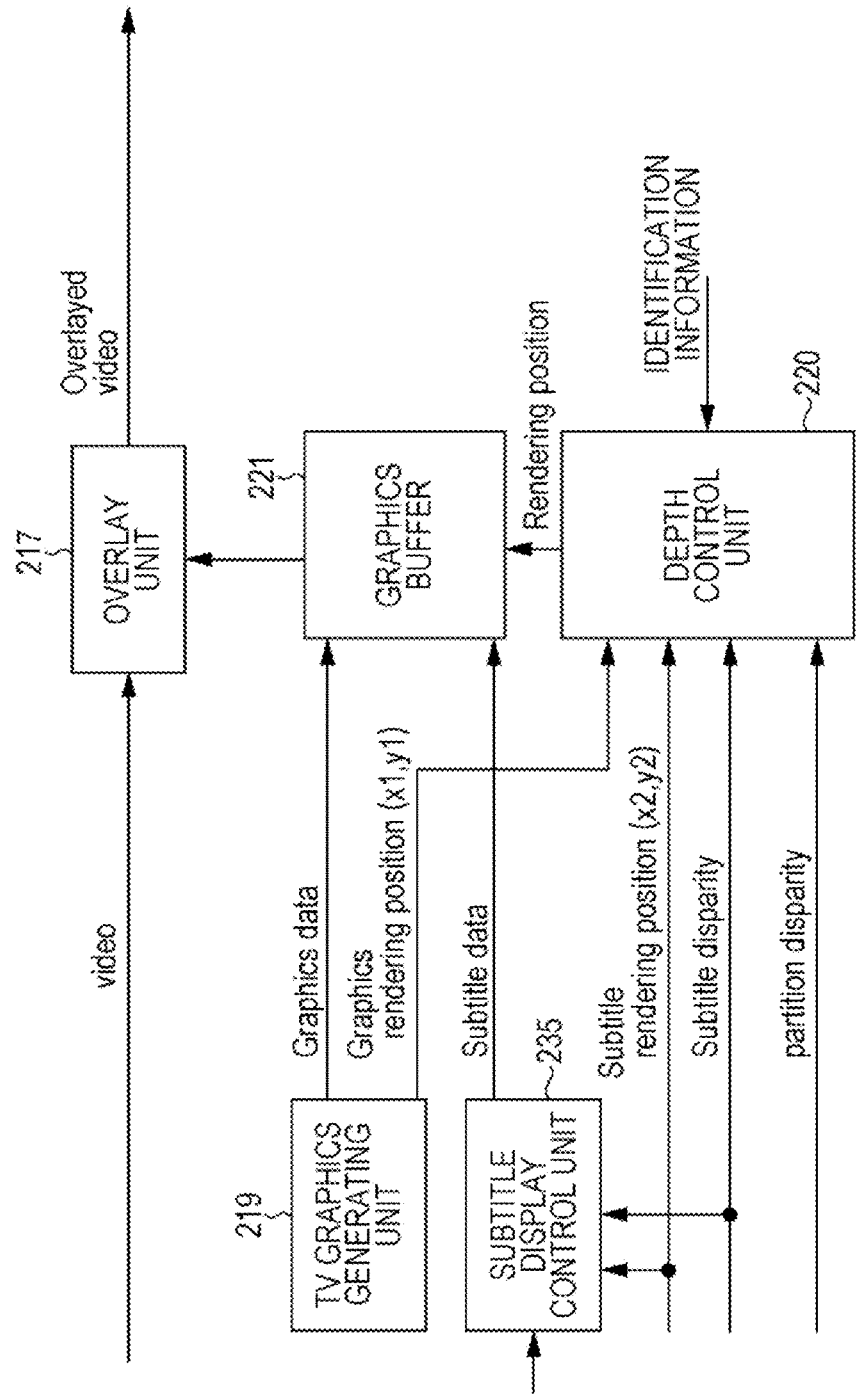
FIG. 49 is a block diagram describing control performed by a depth control unit.

As illustrated in FIG. 49, the depth control unit 220 generates display position information "Rendering position" by using the following information. That is, the depth control unit 220 uses first disparity information (Min disparity) for each picture output from the disparity information control unit 262. Also, the depth control unit 220 uses the display position information about the subtitle (caption) "Subtitle rendering position (x2, y2)" stored in the pixel buffer 233.

Also, the depth control unit 220 uses the disparity information about the subtitle (caption) "Subtitle disparity" stored in the subtitle disparity information buffer 234. Also, the depth control unit 220 uses the display position information about the graphics "Graphics rendering position (x1, y1)" generated by the set top box graphics generating unit 219. Also, the depth control unit 220 uses identification information indicating whether or not the video stream includes disparity information inserted thereinto.

Also, the depth control unit 220 updates the first disparity information (Min disparity) for each picture, output from the disparity information control unit 262, in accordance with overlaying of a subtitle or graphics on an image. In this case, the depth control unit 220 updates the value of disparity information (Disparity) about a partitioned area corresponding to the display position of the subtitle (caption) and the display position of the graphics, to the value of disparity information (Disparity) used for giving disparity to the subtitle (caption) or the graphics, for example.

Figure 50:
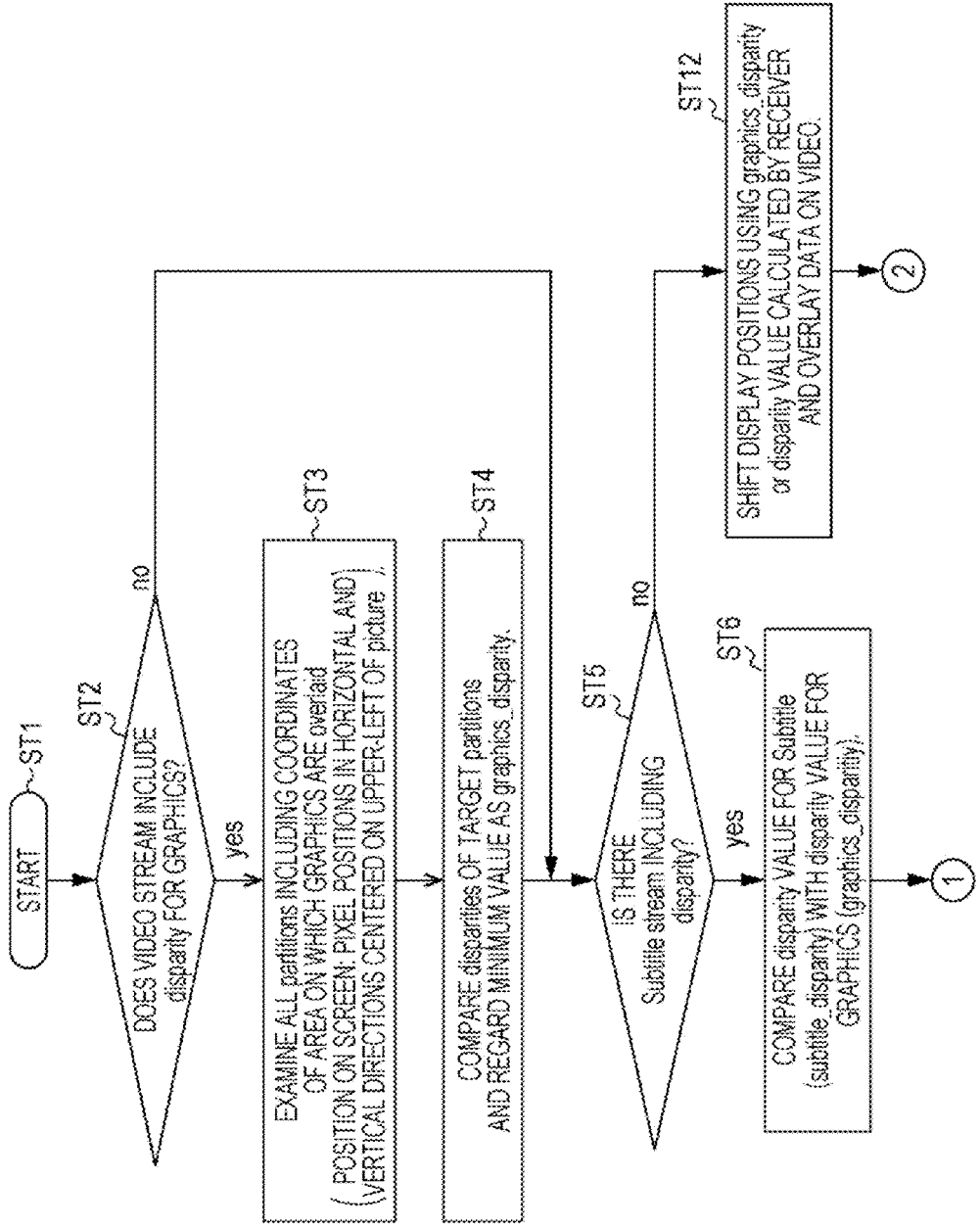
FIG. 50 is a flowchart (1/2) illustrating an example of a procedure of a control process performed by the depth control unit.
Figure 51:
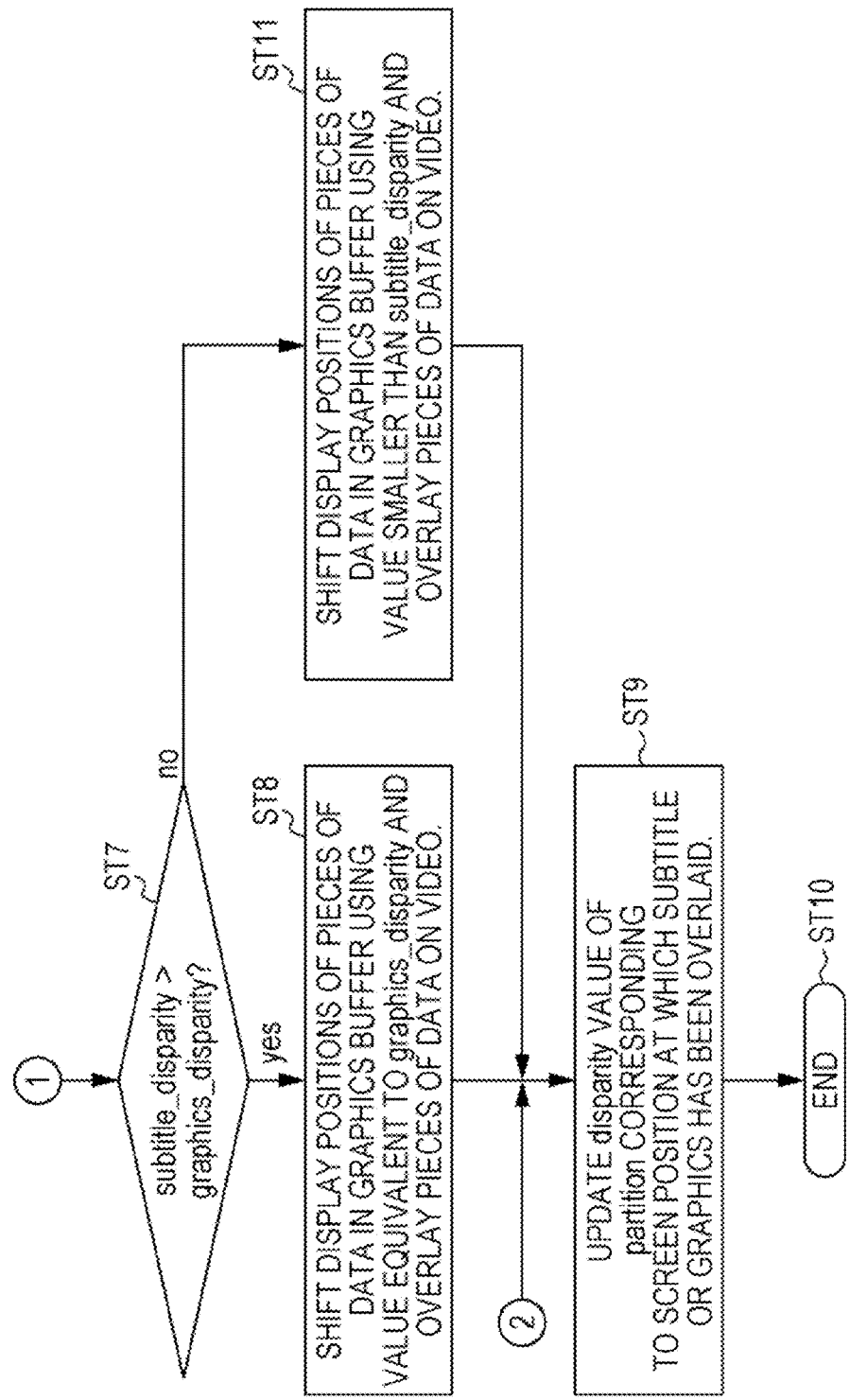
FIG. 51 is a flowchart (2/2) illustrating the example of the procedure of the control process performed by the depth control unit.

The flowchart in FIG. 50 and FIG. 51 illustrates an example of a procedure of a control process performed by the depth control unit 220. The depth control unit 220 executes the control process for each picture (frame) on which graphics display is performed. The depth control unit 220 starts the control process in step ST1. Subsequently, in step ST2, the depth control unit 220 determines, on the basis of identification information, whether or not the video stream includes disparity information for graphics inserted thereinto.

If the video stream includes disparity information inserted thereinto, the depth control unit 220 proceeds to the process in step ST3. In step ST3, the depth control unit 220 examines all the partitioned areas (partitions) including the coordinates at which graphics are displayed in an overlaid manner. Then, in step ST4, the depth control unit 220 compares the pieces of disparity information (disparities) about target partitioned areas (partitions), selects an optimal value such as a minimum value, and regards the selected value as a value (graphics_disparity) of graphics disparity information (disparity).

Subsequently, the depth control unit 220 proceeds to the process in step ST5. If the video stream does not include disparity information inserted thereinto in the foregoing step ST2, the depth control unit 220 immediately proceeds to the process in step ST5. In step ST5, the depth control unit 220 determines whether or not there is a subtitle stream including disparity information (disparity).

If there is a subtitle stream including disparity information (disparity), the depth control unit 220 compares, in step ST6, the value of disparity information (disparity) for the subtitle (subtitle_disparity) with the value of disparity information for the graphics (graphics_disparity). Note that, if the video stream does not include disparity information (disparity) for graphics inserted thereinto, the value of disparity information for the graphics (graphics_disparity) is set to be, for example, "0".

Subsequently, in step ST7, the depth control unit 220 determines whether or not the condition "subtitle_disparity> (graphics_disparity) is satisfied. If the condition is satisfied, in step ST8, the depth control unit 220 obtains pieces graphics bitmap data for left-eye display and right-eye display in which display positions have been shifted by using a value equivalent to the value of disparity information (disparity) for graphics (graphics_disparity), on the basis of the graphics bitmap data "Graphics data" stored in the graphics buffer 221, and overlays the pieces of graphics bitmap data on the left-eye image data and the right-eye image data, respectively.

Subsequently, in step ST9, the depth control unit 220 updates the value of disparity information (disparity) about a partitioned area (partition) corresponding to the screen position at which the subtitle or graphics has been overlaid. After the process in step ST9, the depth control unit 220 ends the control process in step ST10.

On the other hand, if the condition is not satisfied in step ST7, the depth control unit 220 obtains pieces graphics bitmap data for left-eye display and right-eye display in which display positions have been shifted by using a value smaller than the disparity information (disparity) for graphics, on the basis of the graphics bitmap data "Graphics data" stored in the graphics buffer 221, and overlays the pieces of graphics bitmap data on the left-eye image data and the right-eye image data, respectively in step ST10. After the process in step ST11, the depth control unit 220 performs the process in step ST9, and ends the control process in step ST10.

Further, if there is not a subtitle stream including disparity information (disparity) in step ST5, the depth control unit 220 proceeds to the process in step ST12. In step ST12, the depth control unit 220 controls the depth of graphics by using the value of disparity information for graphics (graphics_disparity) obtained in step ST4 or the value of disparity information (disparity) calculated by the set top box 200.

That is, the depth control unit 220 obtains pieces graphics bitmap data for left-eye display and right-eye display in which display positions have been shifted by using the value of disparity information for graphics (graphics_disparity) or the calculated value of disparity information (disparity), on the basis of the graphics bitmap data "Graphics data" stored in the graphics buffer 221, and overlays the pieces of graphics bitmap data on the left-eye image data and the right-eye image data, respectively. After the process in step ST12, the depth control unit 220 performs the process in step ST9, and ends the control process in step ST10.

Figure 52:
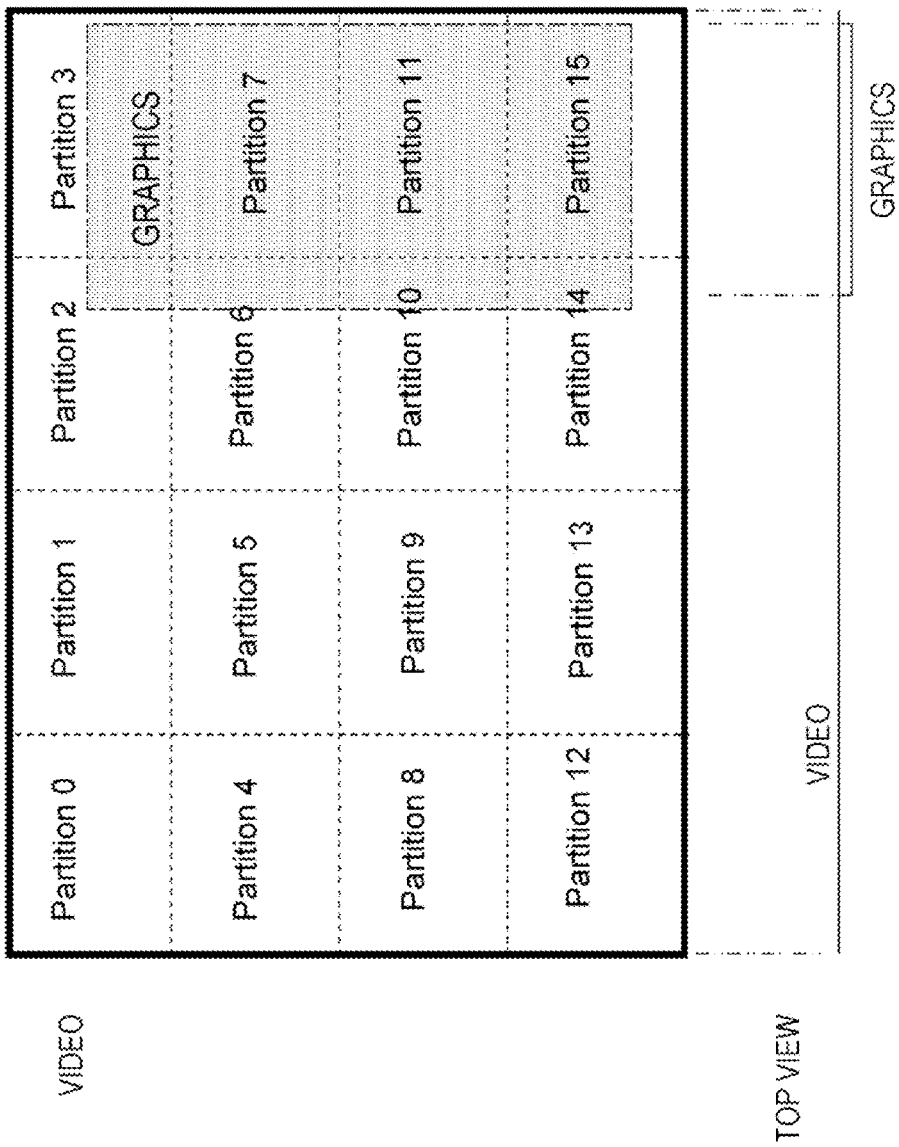
FIG. 52 is a diagram illustrating an example of controlling the depth of graphics in the set top box.

FIG. 52 illustrates an example of controlling the depth of graphics in the set top box 200. In this example, regarding graphics (STB graphics), disparity is given to graphics for left-eye display and graphics for right-eye display on the basis of a piece of disparity information having a minimum value among pieces of disparity information about the eight partitioned areas on the right (Partitions 2, 3, 6, 7, 10, 11, 14, and 15). As a result, the graphics are displayed in front of an image (video) object in these eight partitioned areas.

Figure 53:
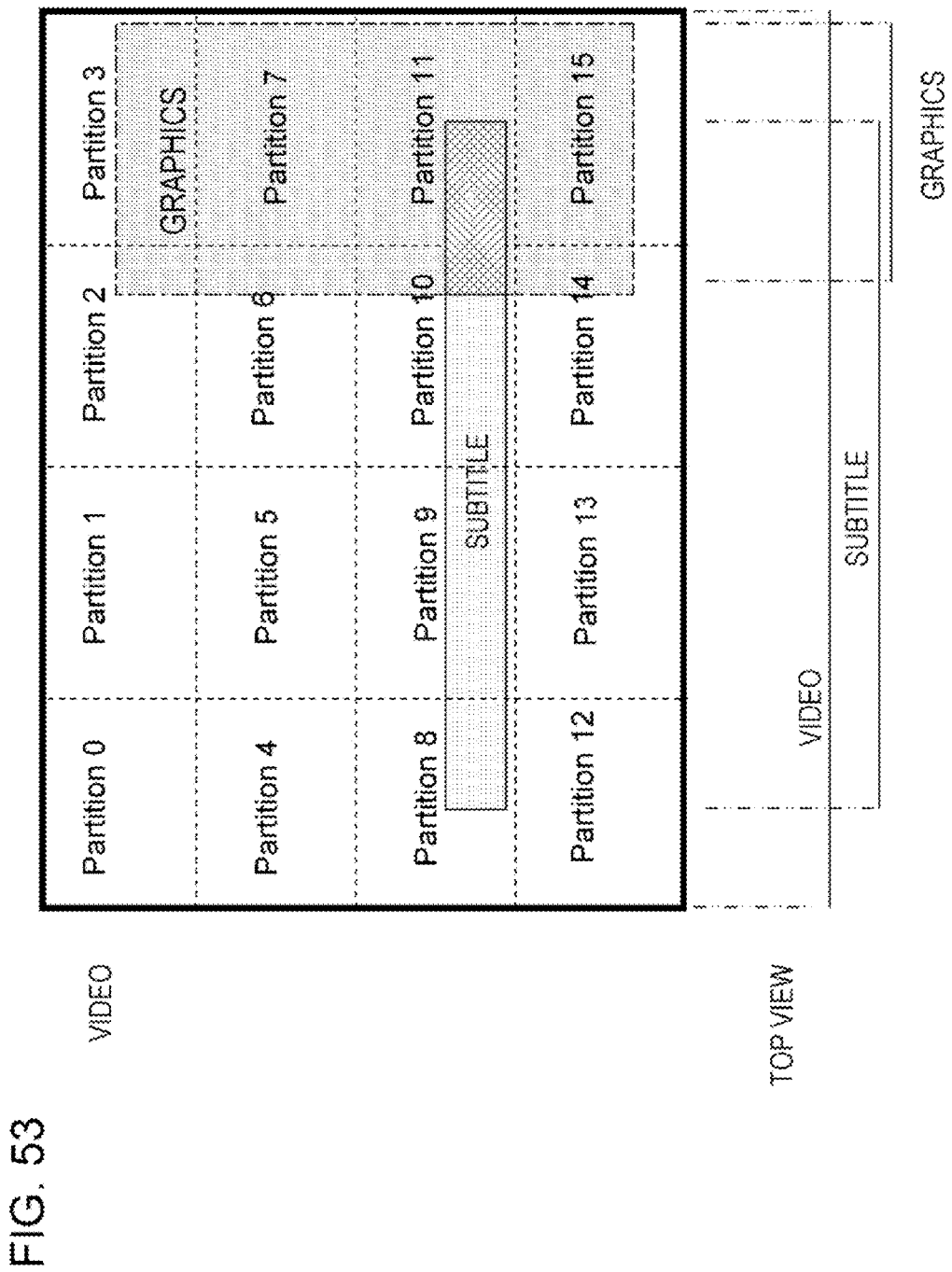
FIG. 53 is a diagram illustrating another example of controlling the depth of graphics in the set top box.

FIG. 53 also illustrates an example of controlling the depth of graphics in the set top box 200. In this example, regarding graphics (STB graphics), disparity is given to graphics for left-eye display and graphics for right-eye display on the basis of a piece of disparity information having a minimum value among pieces of disparity information about the eight partitioned areas on the right (Partitions 2, 3, 6, 7, 10, 11, 14, and 15) and also disparity information about a subtitle (caption).

As a result, the graphics are displayed in front of an image (video) object and also a subtitle (caption) in these eight partitioned areas. Note that, in this case, the subtitle (caption) is also displayed in front of an image (video) object in the four partitioned areas (Partitions 8, 9, 10, and 11) corresponding to the display position of the subtitle, on the basis of disparity information about the subtitle (caption).

Note that, in the case of the example of controlling the depth in FIG. 53, a process of updating disparity information is performed in the following manner, for example. That is, first, the values of pieces of disparity information (Disparities) about the four partitioned areas (Partitions 8, 9, 10, and 11) corresponding to the display position of the subtitle are updated by the disparity information value (subtitle_disparity) used for giving disparity to the subtitle. Subsequently, the values of pieces of disparity information (Disparities) about the eight partitioned areas (Partitions 2, 3, 6, 7, 10, 11, 14, and 15) are updated by the disparity information value (graphics_disparity) used for giving disparity to the graphics.

Referring back to FIG. 45, the coded buffer 241 temporarily stores the audio stream extracted by the demultiplexer 212. The audio decoder 242 performs a process opposite to the process performed by the audio encoder 119 of the above-described transmission data generating unit 110 (see FIG. 8). That is, the audio decoder 242 performs a decoding process on the audio stream stored in the coded buffer 241, thereby obtaining decoded audio data. The audio buffer 243 temporarily stores the audio data obtained by the audio decoder 242. The channel mixing unit 244 generates audio data of each channel for realizing, for example, 5.1 channel surround or the like, from the audio data stored in the audio buffer 243, and outputs the generated audio data.

Note that reading out of information (data) from the decoded buffer 215, the disparity information buffer 218, the pixel buffer 233, the subtitle disparity information buffer 234, and the audio buffer 243 is performed on the basis of PTS, and transfer synchronization is achieved.

The HDMI transmitting unit 251 transmits, to a sink apparatus of HDMI, in this embodiment, to the television receiver 300, the left-eye image data and the right-eye image data obtained through a process of overlaying a subtitle and graphics performed by the overlay unit 217, and the audio data of each channel obtained by the channel mixing unit 244, by performing communication compatible with HDMI. Here, the left-eye image data obtained by the overlay unit 217 is left-eye image data on which a subtitle (caption) and STB graphics for left-eye display are overlaid. Also, the right-eye image data obtained by the overlay unit 217 is right-eye image data on which a subtitle (caption) and STB graphics for right-eye display are overlaid.

Also, the HDMI transmitting unit 251 transmits, to the television receiver 300, the first disparity information (Min disparity) for each picture that has been updated by the depth control unit 220 and the second disparity information (Max disparity) for each picture output from the disparity information control unit 262, by using an HDMI interface. In this embodiment, the first disparity information and the second disparity information are transmitted after being inserted into a blanking period of image data. The details of the HDMI transmitting unit 251 will be described below.

The operation of the set top box 200 illustrated in FIG. 45 will be briefly described. A transport stream TS received by a digital tuner or the like is temporarily stored in the container buffer 211. The transport stream TS includes a video stream, a subtitle stream, and an audio stream. The video stream includes one or two video streams obtained by encoding left-eye image data and right-eye image data.

In the demultiplexer 212, individual streams of video, subtitle, and audio are extracted from the transport stream TS that is temporarily stored in the container buffer 211. Also, in the demultiplexer 212, identification information (flag information "graphics_depth_info_not_existed_flag[0]") indicating whether or not the video stream includes disparity information inserted thereinto is extracted from the transport stream TS, and is transmitted to the control unit (CPU) that is not illustrated.

The video stream extracted by the demultiplexer 212 is supplied to the coded buffer 213 and is temporarily stored therein. Then, in the video decoder 214, a decoding process is performed on the video stream stored in the coded buffer 213, so that left-eye image data and right-eye image data are obtained. The left-eye image data and the right-eye image data are temporarily stored in the decoded buffer 215.

Also, in the video decoder 214, disparity information (first disparity information and second disparity information) for each picture of image data, which has been inserted into the video stream, is obtained. The disparity information appropriately undergoes compression decoding in the compression decoding unit 261, and is temporarily stored in the disparity information buffer 218. In the disparity information control unit 262, it is checked, on the basis of the first disparity information and the second disparity information for each picture stored in the disparity information buffer 218, whether or not a disparity angle with respect to the nearest object reproduction position (a disparity angle in a crossing direction) and a disparity angle with respect to the farthest object reproduction position (a disparity angle in a same-side direction) are within the range d (see FIG. 47) in which viewing does not cause any health problems.

Then, if the disparity angles are out of the certain range, the disparity information control unit 262 instructs the L/R reconfiguration unit 263 to reconfigure the left-eye image data and the right-eye image data so that the disparity angles are within the range d. Further, in that case, the disparity information control unit 262 corrects the first disparity information and/or the second disparity information in accordance with the reconfigured left-eye image data and right-eye image data, and outputs the corrected first disparity information and/or second disparity information. Note that, in a case where the disparity angles are within the certain range d, the disparity information control unit 262 does not instruct the L/R reconfiguration unit 263 to reconfigure the left-eye image data and the right-eye image data, and outputs the first disparity information and the second disparity information without correcting them.

In the scaler 216, a scaling process in the horizontal direction or vertical direction is performed on the left-eye image data and the right-eye image data output from the decoded buffer 215, if necessary. From the scaler 216, for example, left-eye image data and right-eye image data of a full HD size of 1920*1080 are obtained. The left-eye image data and the right-eye image data are supplied to the overlay unit 217 via the L/R reconfiguration unit 263.

The L/R reconfiguration unit 263 reconfigures the left-eye image data and the right-eye image data if necessary. That is, in a case where either of the disparity angles in the same-side direction and the crossing direction is out of the range d (see FIG. 47) in which viewing does not cause any health problems, the L/R reconfiguration unit 263 reconfigures the left-eye image data and the right-eye image data so that the disparity angle is within the certain range, on the basis of a reconfiguration instruction from the disparity information control unit 262.

Further, the subtitle stream extracted by the demultiplexer 212 is supplied to the coded buffer 231 and is temporarily stored therein. In the subtitle decoder 232, a decoding process is performed on the subtitle stream stored in the coded buffer 231, so that subtitle data is obtained. The subtitle data includes bitmap data of a subtitle (caption), display position information about the subtitle "Subtitle rendering position (x2, y2)", and disparity information about the subtitle (caption) "Subtitle disparity".

The bitmap data of the subtitle (caption) and the display position information about the subtitle (caption) "Subtitle rending position (x2, y2)" obtained by the subtitle decoder 232 are temporarily stored in the pixel buffer 233. Also, the disparity information about the subtitle (caption) "Subtitle disparity" obtained by the subtitle decoder 232 is temporarily stored in the subtitle disparity information buffer 234.

In the subtitle display control unit 235, pieces of bitmap data of the subtitle "Subtitle data" for left-eye display and right-eye display to which disparity has been given are generated on the basis of the bitmap data of the subtitle (caption) and the display position information and disparity information about the subtitle (caption). The pieces of bitmap data of the subtitle "Subtitle data" for left-eye display and right-eye display generated in this manner are supplied to the overlay unit 217, and are overlaid on the left-eye image data and the right-eye image data, respectively.

In the set top box (STB) graphics generating unit 219, graphics data of OSD, an application, EPG, or the like is generated. The graphics data includes bitmap data of graphics "Graphics data" and display position information about the graphics "Graphics rendering position (x1, y1)". The graphics buffer 221 temporarily stores the graphics data generated by the set top box (STB) graphics generating unit 219.

In the overlay unit 217, pieces of graphics bitmap data "Graphics data" stored in the graphics buffer 221 are overlaid on the left-eye image data and the right-eye image data.

At this time, disparity is given by the depth control unit 220 to the pieces of graphics bitmap data "Graphics data" respectively overlaid on the left-eye image data and the right-eye image data, on the basis of the disparity information corresponding to the display position of the graphics among the pieces of first disparity information about individual partitioned areas of each picture of image data output from the disparity information control unit 262. In this case, if the graphics bitmap data "Graphics data" shares the same pixels as the bitmap data of the subtitle "Subtitle data", the overlay unit 217 overwrites the graphics data on the subtitle data.

The left-eye image data on which the subtitle (caption) and STB graphics for left-eye display are overlaid, and the right-eye image data on which the subtitle (caption) and STB graphics for right-eye display are overlaid are obtained from the overlay unit 217. The left-eye image data and the right-eye image data are supplied to the HDMI transmitting unit 251.

Further, the audio stream extracted by the demultiplexer 212 is supplied to the coded buffer 241 and is temporarily stored therein. In the audio decoder 242, a decoding process is performed on the audio stream stored in the coded buffer 241, so that decoded audio data is obtained. The audio data is supplied to the channel mixing unit 244 via the audio buffer 243. In the channel mixing unit 244, audio data of each channel for realizing, for example, 5.1 channel surround or the like, is generated from the audio data. The audio data is supplied to the HDMI transmitting unit 251.

Further, in the depth control unit 220, first disparity information about each partitioned area of each picture of image data output from the disparity information control unit 262 is updated in accordance with overlaying of a caption or graphics on an image. In this case, the value of disparity information (Disparity) about the partitioned area (Partition) corresponding to the display position of the subtitle (caption) and the display position of the graphics is updated to, for example, the value of disparity information (Disparity) used for giving disparity to the subtitle (caption) or graphics. The updated disparity information is supplied to the HDMI transmitting unit 251. Also, second disparity information for each picture of image data output from the disparity information control unit 262 is supplied to the HDMI transmitting unit 251.

The HDMI transmitting unit 251 transmits, to the television receiver 300, the left-eye image data and the right-eye image data, the audio data, and also the disparity information (first disparity information and second disparity information) for each picture of image data, by performing communication compatible with HDMI. Here, the disparity information is transmitted after being inserted into an information packet located in a blanking period of the image data, in this embodiment, into an HDMI Vendor Specific InfoFrame.

[Description of Television Receiver]

Referring back to FIG. 1, the television receiver 300 receives left-eye image data and right-eye image data, audio data, and also disparity information (first disparity information and second disparity information) for each picture of image data that are transmitted from the set top box 200 via the HDMI cable 400.

In the case of displaying graphics (TV graphics) on an image in an overlaid manner, for example, the television receiver 300 obtains data of a left-eye image and a right-eye image on which graphics are overlaid, by using image data, first disparity information, and graphics data. In this case, the television receiver 300 gives, to the graphics to be overlaid on the left-eye image and the right-eye image, disparity corresponding to the display position of the graphics for each picture, thereby obtaining data of the left-eye image on which graphics are overlaid and data of the right-eye image on which graphics are overlaid.

As a result of giving disparity to the graphics in the above-described manner, the graphics (TV graphics) displayed on a stereo image in an overlaid manner can be displayed in front of an object in the stereo image at the display position. Accordingly, in the case of displaying graphics of OSD, an application, EPG of program information, or the like on an image in an overlaid manner, perspective consistency for individual objects in the image can be maintained.

Also, the television receiver 300 is capable of checking, on the basis of first disparity information and second disparity information, whether or not a disparity angle with respect to the nearest object reproduction position (a disparity angle in a crossing direction) and a disparity angle with respect to the farthest object reproduction position (a disparity angle in a same-side direction) are within the range d (see FIG. 47) in which viewing does not cause any health problems. If the disparity angles are out of the range, the television receiver 300 is capable of reconfiguring the left-eye image data and the right-eye image data.

[Example Configuration of Television Receiver]

Figure 54:
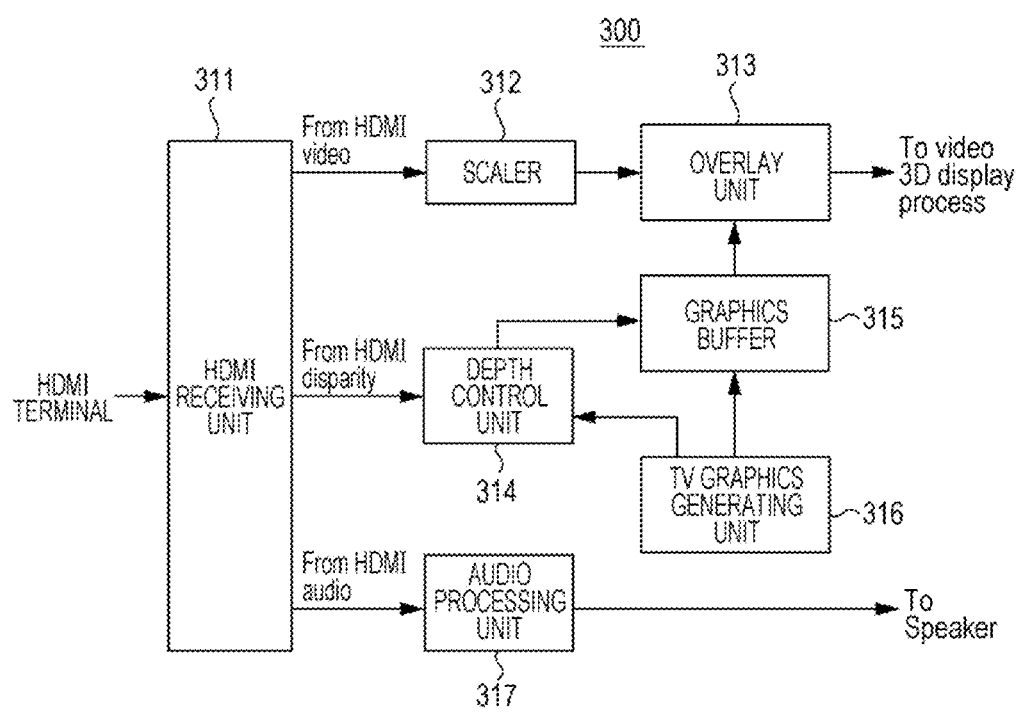
FIG. 54 is a block diagram illustrating an example configuration of a television receiver (HDMI input system).

FIG. 54 illustrates an example configuration of an HDMI input system of the television receiver 300. Note that illustration of a check system for a disparity angle is omitted. The television receiver 300 includes an HDMI receiving unit 311, a scaler 312, an overlay unit 313, a depth control unit 314, a graphics buffer 315, a television (TV) graphics generating unit 316, and an audio processing unit 317.

The HDMI receiving unit 311 receives left-eye image data and right-eye image data which form a stereo image, and audio data, from a source apparatus of HDMI, in this embodiment, from the set top box 200, by performing communication compatible with HDMI. Also, the HDMI receiving unit 311 receives disparity information (first disparity information and second disparity information) for each picture of image data from the set top box 200 using an HDMI interface. The details of the HDMI receiving unit 311 will be described below.

The scaler 312 performs a scaling process on the left-eye image data and the right-eye image data received by the HDMI receiving unit 311, if necessary. For example, the scaler 312 causes the sizes of the left-eye image data and the right-eye image data to match a display size. The television (TV) graphics generating unit 316 generates graphics data of OSD, an application, EPG, or the like. The graphics data includes graphics bitmap data "Graphics data" and display position information about the graphics "Graphics rendering position (x1, y1)".

The graphics buffer 315 temporarily stores the graphics bitmap data "Graphics data" generated by the television graphics generating unit 316. The overlay unit 313 overlays pieces of the graphics bitmap data "Graphics data" stored in the graphics buffer 315 on the left-eye image data and the right-eye image data, respectively. At this time, disparity is given by the depth control unit 314 described below, to the pieces of graphics bitmap data "Graphics data" respectively overlaid on the left-eye image data and the right-eye image data.

The depth control unit 314 gives disparity to the pieces of graphics bitmap data "Graphics data" respectively overlaid on the left-eye image data and the right-eye image data. For this purpose, the depth control unit 314 generates display position information about graphics "Rendering position" for left-eye display and right-eye display for each picture of image data, and performs shift control of overlay positions of the pieces of graphics bitmap data "Graphics data" stored in the graphics buffer 315 on the left-eye image data and the right-eye image data.

Figure 55:
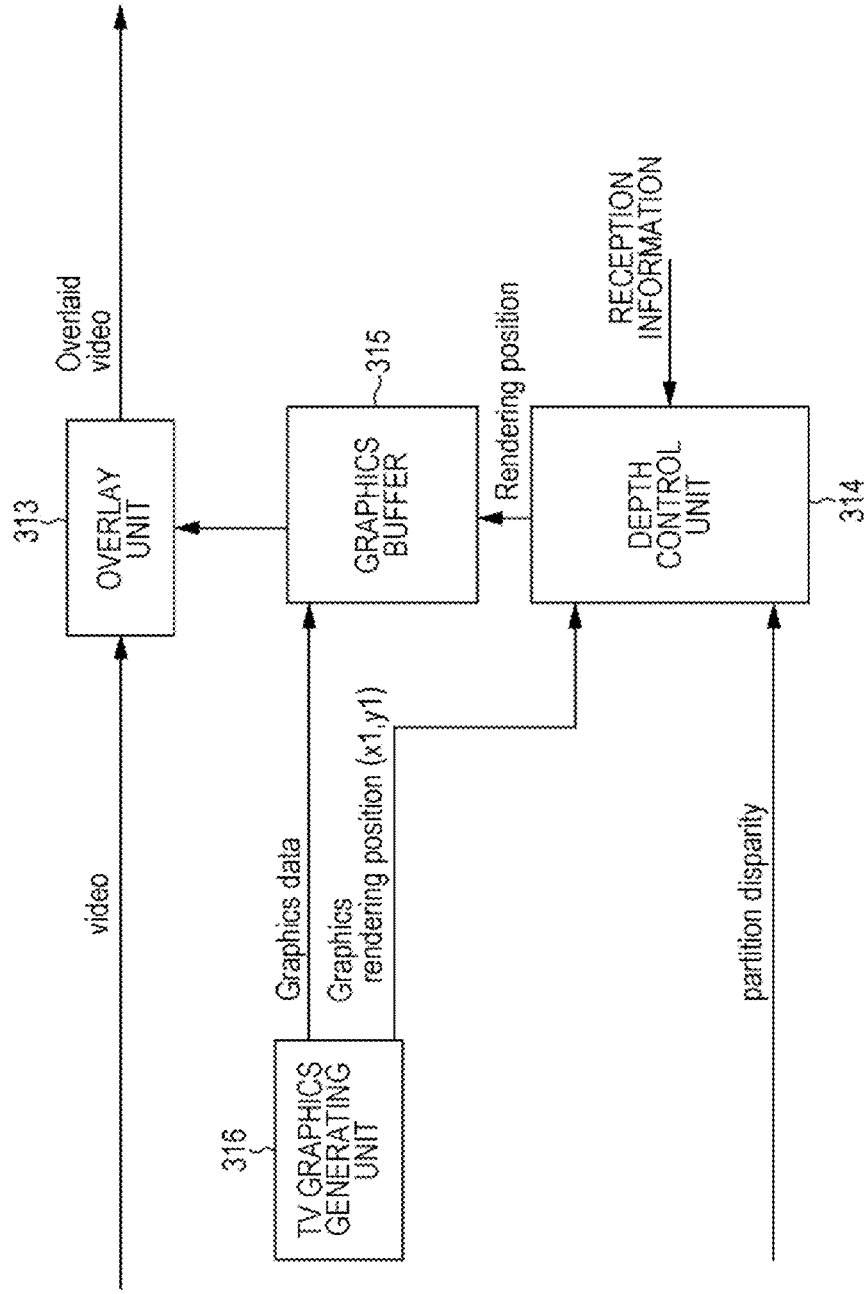
FIG. 55 is a block diagram describing control performed by a depth control unit.

As illustrated in FIG. 55, the depth control unit 314 generates display position information "Rendering position" using the following information. That is, the depth control unit 314 uses the first disparity information (Min disparity) about each partitioned area (Partition) for each picture of image data, received by the HDMI receiving unit 311. Also, the depth control unit 314 uses the display position information about graphics "Graphics rendering position (x1, y1)" generated by the television graphics generating unit 316. Also, the depth control unit 314 uses reception information indicating whether or not disparity information has been received by the HDMI receiving unit 311.

Figure 56:
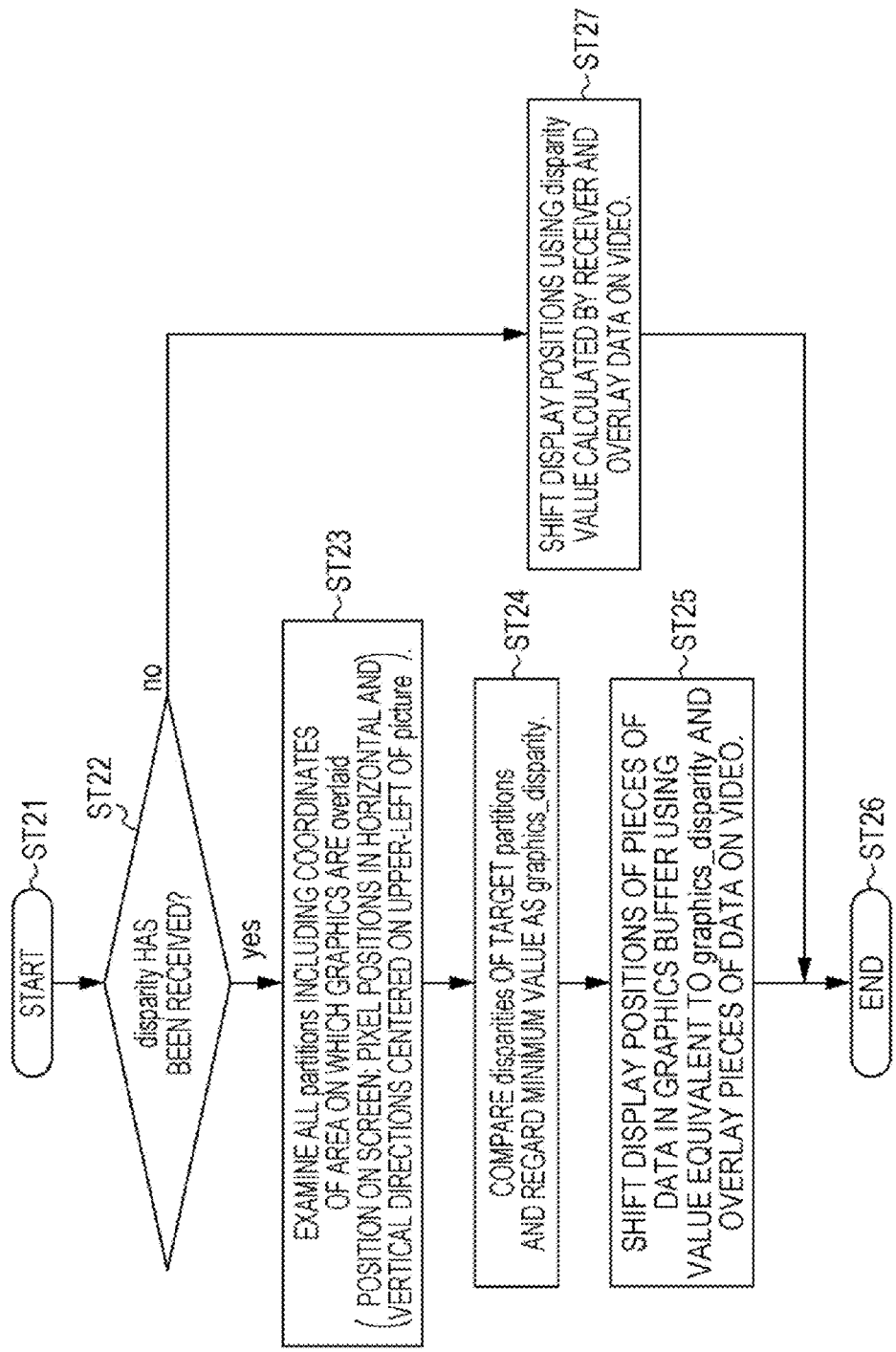
FIG. 56 is a flowchart illustrating an example of a procedure of a control process performed by the depth control unit.

The flowchart in FIG. 56 illustrates an example of a procedure of a control process performed by the depth control unit 314. The depth control unit 314 executes the control process for each picture (frame) on which graphics display is performed. The depth control unit 314 starts the control process in step ST21. Subsequently, in step ST22, the depth control unit 314 determines, on the basis of reception information, whether or not disparity information for graphics has been received by the HDMI receiving unit 311. Note that, if identification information "PRTY" of the packet of HDMI Vender Specific InfoFrame described below indicates the existence of disparity information as information to be referred to, the HDMI receiving unit 311 extracts the disparity information from the packet so as to be used. In this case, the reception information represents "received".

If the disparity information (disparity) has been received, the depth control unit 314 proceeds to the process in step ST23. In step ST23, the depth control unit 314 examines all the partitioned areas (partitions) including the coordinates at which graphics are to be displayed in an overlaid manner. Then, in step ST24, the depth control unit 314 compares the pieces of first disparity information (Min disparity) about target partitioned areas (partitions), selects an optimal value such as a minimum value, and regards the selected value as the value (graphics_disparity) of graphics disparity information (disparity).

Subsequently, in step ST25, the depth control unit 314 obtains pieces graphics bitmap data for left-eye display and right-eye display in which display positions have been shifted by using a value equivalent to the value of disparity information (disparity) for graphics (graphics_disparity), on the basis of the graphics bitmap data "Graphics data" stored in the graphics buffer 315, and overlays the pieces of graphics bitmap data on the left-eye image data and the right-eye image data, respectively. After the process in step ST25, the depth control unit 314 ends the control process in step ST26.

On the other hand, if disparity information (disparity) is not received in step ST22, the depth control unit 314 obtains pieces graphics bitmap data for left-eye display and right-eye display in which display positions have been shifted by using a value of disparity information (disparity) calculated by the television receiver 300, on the basis of the graphics bitmap data "Graphics data" stored in the graphics buffer 315, and overlays the pieces of graphics bitmap data on the left-eye image data and the right-eye image data, respectively in step ST27. After the process in step ST27, the depth control unit 314 ends the control process in step ST26.

Figure 57:
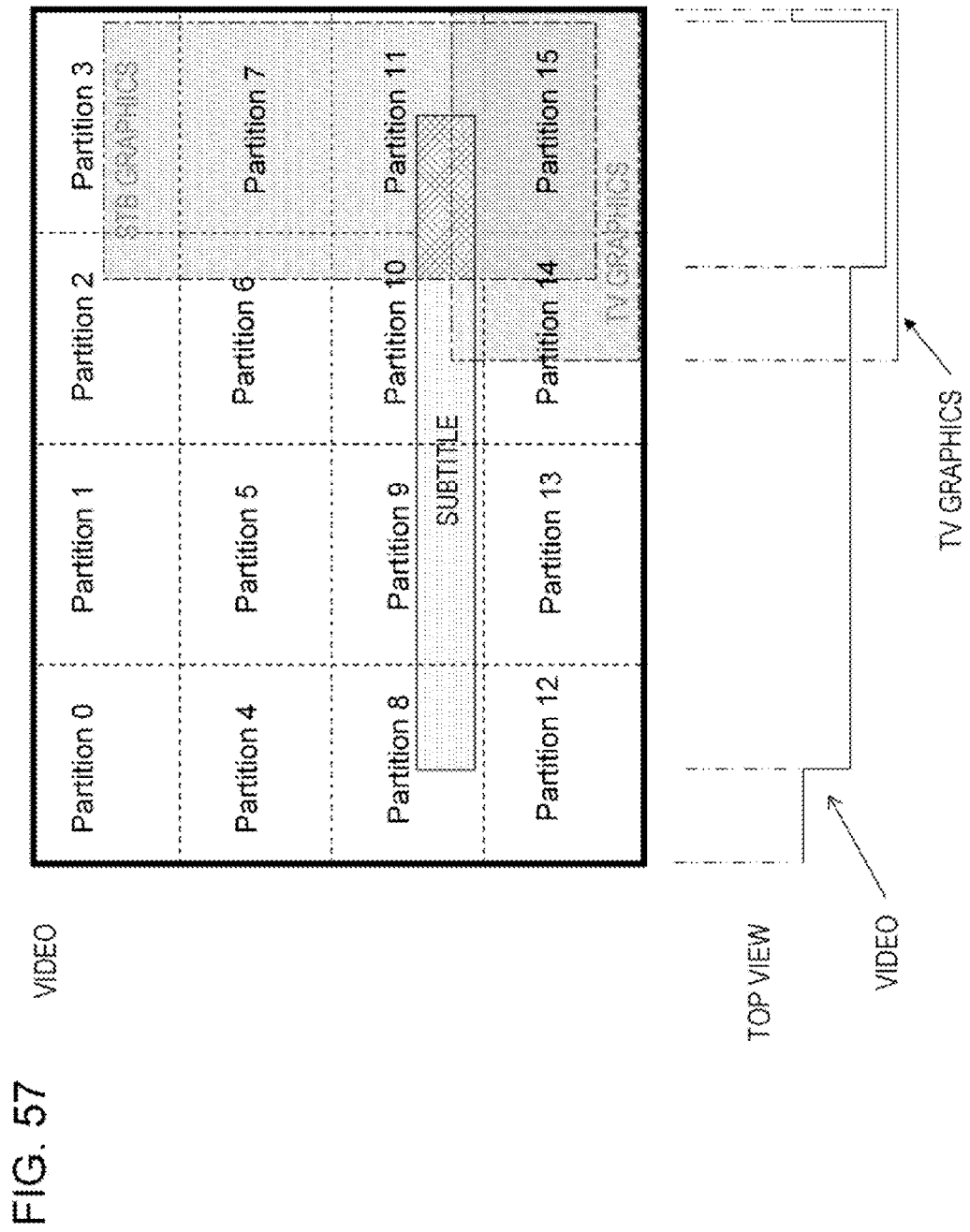
FIG. 57 is a diagram illustrating an example of controlling the depth of graphics in the television receiver.

FIG. 57 illustrates an example of controlling the depth of graphics in the television receiver 300. In this example, regarding TV graphics, disparity is given to graphics for left-eye display and graphics for right-eye display on the basis of the disparity information having a minimum value among the pieces of first disparity information about four partitioned areas (Partitions 10, 11, 14, and 15) on the right. As a result, the TV graphics are displayed in front of an image (video) object in these four partitioned areas. Note that, in this case, a subtitle (caption) and also STB graphics have already been overlaid on the image (video) by the set top box 200.

The operation of the television receiver 300 illustrated in FIG. 54 will be briefly described. The HDMI receiving unit 311 receives, from the set top box 200, left-eye image data and right-eye image data, audio data, and also disparity information (first disparity information and second disparity information) for each picture of image data, by performing communication compatible with HDMI.

The left-eye image data and the right-eye image data received by the HDMI receiving unit 311 undergo a scaling process in the scaler 312 if necessary, and are then supplied to the overlay unit 313. In the television (TV) generating unit 316, graphics data of OSD, an application, EPG, or the like is generated. The graphics data includes bitmap data of graphics "Graphics data" and display position information about the graphics "Graphics rendering position (x1, y1)". The graphics buffer 315 temporarily stores the graphics data generated by the television graphics generating unit 315.

In the overlay unit 313, pieces of graphics bitmap data "Graphics data" stored in the graphics buffer 315 are overlaid on the left-eye image data and the right-eye image data, respectively. At this time, disparity is given to the pieces of graphics bitmap data "Graphics data" respectively overlaid on the left-eye image data and the right-eye image data by the depth control unit 314, on the basis of the first disparity information (Min disparity) corresponding to the display position of the graphics.

The depth control unit 314 uses, for the control, the first disparity information about each partitioned area (Partition) for each picture of image data received by the HDMI receiving unit 311, and the display position information about graphics "Graphics rendering position (x1, y1)" generated by the television graphics generating unit 316.

The data of a left-eye image on which TV graphics for left-eye display are overlaid, and the data of a right-eye image on which TV graphics for right-eye display are overlaid are obtained from the overlay unit 313. These pieces of image data are transmitted to a processing unit for stereo image display, and stereo image display is performed.

Further, the audio data of each channel received by the HDMI receiving unit 311 is supplied to a speaker via the audio processing unit 317 that adjusts sound quality and volume, and audio output is performed in synchronization with stereo image display.

[Example Configuration of HDMI Transmitting Unit and HDMI Receiving Unit]

Figure 58:
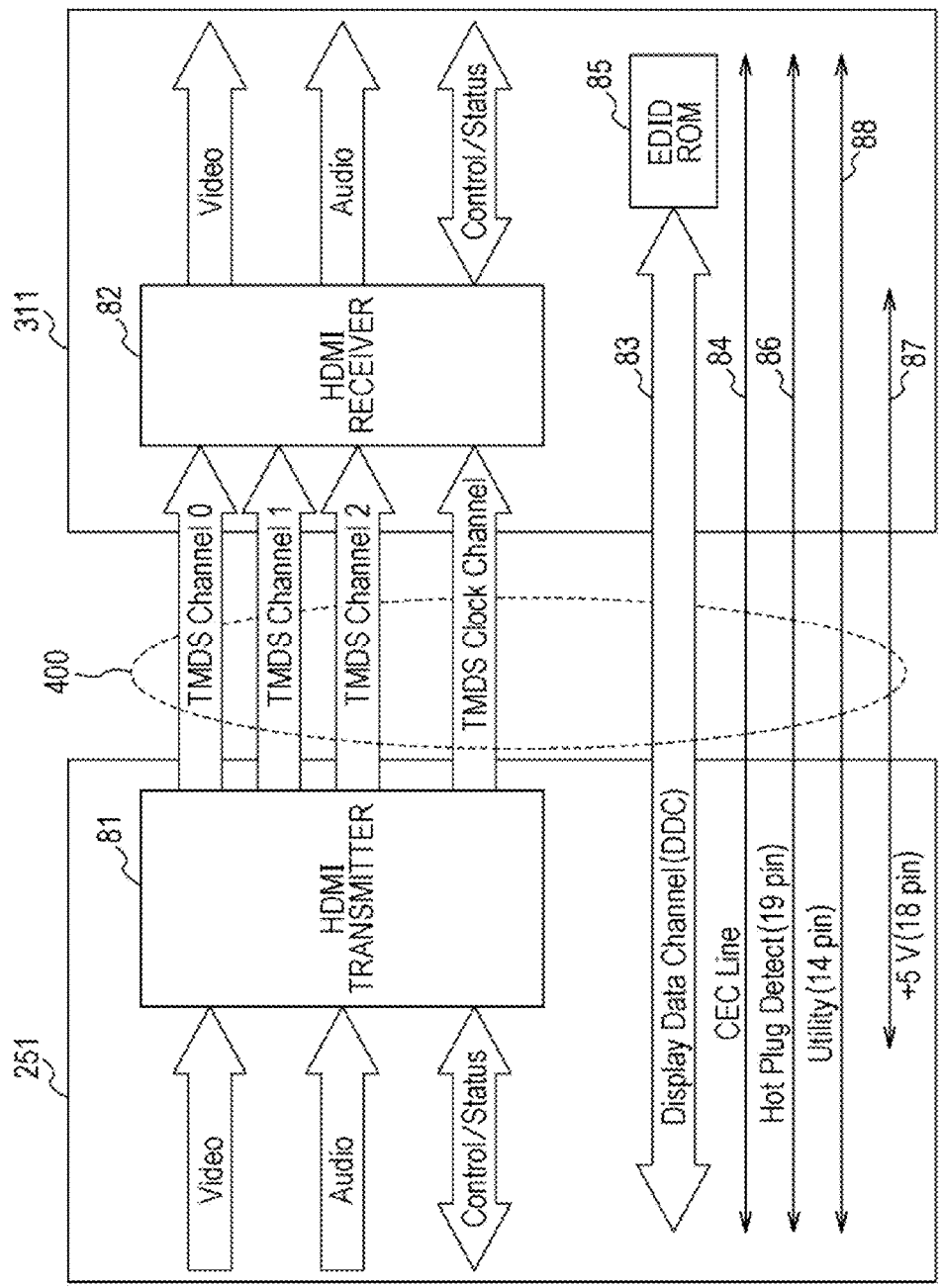
FIG. 58 is a block diagram illustrating an example configuration of an HDMI transmitting unit of a source apparatus and an HDMI receiving unit of a sink apparatus.

FIG. 58 illustrates an example configuration of the HDMI transmitting unit 251 of the set top box 200 and the HDMI receiving unit 311 of the television receiver 300 in the image transmitting/receiving system 10 in FIG. 1.

The HDMI transmitting unit 251 transmits differential signals corresponding to the pixel data of an uncompressed image for one screen to the HDMI receiving unit 311 in a unidirectional manner using a plurality of channels in an effective image period (hereinafter also referred to as an active video period as appropriate). Here, the effective image period is obtained by removing a horizontal blanking period and a vertical blanking period from the period from one vertical synchronization signal to the next vertical synchronization signal. Also, the HDMI transmitting unit 251 transmits differential signals corresponding to at least audio data accompanying an image, control data, other auxiliary data, and the like to the HDMI receiving unit 311 in a unidirectional manner using a plurality of channels in the horizontal blanking period or the vertical blanking period.

The transmission channels in the HDMI system including the HDMI transmitting unit 251 and the HDMI receiving unit 311 include the following transmission channels. That is, there are three TMDS channels #0 to #2 serving as transmission channels for serially transmitting pixel data and audio data from the HDMI transmitting unit 251 to the HDMI receiving unit 311 in a unidirectional manner in synchronization with a pixel clock. Also, there is a TMDS clock channel serving as a transmission channel for transmitting a pixel clock.

The HDMI transmitting unit 251 includes an HDMI transmitter 81. The transmitter 81 converts pixel data of an uncompressed image into corresponding differential signals and serially transmits them in a unidirectional manner to the HDMI receiving unit 311 connected via the HDMI cable 400 using a plurality of channels, that is, the three TMDS channels #0, #1, and #2, for example.

Also, the transmitter 81 converts audio data accompanying an uncompressed image, further, necessary control data, other auxiliary data, and the like into corresponding differential signals, and serially transmits them in a unidirectional manner to the HDMI receiving unit 311 using the three TMDS channels #0, #1, and #2.

Furthermore, the transmitter 81 transmits a pixel clock synchronized with the pixel data, which is transmitted using the three TMDS channels #0, #1, and #2, to the HDMI receiving unit 311 connected via the HDMI cable 400 using the TMDS clock channel. Here, in one TMDS channel #i (i=0, 1, or 2), 10-bit pixel data is transmitted in one clock of the pixel clock.

The HDMI receiving unit 311 receives the differential signals corresponding to the pixel data, transmitted in a unidirectional manner from the HDMI transmitting unit 251 using the plurality of channels, in the active video period. Also, the HDMI receiving unit 311 receives the differential signals corresponding to audio data and control data, transmitted in a unidirectional manner from the HDMI transmitting unit 251 using the plurality of channels, in the horizontal blanking period or the vertical blanking period.

That is, the HDMI receiving unit 311 includes an HDMI receiver 82. The HDMI receiver 82 receives a differential signal corresponding to pixel data and differential signals corresponding to audio data and control data, transmitted in a unidirectional manner from the HDMI transmitting unit 251 using the TMDS channels #0, #1, and #2. In this case, the HDMI receiver 82 receives the differential signals in synchronization with the pixel clock transmitted from the HDMI transmitting unit 251 using the TMDS clock channel.

The transmission channels in the HDMI system include transmission channels called a DDC (Display Data Channel) 83 and a CEC line 84, in addition to the above-described TMDS channels #0 to #2 and the TMDS clock channel. The DDC 83 is made up of two signal lines that are included in the HDMI cable 400 and that are not illustrated. The DDC 83 is used by the HDMI transmitting unit 251 to read out E-EDID (Enhanced Extended Display Identification Data) from the HDMI receiving unit 311.

That is, the HDMI receiving unit 311 includes, in addition to the HDMI receiver 81, an EDID ROM (Read Only Memory) 85 that stores E-EDID, which is performance information about its performance (Configuration/capability). The HDMI transmitting unit 251 reads out the E-EDID from the HDMI receiving unit 311 connected via the HDMI cable 400 using the DDC 83 in response to a request from a control unit (CPU) that is not illustrated, for example.

The HDMI transmitting unit 251 transmits the read out E-EDID to the control unit (CPU). The control unit (CPU) is capable of recognizing the setting of the performance of the HDMI receiving unit 311 on the basis of the E-EDID. For example, the control unit (CPU) recognizes whether or not the television receiver 300 including the HDMI receiving unit 311 is capable of handling stereo image data, and if so, further recognizes the TMDS transmission data structure that the television receiver 300 is compatible with.

The CEC line 84 is made up of a single signal line (not illustrated) included in the HDMI cable 400, and is used for performing bidirectional communication of control data between the HDMI transmitting unit 251 and the HDMI receiving unit 311. The CEC line 84 constitutes a control data line.

Also, the HDMI cable 400 includes a line (HPD line) 86 connected to a pin called an HPD (Hot Plug Detect). A source apparatus is capable of detecting the connection of a sink apparatus using the line 86. Note that the HPD line 86 is also used as an HEAC− line constituting a bidirectional communication path. Also, the HDMI cable 400 includes a line (power supply line) 87 used for supplying power from a source apparatus to a sink apparatus. Furthermore, the HDMI cable 400 includes a utility line 88. The utility line 88 is also used as an HEAC+ line constituting a bidirectional communication path.

Figure 59:
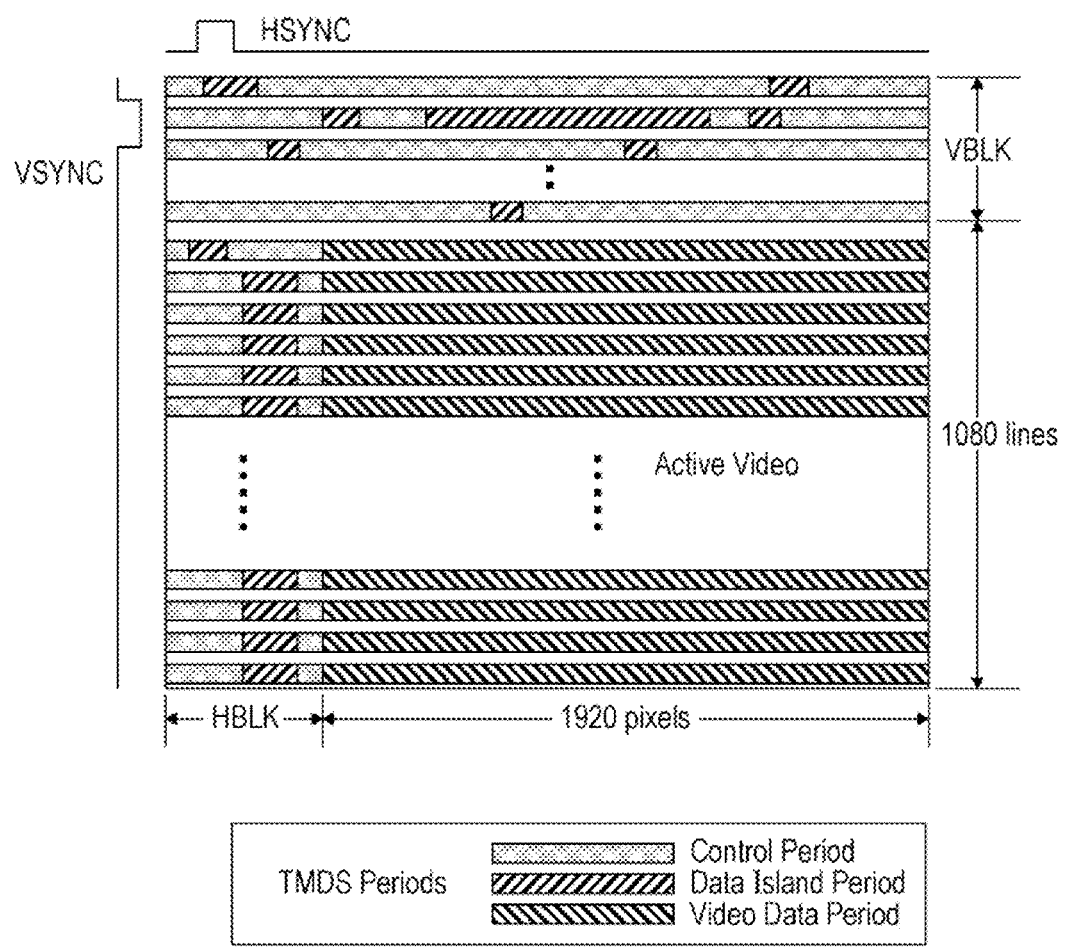
FIG. 59 is a diagram illustrating an example structure of TMDS transmission data (in a case where image data of horizontal 1920 pixels×1080 lines is transmitted).

FIG. 59 illustrates an example structure of TMDS transmission data. FIG. 59 illustrates the periods of respective pieces of transmission data in a case where image data of horizontal 1920 pixels×vertical 1080 lines is transmitted using the TMDS channels #0, #1, and #2.

In a video field where transmission data is transmitted using the three TMDS channels #0, #1, and #2 of HDMI, three types of periods exist in accordance with the type of transmission data. The three types of periods include a video data period, a data island period, and a control period.

Here, the video field period is a period from a rising edge (active edge) of a certain vertical synchronization signal to a rising edge of the next vertical synchronization signal. The video field period may be divided into a horizontal blanking period, a vertical blanking period, and an active video period. The active video period is a period obtained by removing the horizontal blanking period and the vertical blanking period from the video field period.

The video data period is allocated to the active video period. In the video data period, the data of active pixels corresponding to 1920 pixels×1080 lines constituting uncompressed image data for one screen is transmitted.

The data island period and the control period are allocated to the horizontal blanking period and the vertical blanking period. In the data island period and the control period, auxiliary data is transmitted. That is, the data island period is allocated to part of the horizontal blanking period and the vertical blanking period. In the data island period, data unrelated to control in the auxiliary data, for example, packets of audio data or the like, are transmitted.

The control period is allocated to the other part of the horizontal blanking period and the vertical blanking period. In this control period, data related to control in the auxiliary data, for example, a vertical synchronization signal and a horizontal synchronization signal, control packets, etc. are transmitted.

FIG. 60 illustrates an example of a pin array of an HDMI terminal. The pin array illustrated in FIG. 60 is called a type-A. TMDS Data#i+ and TMDS Data#i−, which are differential signals of the TMDS channel #i, are transmitted using two lines serving as differential lines. The two lines are connected to the pins to which TMDS Data#i+ is assigned (the pins having pin numbers 1, 4, and 7) and the pins to which TMDS Data#i− is assigned (the pins having pin numbers 3, 6, and 9).

Also, the CEC line 84 through which a CEC signal serving as data for control is transmitted is connected to the pin having a pin number 13. Also, the line through which an SDA (Serial Data) signal, such as E-EDID, is transmitted is connected to the pin having a pin number 16. The line through which an SCL (Serial Clock) signal, which is a clock signal used for synchronization at the transmission/reception of an SDA signal, is transmitted is connected to the pin having a pin number 15. The above-described DDC 83 is constituted by a line through which an SDA signal is transmitted and a line through which an SCL signal is transmitted.

Also, as described above, the HPD line (HEAC− line) 86 used by a source apparatus to detect the connection of a sink apparatus is connected to the pin having a pin number 19. Also, the utility line (HEAC+ line) 88 is connected to the pin having a pin number 14. Also, as described above, the line 87 for supplying power is connected to the pin having a pin number 18.

[Method for Transmitting/Receiving Disparity Information Using HDMI]

A description will be given of a method for transmitting/receiving disparity information (Disparity) about each partitioned area (Partition) for each picture of image data using an HDMI interface. As this method, a method for using an information packet located in a blanking period of image data, for example, HDMI Vender Specific InfoFrame (VS_Info), may be used.

In this method, it is assumed that "HDMI_Video_Format="010"" and "3D_Meta_present=1" in VS_Info, and "Vendor Specific InfoFrame extension" is specified. In that case, "3D_Metadata_type" is defined as unused, for example, "001", and disparity information (Disparity) about each partitioned area (Partition) is specified.

FIG. 61 illustrates an example of the packet structure of VS_Info. The VS_Info is defined in CEA-861-D, and thus the detailed description thereof is omitted. FIG. 62 illustrates the content of main information in the example of the packet structure illustrated in FIG. 61.

In the seventh bit to the fifth bit of the fourth byte (PB4), 3-bit information "HDMI_Video_Format" indicating the type of image data is located. In a case where the image data is 3D image data, the 3-bit information is "010". Also, in a case where the image data is 3D image data, 4-bit information "3D_Structure" indicating a TMDS transmission data structure is located in the seventh bit to the fourth bit of the fifth byte (PB5). For example, in the case of the frame packing method, the 4-bit information is "0000".

Also, "3D_Meta_present" is located in the third bit of the fifth byte (PB5), and, in the case of specifying Vendor Specific InfoFrame extension, the one bit is "1". Also, "3D_Metadata_type" is located in the seventh bit to the fifth bit of the seventh byte (PB7). In the case of specifying disparity information (Disparity) about each partitioned area (Partition), the 3-bit information is unused, for example, "001".

Also, "3D_Metadata_length" is located in the fourth byte to the zeroth byte of the seventh byte (PB7). The 5-bit information indicates the size of disparity information (Disparity) about each partitioned area (Partition). The value of the "3D_Metadata_length" ranges from 0x00 to 0x1F, and the value obtained by adding 2 to the value represents the entire size of the disparity information (Disparity) after this field. For example, "00000" represents 2 (in decimal number) and "11111" represents 33 (in decimal number).

Also, 1-bit identification information "PRTY" is located in the zeroth bit of the sixth byte (PB6). The identification information indicates whether or not the VS_Info includes information to be referred to by an HDMI sink side, here, disparity information (Disparity). "1" indicates that information to be referred to by the HDMI sink is absolutely included. "0" indicates that information to be referred to by the HDMI sink is not necessarily included.

With the 1-bit identification information "PRTY" being located, the HDMI sink, in this embodiment, the television receiver 300, is capable of determining whether or not VS_Info includes information to be referred to, without examining "3D_Metadata_type" and thereafter. Thus, the identification information enables the HDMI sink to efficiently perform a process of extracting information to be referred to from VS_Info, and accordingly a processing load can be reduced.

Also, "partition_type" is located in the seventh bit to the fifth bit of the eighth byte (PB8). The 3-bit information indicates the partition type of the display screen of a target picture. "000" indicates that the display screen is not partitioned, "001" indicates that the display screen is partitioned into two equal areas in each of horizontal and vertical directions, and "010" indicates that the display screen is partitioned into four equal areas in each of horizontal and vertical directions.

Also, 1-bit identification information "d_picture" is located in the fourth bit of the eighth byte (PB8). The identification information represents a single picture or double picture. "0" represents a single picture, that is, the mode of transmitting disparity information (Disparity) about each partitioned area (Partition) for one picture. "1" represents a double picture, that is, the mode of transmitting disparity information (Disparity) about each partitioned area (Partition) for two pictures.

Also, "partition_count" is located in the third bit to the zeroth bit of the eighth byte (PB8). The 4-bit information represents the total number of partitioned areas (Partitions), and is a value dependent on the above-described "partition_type". For example, "0000" represents a total number "1", and "1111" represents a total number "16".

Further, from the 8+1-th byte (PB8+1), pieces of disparity information (first disparity information and second disparity information) for one picture or two pictures are sequentially located. The 8-bit information "max_disparity_in_picture" indicates the second disparity information about the entire picture display screen (the entire picture), that is, the maximum disparity information (disparity value) about the entire picture. The 8-bit information "disparity_in_partition" indicates the first disparity information about each partitioned area (Partition), that is, the minimum disparity information (disparity value) about each partitioned area.

FIG. 63 illustrates an example structure of VS_Info in a case where "d_picture=0", that is, the mode is a single-picture mode, and "partition_type=010", that is, the number of partitioned areas is "16". In this case, disparity information about each partitioned area for one picture is located in the 8+1-th byte (PB8+1) and thereafter. On the other hand, FIG. 64 illustrates an example structure of VS_Info in a case where "d_picture=1", that is, the mode is a double-picture mode, and "partition_type=010", that is, the number of partitioned areas is "16". In this case, disparity information about each partitioned area for two pictures is located in the 8+1-th byte (PB8+1) and thereafter.

As described above, in a case where a video stream includes disparity information inserted thereinto in units of pictures, the set top box 200 obtains disparity information for one picture at the timing of each picture of image data (see FIG. 42). Further, as described above, in a case where a video stream includes disparity information inserted into in units of GOPs, the set top box 200 collectively obtains pieces of disparity information (disparity information set) for individual pictures in a GOP at the timing of the head of the GOP of image data (see FIG. 43).

In any case, the set top box 200 is capable of arbitrarily selecting either a single-picture mode or a double-picture mode on the basis of, for example, negotiation using the CEC line 84 between the set top box 200 and the television receiver 300, or the setting in the EDID ROM 85. In this case, the set top box 200 is capable of selecting a mode in accordance with a transmission band for transmitting disparity information for each picture or the processing ability of the set top box 200 and the television receiver 300, and is capable of favorably transmitting disparity information to the television receiver 300.

In the television receiver 300, disparity information (Disparity) about all pictures can be accurately received in any transmission mode, on the basis of the mode identification information "d_picture" located in VS_Info and the above-described identification information indicating whether or not reference information "PRTY" exists.

Figure 65:
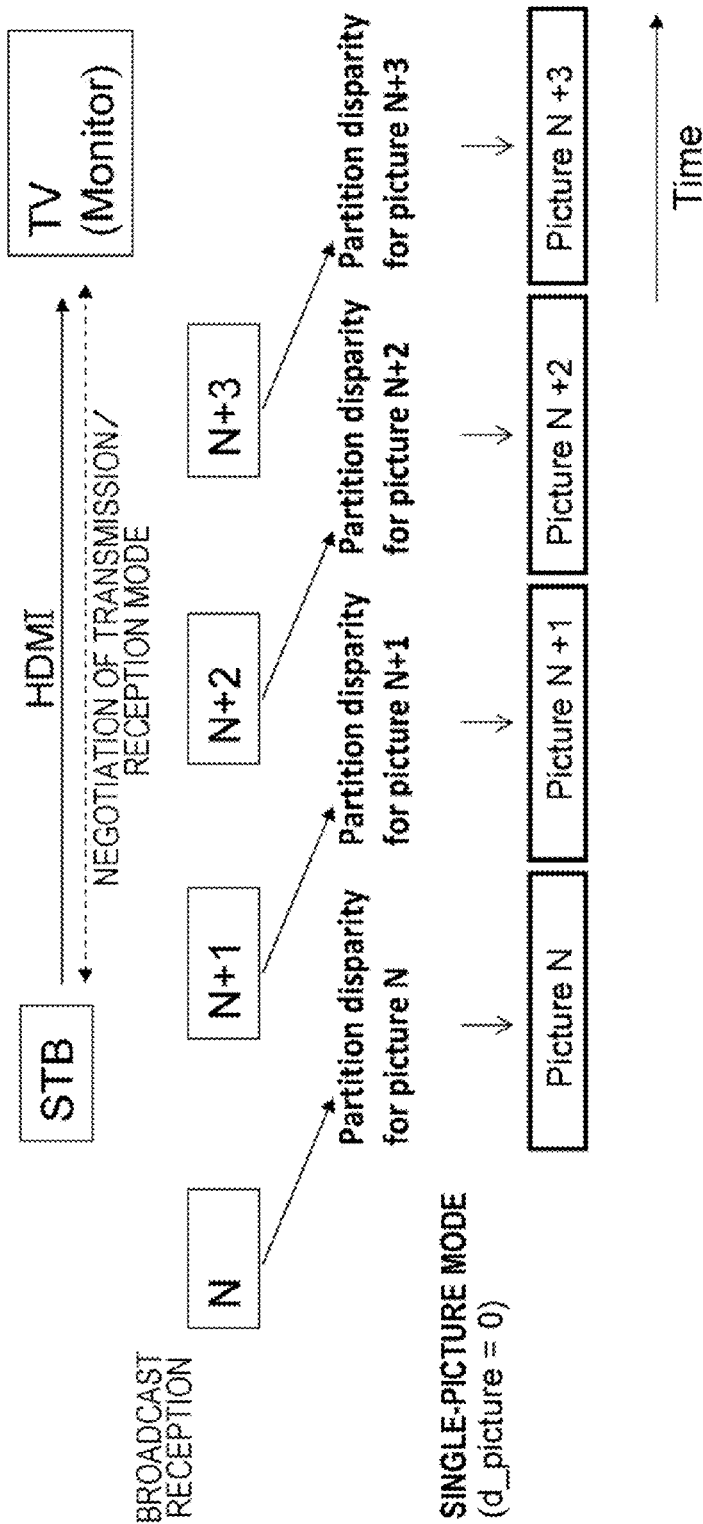
FIG. 65 is a diagram schematically illustrating the case of performing reception in units of pictures and transmission in a single-picture mode.

FIG. 65 schematically illustrates a case where the set top box 200 obtains disparity information for one picture at the timing of each picture of image data, and sequentially transmits pieces of disparity information for individual pictures to the television receiver 300 in a single-picture mode. Also, FIG. 66 schematically illustrates a case where the set top box 200 obtains disparity information for one picture at the timing of each picture of image data, and sequentially transmits pieces of disparity information for individual pictures to the television receiver 300 in a double-picture mode.

Figure 67:
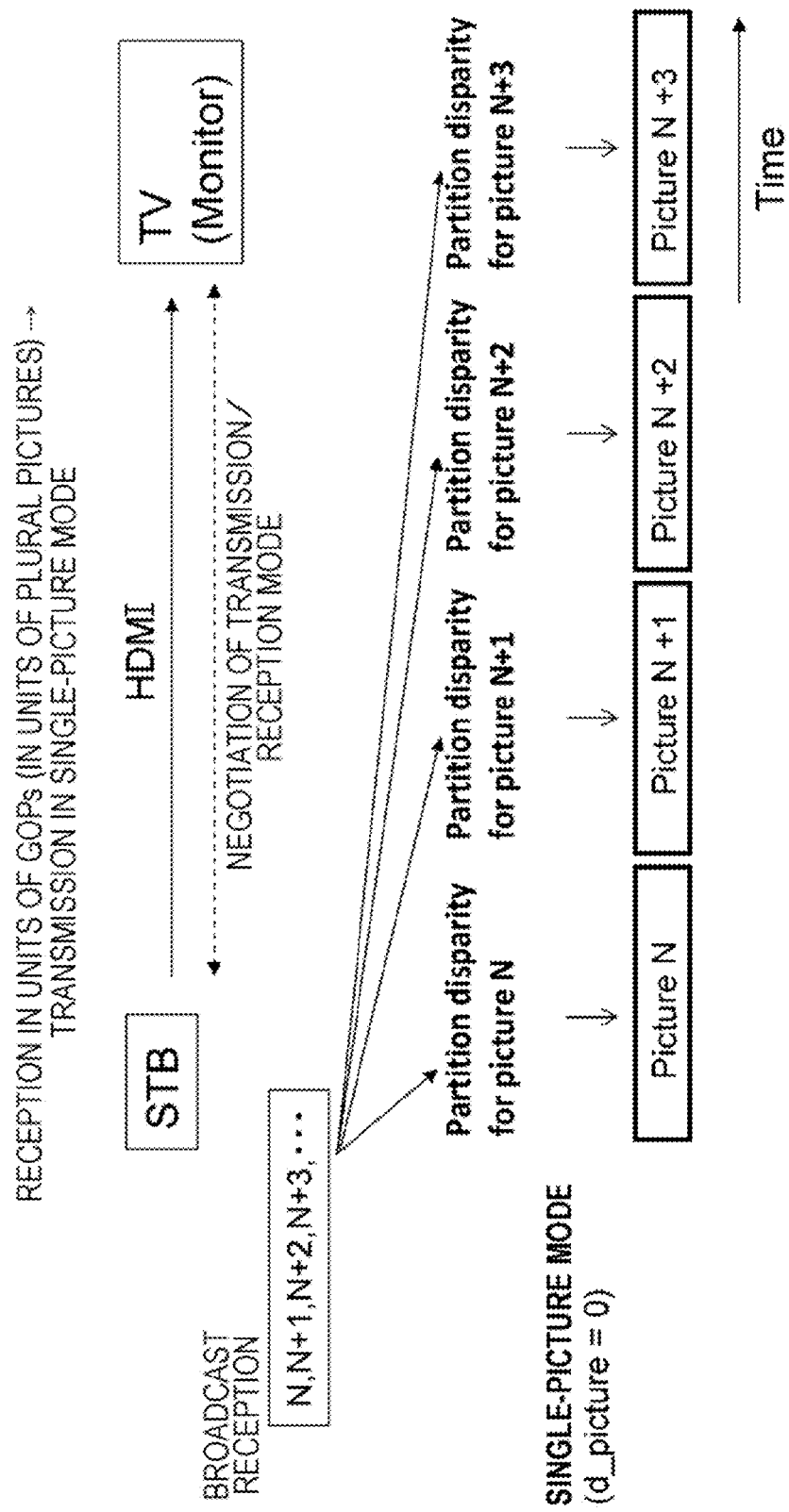
FIG. 67 is a diagram schematically illustrating the case of performing reception in units of GOPs (a plurality of pictures) and transmission in a single-picture mode.

Also, FIG. 67 schematically illustrates a case where the set top box 200 collectively obtains pieces of disparity information for individual pictures in a GOP at the timing of the head of the GOP of image data, and sequentially transmits the pieces of disparity information for the individual pictures to the television receiver 300 in a single-picture mode. Further, FIG. 68 schematically illustrates a case where the set top box 200 collectively obtains pieces of disparity information for individual pictures in a GOP at the timing of the head of the GOP of image data, and sequentially transmits the pieces of disparity information for the individual pictures to the television receiver 300 in a double-picture mode.

Note that a description has been given above that the set top box 200 is capable of arbitrarily selecting a single-picture or a double-picture mode. However, for example, in the case of collectively obtaining pieces of disparity information for individual pictures in a GOP at the timing of the head of the GOP of image data, the pieces of disparity information may be transmitted in a single-picture mode. In this case, pieces of disparity information for individual pictures in the GOP are allocated to single pictures, and the pieces of disparity information for individual single pictures are sequentially transmitted in units of pictures (see FIG. 67). In this case, even if the transmission band for transmitting a piece of disparity information for each picture is narrow, the piece of disparity information for each picture can be favorably transmitted to the television receiver 300.

Figure 66:
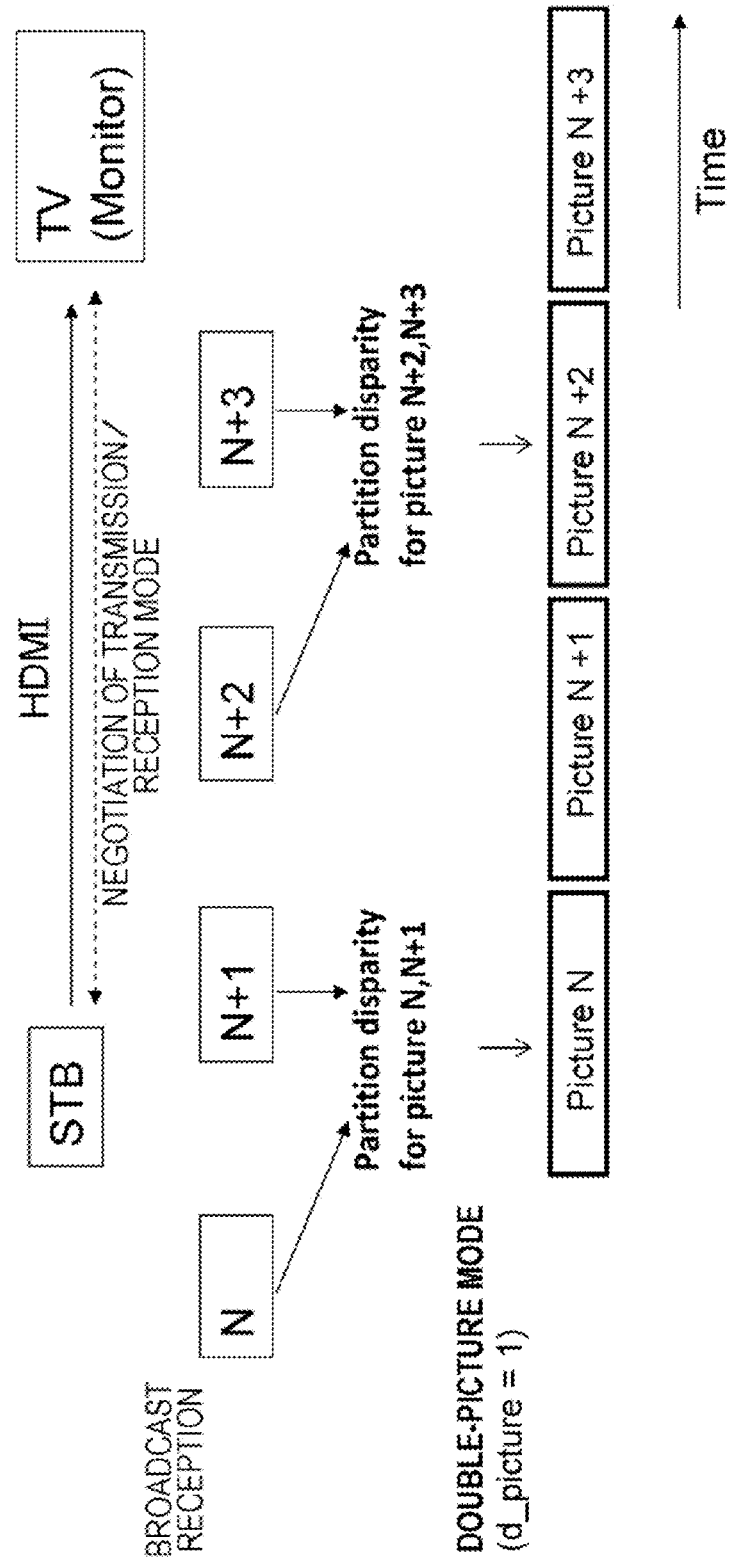
FIG. 66 is a diagram schematically illustrating the case of performing reception in units of pictures and transmission in a double-picture mode.

On the other hand, in a case where the set top box 200 is capable of transmitting VS_InfoFrame only once in two video frame periods, or in a case where the television receiver 300 is capable of receiving VS_InfoFrame only once in two video frame periods, disparity information for two video frames may be sequentially transmitted using a single VS_InfoFrame, as illustrated in FIG. 66.

Note that a description has been given above of an example of transmitting pieces of disparity information for a first picture and a second picture which are sequentially adjacent to each other as they are, that is, in the state of intra data, in units of two pictures (two frames) in a double-picture mode. However, in the double-picture mode, the disparity information for the first picture or the second picture may be difference data from the disparity information for the immediately preceding picture, so as to reduce the amount of transmission data.

FIG. 69 and FIG. 70 illustrate other examples of the packet structure of VS_Info (HDMI Vendor Specific InfoFrame). Although a detailed description is omitted, the structure of the zeroth byte (PB0) to the sixth byte (PB6) is the same as the above-described example of the packet structure illustrated in FIG. 61. FIG. 71 illustrates the content of main information in the examples of the packet structure illustrated in FIG. 69 and FIG. 70.

In the seventh bit to the fifth bit of the seventh byte (PB7), "3D_Metadata_type" is located. In the case of specifying the disparity information (Disparity) about each partitioned area (Partition), the 3-bit information is unused, for example, "001".

Also, in the fourth byte to the zeroth byte of the seventh byte (PB7), "3D_Metadata_length" is located. The 5-bit information indicates the size of disparity information (Disparity) about each partitioned area (Partition). The value of the "3D_Metadata_length" ranges from 0x00 to 0x16. For example, "00011" represents 3 (in decimal number), and "11010" represents 26 (in decimal number).

In the seventh bit of the eighth byte (PB8), 1-bit identification information "d_picture" is located. The identification information represents a single picture or a double picture. "0" represents a single picture, that is, the mode of transmitting disparity information (Disparity) for one picture as disparity information (Disparity) about each partitioned area (Partition). "1" represents a double picture, that is, the mode of transmitting disparity information (Disparity) for two pictures as disparity information (Disparity) about each partitioned area (Partition).

In the fifth bit of the eighth byte (PB8), 1-bit identification information "partition enable" is located. The identification information indicates whether or not the target picture has disparity information (Disparity) about each partitioned area (Partition). "1" indicates that partitioned areas are specified in the horizontal and vertical directions, and each partitioned area has disparity information (Disparity). "0" indicates that the entire screen has one piece of disparity information (Disparity).

In the sixth bit of the eighth byte (PB8), 1-bit identification information "Picture reorder" is located. The identification information indicates, in the case of transmitting a double picture, which of two pictures (N, N+1) is transmitted first, that is, N is chronologically the first and N+1 is the second, or N+1 is chronologically the first and N is the second. "1" indicates that the (N+1) picture is the first, the value of disparity information (Disparity) is represented by 8 bits, the N picture is the second, and a difference value from the disparity information (Disparity) for the (N−1) picture is represented by 4 bits. "0" indicates that the N picture is the first, the value of disparity information (Disparity) is represented by 8 bits, the (N+1) picture is the second, and a difference value from the disparity information (Disparity) for the N picture is represented by 4 bits.

Also, in the third bit to the zeroth bit of the eighth byte (PB8), "partition_count" is located. The 4-bit information represents the total number of partitioned areas (Partitions). For example, "0000" represents a total number "1", and "1111" represents a total number "16".

Then, in the 8+1-th byte (PB8+1) and thereafter, pieces of disparity information (first disparity information and second disparity information) for one picture or two pictures are sequentially located. The 8-bit information "max_disparity_in_picture" indicates the second disparity information about the entire picture display screen (the entire picture), that is, the maximum disparity information (disparity value) about the entire picture. The 8-bit information "Min_disparity_in_partition" indicates the first disparity information about the each partitioned area (Partition), that is, the minimum disparity information (disparity value) about each partitioned area.

The example structure of VS_Info in FIG. 69 illustrates an example structure of VS_Info in a case where "d_picture=1" and the mode is a double-picture mode, and "picture_reorder=0" and the N picture is chronologically located before the N+1 picture. Note that this example illustrates a case where "partition_count=1111" and the number of partitioned areas is "16".

In this case, "Max_disparity_in_picture", which is the second disparity information about the entire picture display screen in the N picture, that is, the maximum disparity information (disparity value) for the entire picture, is located in the 8+1-th byte (PB8+1). Also, "Min_disparity_in_partition", which is the first disparity information about each partitioned area (Partition) in the N picture, that is, the minimum disparity information (disparity value) for each partitioned area, is located in the 8+2-th byte (PB8+2) to the 8+16-th byte (PB8+16).

Also, in this case, "Differential_max_disparity_in_picture", which is the second disparity information about the entire picture display screen in the N+1 picture, that is, the difference data of the maximum disparity information (disparity value) for the entire picture, is located in the third bit to the zeroth bit of the 8+17-th byte (PB8+17). "Differential_min_disparity_in_partition", which is the first disparity information about each partitioned area (Partition) in the N+1 picture, that is, the difference value of the minimum disparity information (disparity value) for each partitioned area, is located in the 8+18-th byte (PB8+18) to the 8+25-th byte (PB8+25).

The example structure of VS_Info in FIG. 70 illustrates an example structure of VS_Info in a case where "d_picture=1" and the mode is a double-picture mode, and "picture_reorder=1" and the N+1 picture is chronologically located before the N picture. Note that this example illustrates a case where "partition_count=1111" and the number of partitioned areas is "16".

In this case, "Max_disparity_in_picture", which is the second disparity information about the entire picture display screen in the N+1 picture, that is, the maximum disparity information (disparity value) for the entire picture, is located in the 8+1-th byte (PB8+1). Also, "Min_disparity_in_partition", which is the first disparity information about each partitioned area (Partition) in the N+1 picture, that is, the minimum disparity information (disparity value) for each partitioned area, is located in the 8+2-th byte (PB8+2) to the 8+16-th byte (PB8+16).

Also, in this case, "Differential_max_disparity_in_picture", which is the second disparity information about the entire picture display screen in the N picture, that is, the difference data of the maximum disparity information (disparity value) for the entire picture, is located in the third bit to the zeroth bit of the 8+17-th byte (PB8+17). "Differential_min_disparity_in_partition", which is the first disparity information about each partitioned area (Partition) in the N picture, that is, the difference value of the minimum disparity information (disparity value) for each partitioned area, is located in the 8+18-th byte (PB8+18) to the 8+25-th byte (PB8+25).

[Determination of Order of N Picture and N+1 Picture]

Figure 72:
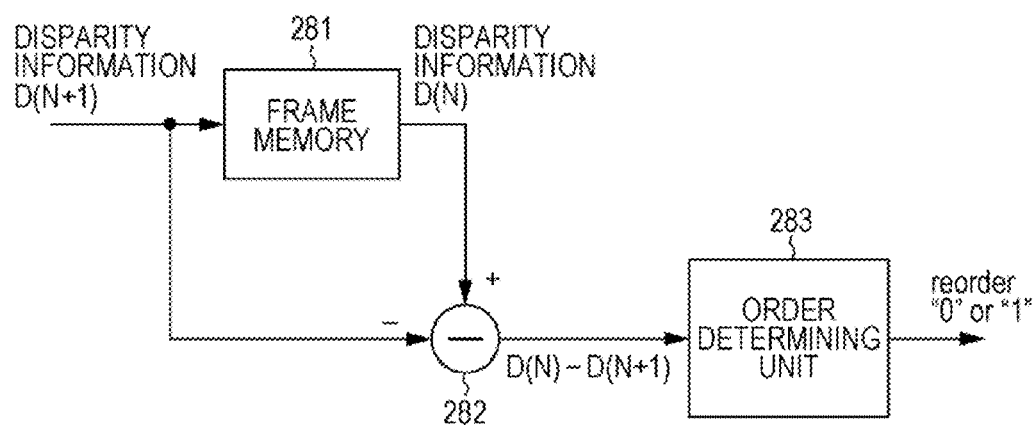
FIG. 72 is a block diagram illustrating an example configuration for determining the order of an N picture and an N+1 picture.

Here, determination of the order of an N picture and an N+1 picture, that is, determination of whether "picture_reorder" is to be "0" or "1", is performed in the following manner, for example. Determination of the order of an N picture and an N+1 picture is performed, for example, with the configuration illustrated in FIG. 72. Disparity information is supplied to a frame memory 281 and is delayed by one frame. In a subtracter 282, difference data "D(N)−D(N+1)" between disparity information D(N+1) for an N+1 picture and disparity information D(N) for an N picture is calculated, and the difference data is transmitted to an order determining unit 283.

In the order determining unit 283, the absolute value of the difference data |D(N)−D(N+1)| is compared with a threshold Th, and the order of the N picture and the N+1 picture is determined. When |D(N)−D(N+1)|≤Th, the order determining unit 283 determines that "the N picture is the first and the N+1 picture is the second", sets "picture_reorder" of VS_Info to "0", and locates the disparity information for the N picture and the N+1 picture in VS_Info in the manner illustrated in FIG. 69. In this case, the disparity information for the N+1 picture is difference data with respect to the disparity information for the N picture.

Figure 73:
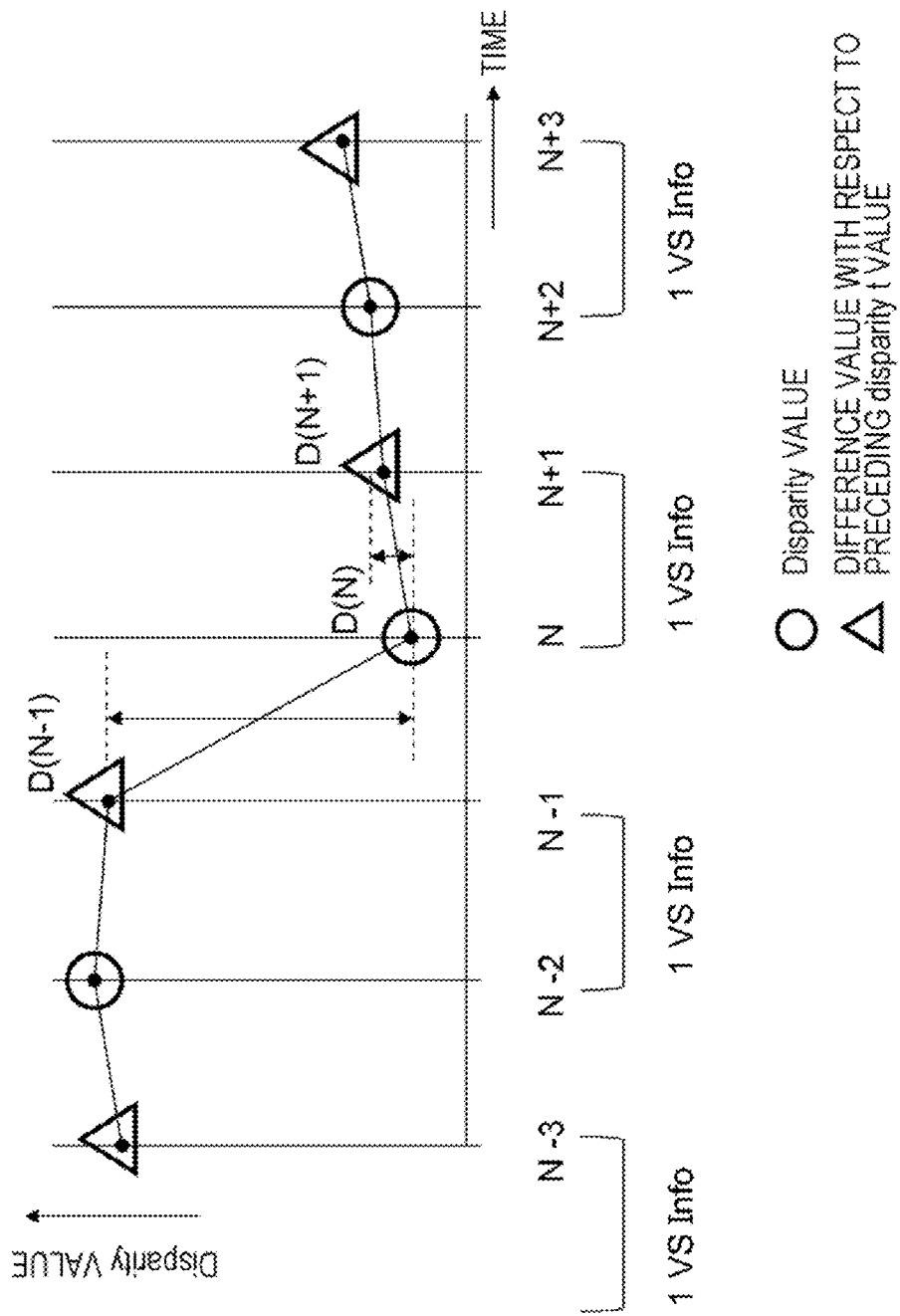
FIG. 73 is a diagram illustrating an example of a time transition of disparity information (disparity value) in a case where $|D(N+1)-D(N)| \leq Th$.

FIG. 73 illustrates an example of a temporal transition of disparity information (Disparity value) in a case where |D(N)−D(N+1)|≤Th. In this example, disparity information significantly changes between the N−1 picture and the N picture. However, the change in disparity information is small between the N picture and the N+1 picture. Thus, |D(N)−D(N+1)|≤Th is satisfied. In this case, the disparity information for N+1 picture is the difference data with respect to the disparity information for the N picture, and thus the value thereof is relatively small.

On the other hand, when |D(N)−D(N+1)|>Th, the order determining unit 283 determines that "the N+1 picture is the first and the N picture is the second", sets "picture_reorder" of VS_Info to "0", and locates the disparity information for the N+1 picture and the N picture in VS_Info in the manner illustrated in FIG. 70. In this case, the disparity information for the N picture is difference data with respect to the disparity information for the N−1 picture.

Figure 74:
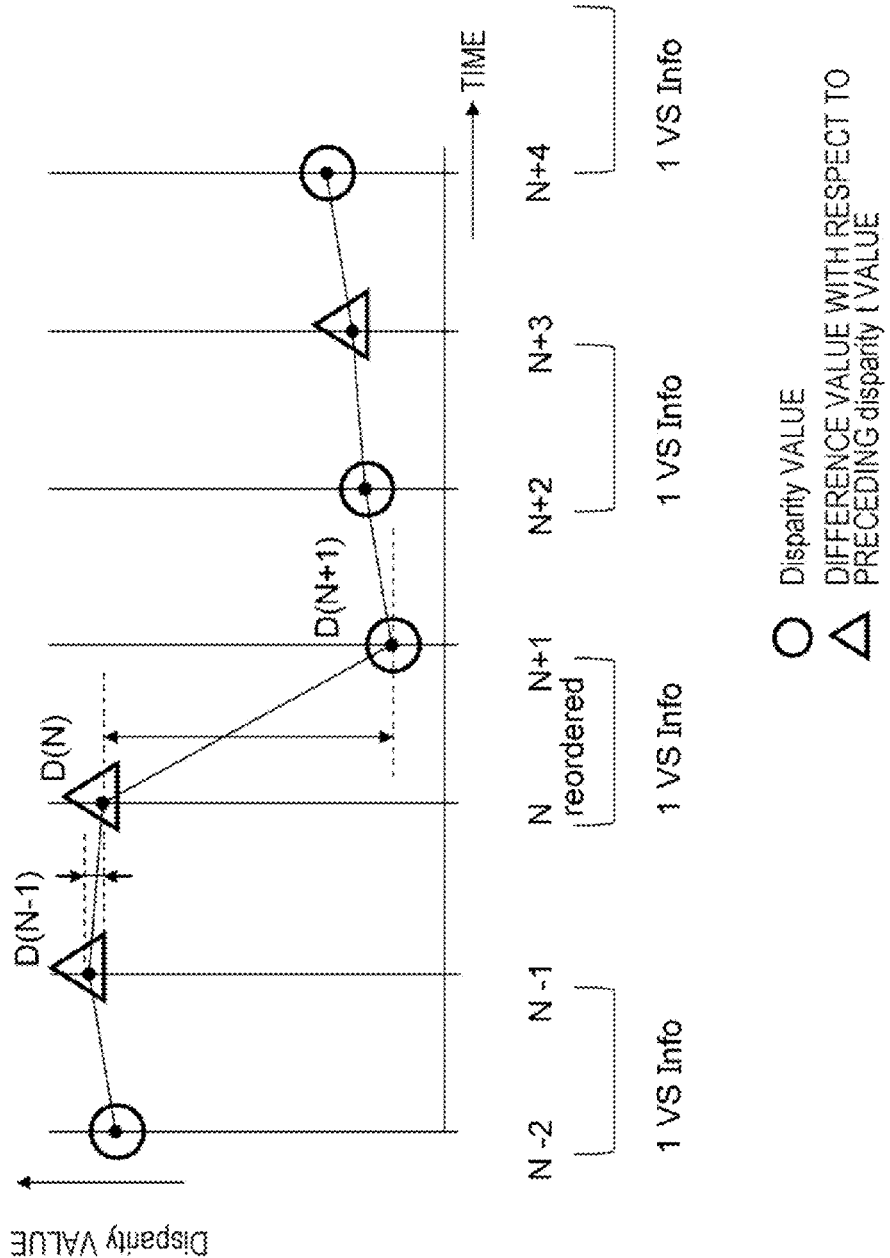
FIG. 74 is a diagram illustrating an example of a time transition of disparity information (disparity value) in a case where $|D(N+1)-D(N)| > Th$.

FIG. 74 illustrates an example of a temporal transition of disparity information (Disparity value) in a case where |D(N)−D(N+1)|>Th. In this example, the change in disparity information is small between the N−1 picture and the N picture, but the change in disparity information is large between the N picture and the N+1 picture. Thus, |D(N)−D(N+1)|>Th is satisfied. In this case, the disparity information for the N picture is the difference data with respect to the disparity information for the N−1 picture, and thus the value thereof is relatively small.

Here, regarding "Min_disparity_in_partition", minimum values Min_disparity(N+1) and Min_disparity(N) of "Min_disparity_in_partition" of each partitioned area (Partition) are used as D(N+1) and D(N), as expressed by the following equations (2) and (3), respectively.

$$D(N+1) = \text{Min\_disparity}(N+1) \qquad (2)$$
$$= \text{Minimum}(\text{Min\_disparity\_partition}(N+1\_0,$$
$$N+1\_1, --, N+1\_15))$$

$$D(N) = \text{Min\_disparity}(N) \qquad (3)$$
$$= \text{Minimum}(\text{Min\_disparity\_parttion}$$
$$(N\_0, N\_1, --, N\_15))$$

Note that, regarding D(N), "Min_disparity_partition" of the N picture in the same partitioned area (Partition) as "Min_disparity_partition", which is Min_disparity (N+1) adopted as D(N+1) in the foregoing equation (2), may be used instead of obtaining it by using the foregoing equation (3).

On the other hand, regarding "Max_disparity_in_picture", "Max_disparity_in_picture" of the N+1 picture is used as D(N+1), and "Max_disparity_in_picture" of the N picture is used as D(N). Note that, regarding a determination result of comparison between |D(N)−D(N+1)| and Th, if the result regarding "Min_disparity_in_partition" does not match the result regarding "Max_disparity_in_picture", the result regarding "Min_disparity_in_partition" may be preferentially used.

Note that, in the above-described example structure of VS_Info illustrated in FIG. 70, the N+1 picture is chronologically located before the N picture. In this way, the structure from the 8+1-th byte (PB8+1) to the 8+25-th byte (PB+25) becomes the same as the example structure of VS_Info in FIG. 69, in which the N picture is chronologically located before the N+1 picture, and thus reading is stably performed on a receiving side. However, in the example structure of VS_Info illustrated in FIG. 70, the positions of the disparity information for the N+1 picture and the disparity information for the N picture may be reversed.

Also, in the description given above, an example in which the set top box 200 is capable of selecting a single-picture or a double-picture mode has been described. However, plural-picture mode may be used instead of the double-picture mode, and the number of pictures may be arbitrarily selected. Further, there may be a case where the number of selectable modes is three or more. In that case, it is possible to change the number of partitioned areas (partitions) to an appropriate number on the HDMI source side so that transmission can be performed in a given band.

As described above, in the image transmitting/receiving system 10 illustrated in FIG. 1, the broadcast station 100 inserts first disparity information and second disparity information that are obtained for each of certain pictures of image data into a video stream, and transmits the video stream. Here, the first disparity information is disparity information corresponding to the nearest object reproduction position in a certain area of a picture display screen, and the second disparity information is disparity information corresponding to the farthest object reproduction position in the certain area of the picture display screen. Thus, for example, on the basis of the first disparity information and the second disparity information, the set top box 200 on a receiving side is capable of checking whether or not a disparity angle is within a certain range in which viewing does not cause any health problems, and reconfiguring left-eye image data and right-eye image data if necessary.

Further, in the image transmitting/receiving system 10 illustrated in FIG. 1, the broadcast station 100 performs a process of compression encoding on disparity information when inserting the disparity information obtained for each of certain pictures of image data into a video stream and transmitting the video stream, and the amount of data can be reduced.

2. Modification

Figure 75:
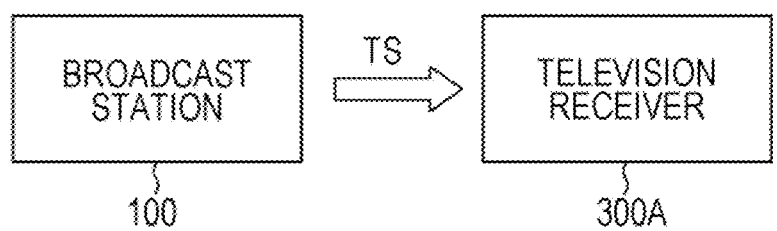
FIG. 75 is a block diagram illustrating another example configuration of the image transmitting/receiving system.

Note that, in the above-described embodiment, the image transmitting/receiving system 10 is constituted by the broadcast station 100, the set top box 200, and the television receiver 300. However, as illustrates in FIG. 75, an image transmitting/receiving system 10A constituted by the broadcast station 100 and a television receiver 300A may be employed.

Figure 76:
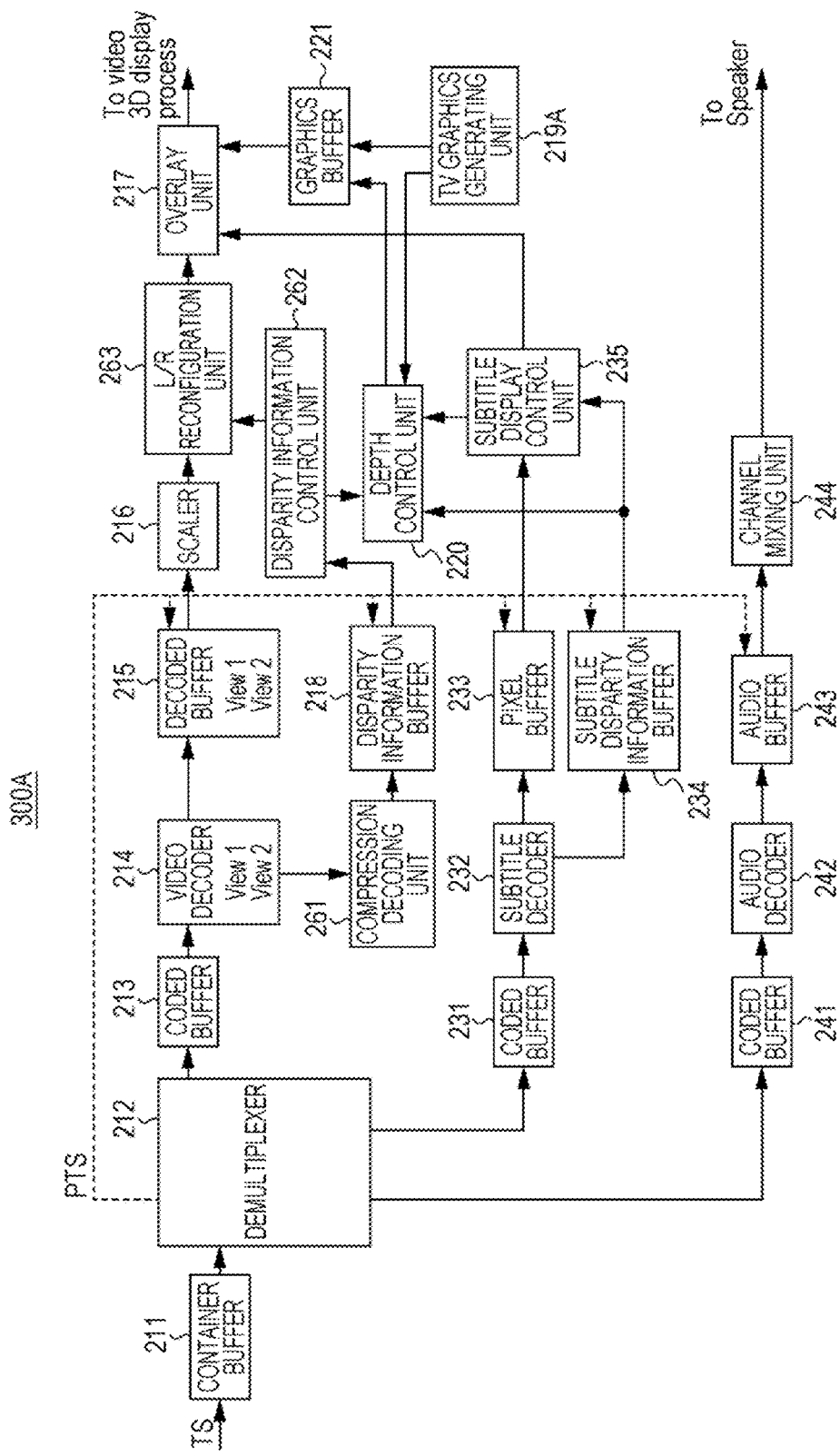
FIG. 76 is a block diagram illustrating another example configuration of the television receiver.
Figure 77:
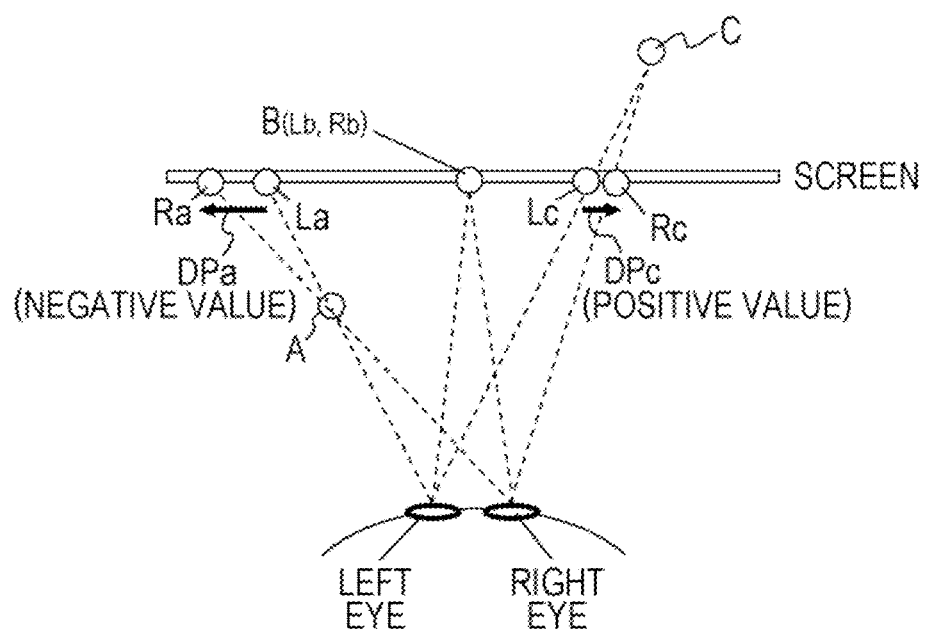
FIG. 77 is a diagram illustrating the relationship between display positions of left and right images of an object on a screen and a reproduction position of a stereo image formed therefrom in stereo image display utilizing binocular disparity.

FIG. 76 illustrates an example configuration of the television receiver 300A. In FIG. 76, the parts corresponding to those in FIG. 45 are denoted by the same reference numerals, and the detailed description thereof is omitted. A television (TV) graphics generating unit 219A is similar to the set top box (STB) graphics generating unit 219 of the set top box 200 in FIG. 45, and generates graphics data of OSD, an application, EPG, or the like.

From the overlay unit 217, data of a left-eye image on which a subtitle (caption) and graphics for left-eye display are overlaid is obtained, and also data of a right-eye image on which a subtitle (caption) and graphics for right-eye display are overlaid is obtained. These pieces of image data are transmitted to a processing unit for stereo image display, and stereo image display is performed. Also, in the channel mixing unit 244, audio data of each channel for realizing, for example, 5.1 channel surround or the like, is generated from audio data. The audio data is supplied to, for example, a speaker, and audio output is performed in accordance with stereo image display.

Although a detailed description is omitted, the other part of the television receiver 300A illustrated in FIG. 76 is configured similarly to the set top box 200 in FIG. 45, and operates similarly.

Also, in the above-described embodiment, the set top box 200 and the television receiver 300 are connected to each other via an HDMI digital interface. However, even in a case where they are connected to each other via a digital interface similar to the HDMI digital interface (including wireless as well as wired), the present technology is of course applicable in the same manner.

Also, in the above-described embodiment, a method for using an HDMI Vendor Specific InfoFrame has been described as a method for transmitting disparity information from the set top box 200 to the television receiver 300. Alternatively, a method for using an active space may be used, and furthermore, transmission may be performed through a bidirectional communication path constituted by the HPD line 86 (HEAC− line) and the utility line 88 (HEAC+ line).

Also, in the above-described embodiment, an example in which disparity information is transmitted from the set top box 200 to the television receiver 300 via an HDMI interface has been described. However, the technology of transmitting disparity information via an HDMI interface in this way is of course applicable to a combination of another type of source apparatus and another type of sink apparatus. For example, a disc player for a BD, a DVD, or the like, and a game machine may be used as a source apparatus, and a monitor apparatus, a projector apparatus, or the like may be used as a sink apparatus.

Also, in the above-described embodiment, an example in which a container is a transport stream (MPEG-2 TS) has been described. However, the present technology is also applicable to a system having a configuration in which distribution to a receiving terminal is performed using a network, such as the Internet. In distribution on the Internet, a container of MP4 or another format may be used for distribution in many cases.

That is, as a container, containers of various formats, such as a transport stream (MPEG-2 TS) adopted in digital broadcast standards, and MP4 used for distribution on the Internet, may be used. Also, application in which a method for supplying a single service is divided into a plurality of methods, and the individual methods are performed in different transmission forms, that is, a case where one of views is transmitted by radio waves and the other view is transmitted on the Internet, may be employed.

In addition, the present technology may also provide the following configurations.

(1) A transmitting apparatus including:
an image data obtaining unit that obtains left-eye image data and right-eye image data which form a stereo image;
a disparity information obtaining unit that obtains, for each of certain pictures of the obtained image data, disparity information about one of a left-eye image and a right-eye image with respect to the other, the disparity information including first disparity information corresponding to the nearest object reproduction position in a certain area of a picture display screen, and second disparity information corresponding to the farthest object reproduction position in the certain area of the picture display screen;
a disparity information inserting unit that inserts the obtained disparity information into a video stream which is obtained by encoding the obtained image data; and
an image data transmitting unit that transmits a container of a certain format, the container including the video stream into which the disparity information has been inserted.

(2) The transmitting apparatus according to (1), wherein the disparity information inserting unit inserts the first disparity information and the second disparity information in units of pictures or in units of GOPs.

(3) The transmitting apparatus according to (1) or (2), wherein the disparity information inserting unit inserts the obtained disparity information into the video stream after performing a compression encoding process.

(4) The transmitting apparatus according to any of (1) to (3), wherein the disparity information inserting unit further inserts, when inserting the disparity information into a certain picture in the video steam, identification information identifying whether the disparity information is disparity information about the entire picture display screen or disparity information about each of a certain number of partitioned areas.

(5) The transmitting apparatus according to any of (1) to (4), wherein the disparity information obtaining unit obtains the first disparity information about each of partitioned areas that are obtained by partitioning the picture display screen using partition information, and also obtains the second disparity information about the entire picture display screen.

(6) The transmitting apparatus according to any of (1) to (4), wherein the disparity information obtaining unit obtains the first disparity information and the second disparity information about each of partitioned areas that are obtained by partitioning the picture display screen using partition information.

(7) The transmitting apparatus according to any of (1) to (4), wherein the disparity information obtaining unit obtains the first disparity information about each of partitioned areas that are obtained by partitioning the picture display screen using first partition information, and also obtains the second disparity information about each of partitioned areas that are obtained by partitioning the picture display screen using second partition information.

(8) A transmitting method including:
a step of obtaining left-eye image data and right-eye image data which form a stereo image;
a step of obtaining, for each of certain pictures of the obtained image data, disparity information about one of a left-eye image and a right-eye image with respect to the other, the disparity information including first disparity information corresponding to the nearest object reproduction position in a certain area of a picture display screen, and second disparity information corresponding to the farthest object reproduction position in the certain area of the picture display screen;
a step of inserting the obtained disparity information into a video stream which is obtained by encoding the obtained image data; and
a step of transmitting a container of a certain format, the container including the video stream into which the disparity information has been inserted.

(9) A receiving apparatus including:
an image data receiving unit that receives a container of a certain format, the container including a video stream,
wherein the video stream is obtained by encoding left-eye image data and right-eye image data which form a stereo image, and
wherein the video stream includes inserted thereinto, for each of certain pictures of the image data, disparity information about one of a left-eye image and a right-eye image with respect to the other, the disparity information including first disparity information corresponding to the nearest object reproduction position in a certain area of a picture display screen, and second disparity information corresponding to the farthest object reproduction position in the certain area of the picture display screen,
the receiving apparatus further including:
an information obtaining unit that obtains the left-eye image data and the right-eye image data and also obtains the first disparity information and the second disparity information from the video stream included in the container; and
a control unit that provides an instruction to reconfigure the left-eye image data and the right-eye image data so that a disparity angle is within a certain range, on the basis of the obtained first disparity information and second disparity information.

(10) A transmitting apparatus including:
an image data obtaining unit that obtains left-eye image data and right-eye image data which form a stereo image;
a disparity information obtaining unit that obtains, for each of certain pictures of the obtained image data, disparity information about one of a left-eye image and a right-eye image with respect to the other;
a compression encoding unit that performs a compression encoding process on the obtained disparity information;
a disparity information inserting unit that inserts the compression-encoded disparity information into a video stream which is obtained by encoding the obtained image data; and
an image data transmitting unit that transmits a container of a certain format, the container including the video stream into which the disparity information has been inserted.

(11) The transmitting apparatus according to (10), wherein the compression encoding unit performs, as the compression encoding process, a process using a variable-length code on the obtained disparity information about the individual pictures.

(12) The transmitting apparatus according to (11), wherein the compression encoding unit performs, as the compression encoding process, a process of obtaining difference data between a reference picture and a referenced picture among the obtained individual pictures, and performing variable-length encoding on the difference data.

(13) The transmitting apparatus according to (12), wherein the compression encoding unit obtains difference data by regarding a preceding picture in display order as a referenced picture.

(14) The transmitting apparatus according to (12), wherein the compression encoding unit obtains difference data by regarding a preceding picture in decoding order as a referenced picture.

(15) The transmitting apparatus according to any of (12) to (14), wherein the disparity information inserting unit further inserts, when inserting the disparity information into a certain picture in the video stream, identification information identifying whether the inserted disparity information is intra data or difference data.

(16) The transmitting apparatus according to (14), wherein the disparity information inserting unit
inserts the disparity information for an I picture, a P picture, and a referenced B picture in the video stream, and
in a case where the inserted disparity information is difference data, further inserts information representing the number of pictures up to a referenced picture.

(17) A transmitting method including:
a step of obtaining left-eye image data and right-eye image data which form a stereo image;
a step of obtaining, for each of certain pictures of the obtained image data, disparity information about one of a left-eye image and a right-eye image with respect to the other;
a step of performing a compression encoding process on the obtained disparity information;
a step of inserting the compression-encoded disparity information into a video stream which is obtained by encoding the obtained image data; and
a step of transmitting a container of a certain format, the container including the video stream into which the disparity information has been inserted.

(18) A receiving apparatus including:
an image data receiving unit that receives a container of a certain format, the container including a video stream,
wherein the video stream is obtained by encoding left-eye image data and right-eye image data which form a stereo image, and
wherein the video stream includes inserted thereinto, for each of certain pictures of the image data, disparity information about one of a left-eye image and a right-eye image with respect to the other, the receiving apparatus further including:

an information obtaining unit that obtains the left-eye image data and the right-eye image data and also obtains the disparity information from the video stream included in the container; and a disparity information interpolating unit that generates disparity information about a picture for which the disparity information obtained by the information obtaining unit does not exist, by performing interpolation using the obtained disparity information about a preceding picture and a subsequent picture.

(19) A receiving apparatus including:

an image data receiving unit that receives a container of a certain format, the container including a video stream, wherein the video stream is obtained by encoding left-eye image data and right-eye image data which form a stereo image, and wherein the video stream includes inserted thereinto, for each of certain pictures of the image data, disparity information about one of a left-eye image and a right-eye image with respect to the other, the disparity information including first disparity information corresponding to the nearest object reproduction position in a certain area of a picture display screen, and second disparity information corresponding to the farthest object reproduction position in the certain area of the picture display screen, the receiving apparatus further including:

an information obtaining unit that obtains the left-eye image data and the right-eye image data and also obtains the first disparity information and the second disparity information from the video stream included in the container; and a transmitting unit that transmits, to an external apparatus, the obtained left-eye image data and right-eye image data and the obtained first disparity information and second disparity information in association with each other.

(20) The receiving apparatus according to (19), further including:

an information reconfiguration unit that reconfigures image data and disparity information so that a disparity angle is within a certain range, on the basis of the obtained first disparity information and second disparity information, wherein the transmitting unit transmits, to the external apparatus, the reconfigured left-eye image data and right-eye image data and the reconfigured first disparity information and second disparity information in association with each other.

(21) The receiving apparatus according to (1) or (20), wherein the transmitting unit transmits, in units of two pictures, disparity information about a first picture and a second picture which are sequentially adjacent to each other, and wherein at least the disparity information about the first picture or the second picture is difference data with respect to disparity information about an immediately preceding picture.

(22) The receiving apparatus according to (21), further including:

a determining unit that determines, on the basis of difference data between the disparity information about the first picture and the disparity information about the second picture, which of the disparity information about the first picture and the disparity information about the second picture is to be difference data.

(23) The receiving apparatus according to (22), wherein the disparity information transmitted by the transmitting unit includes, added thereto, identification information indicating whether the disparity information about the first picture is difference data and whether the disparity information about the second picture is difference data.

Main features of the present technology are as follows. A maximum value (second disparity information) and a minimum value (first disparity information) of disparity information obtained for each picture are inserted into a video stream and the video stream is transmitted, so that whether or not a disparity angle is within a certain range in which viewing does not cause any health problems can be checked on a receiving side (see FIG. 8 and FIG. 15). Also, in the case of inserting disparity information obtained for each picture into a video stream and transmitting the video stream, a process of compression encoding is performed on the disparity information, so as to reduce the amount of data (see FIG. 24). Also, in the case of transmitting pieces of disparity information for two sequential pictures in units of two pictures to an external apparatus using HDMI, disparity information for one of the pictures is difference data with respect to the immediately preceding picture, so that the amount of transmission data is reduced (see FIG. 69).

REFERENCE SIGNS LIST 10, 10A image transmitting/receiving system
100 broadcast station
110, 110A transmission data generating unit
111L, 111R image data output unit
112L, 112R scaler
113 video encoder
114 multiplexer
115 disparity data generating unit
116 subtitle data output unit
117 subtitle encoder
118 audio data output unit
119 audio encoder
120 compression encoding unit
121 buffer
122 subtracter
123 variable-length encoding unit
200 set top box
211 container buffer
212 demultiplexer
213 coded buffer
214 video decoder
215 decoded buffer
216 scaler
217 overlay unit
218 disparity information buffer
219 set top box (STB) graphics buffer
219A television (TV) graphics buffer
220 depth control unit
221 graphics buffer
231 coded buffer
232 subtitle decoder
233 pixel buffer
234 subtitle disparity information buffer
235 subtitle display control unit
241 coded buffer
242 audio decoder
243 audio buffer
244 channel mixing unit
251 HDMI transmitting unit
261 compression decoding unit
262 disparity information control unit
263 L/R reconfiguration unit
264 variable-length decoding unit
265 buffer 266 adder
271 maximum value obtaining unit
272 minimum value obtaining unit
273 disparity angle checking unit
274 disparity information correcting unit
281 frame memory
282 subtracter
283 order determining unit
300, 300A television receiver
311 HDMI receiving unit
312 scaler
313 overlay unit
314 depth control unit
315 graphics buffer
316 television (TV) graphics generating unit
317 audio processing unit
400 HDMI cable

The invention claimed is:

1. A transmitting apparatus comprising:
an image data obtaining unit that obtains left-eye image data and right-eye image data which form a stereo image;
a disparity information obtaining unit that obtains, for each of certain pictures of the obtained image data, disparity information about one of a left-eye image and a right-eye image with respect to the other, the disparity information including first disparity information corresponding to a nearest object reproduction position in a picture display screen, and second disparity information corresponding to the farthest object reproduction position in the picture display screen;
a disparity information inserting unit that inserts the obtained disparity information into a video stream which is obtained by encoding the obtained image data; and
an image data transmitting unit that transmits a container of a certain format, the container including the video stream into which the disparity information has been inserted,
wherein the disparity information obtaining unit (i) obtains the first disparity information by partitioning the picture display screen into a plurality of partitioned areas using partition information, obtaining a first disparity value about each of the partitioned areas so as to have a plurality of first disparity values which is equal in number to a number of the partitioned areas, and selecting from the plurality of first disparity values a respective first disparity value having a minimum value as the first disparity information, and (ii) obtains a single second disparity value about the picture display screen in its entirety as the second disparity information without obtaining any second disparity values for the partitioned areas, and
wherein the disparity information comprises a plurality of block-based disparity vectors and a plurality of group-based disparity vectors, the block-based disparity vectors including disparity vectors for respective blocks of pixels, and the group-based disparity vectors including disparity vectors for respective groups of the blocks, the groups of blocks being formed by grouping blocks according to display positions of the blocks.

2. The transmitting apparatus according to claim 1, wherein the disparity information inserting unit inserts the first disparity information and the second disparity information in units of pictures or in units of GOPs.

3. The transmitting apparatus according to claim 1, wherein the disparity information inserting unit inserts the obtained disparity information into the video stream after performing a compression encoding process.

4. The transmitting apparatus according to claim 1, wherein the disparity information inserting unit further inserts, when inserting the disparity information into a certain picture in the video steam, identification information identifying whether the disparity information is disparity information about the entire picture display screen or disparity information about each of the partitioned areas.

5. A transmitting apparatus comprising:
an image data obtaining unit that obtains left-eye image data and right-eye image data which form a stereo image;
a disparity information obtaining unit that obtains, for each of certain pictures of the obtained image data, disparity information about one of a left-eye image and a right-eye image with respect to the other, the disparity information including first disparity information corresponding to a nearest object reproduction position in a picture display screen, and second disparity information corresponding to the farthest object reproduction position in the picture display screen;
a disparity information inserting unit that inserts the obtained disparity information into a video stream which is obtained by encoding the obtained image data; and
an image data transmitting unit that transmits a container of a certain format, the container including the video stream into which the disparity information has been inserted,
wherein the disparity information obtaining unit obtains the first disparity information about each of first partitioned areas that are obtained by partitioning the picture display screen using first partition information, and obtains the second disparity information about each of second partitioned areas that are obtained by partitioning the picture display screen using second partition information, said first partition information being different from the second partition information such that the first partitioned areas are different from the second partitioned areas, and
wherein the disparity information comprises a plurality of block-based disparity vectors and a plurality of group-based disparity vectors, the block-based disparity vectors including disparity vectors for respective blocks of pixels, and the group-based disparity vectors including disparity vectors for respective groups of the blocks, the groups of blocks being formed by grouping blocks according to display positions of the blocks.

6. A transmitting method comprising:
a step of obtaining left-eye image data and right-eye image data which form a stereo image;
a step of obtaining, for each of certain pictures of the obtained image data, disparity information about one of a left-eye image and a right-eye image with respect to the other, the disparity information including first disparity information corresponding to the nearest object reproduction position in a certain area of a picture display screen, and second disparity information corresponding to the farthest object reproduction position in the certain area of the picture display screen;
a step of inserting the obtained disparity information into a video stream which is obtained by encoding the obtained image data; and a step of transmitting a container of a certain format, the container including the video stream into which the disparity information has been inserted, wherein step of obtaining the disparity information includes (i) obtaining the first disparity information by partitioning the picture display screen into a plurality of partitioned areas using partition information, obtaining a first disparity value about each of the partitioned areas so as to have a plurality of first disparity values which is equal in number to a number of the partitioned areas, and selecting from the plurality of first disparity values a respective first disparity value having a minimum value as the first disparity information, and (ii) obtaining a single second disparity value about the picture display screen in its entirety as the second disparity information without obtaining any second disparity values for the partitioned areas, and wherein the disparity information comprises a plurality of block-based disparity vectors and a plurality of group-based disparity vectors, the block-based disparity vectors including disparity vectors for respective blocks of pixels, and the group-based disparity vectors including disparity vectors for respective groups of the blocks, the groups of blocks being formed by grouping blocks according to display positions of the blocks.

7. A transmitting apparatus comprising:

an image data obtaining unit that obtains left-eye image data and right-eye image data which form a stereo image;

a disparity information obtaining unit that obtains, for each of certain pictures of the obtained image data, disparity information about one of a left-eye image and a right-eye image with respect to the other;

a compression encoding unit that performs a compression encoding process on the obtained disparity information;

a disparity information inserting unit that inserts the compression-encoded disparity information into a video stream which is obtained by encoding the obtained image data; and an image data transmitting unit that transmits a container of a certain format, the container including the video stream into which the disparity information has been inserted, wherein the disparity information obtained by the disparity information obtaining unit includes first disparity information corresponding to a nearest object reproduction position in a picture display screen, and second disparity information corresponding to the farthest object reproduction position in the picture display screen, and wherein the disparity information obtaining unit (i) obtains the first disparity information by partitioning the picture display screen into a plurality of partitioned areas using partition information, obtaining a first disparity value about each of the partitioned areas so as to have a plurality of first disparity values which is equal in number to a number of the partitioned areas, and selecting from the plurality of first disparity values a respective first disparity value having a minimum value as the first disparity information, and (ii) obtains a single second disparity value about the picture display screen in its entirety as the second disparity information without obtaining any second disparity values for the partitioned areas, and wherein the disparity information comprises a plurality of block-based disparity vectors and a plurality of group-based disparity vectors, the block-based disparity vectors including disparity vectors for respective blocks of pixels, and the group-based disparity vectors including disparity vectors for respective groups of the blocks, the groups of blocks being formed by grouping blocks according to display positions of the blocks.

8. The transmitting apparatus according to claim 7, wherein the compression encoding unit performs, as the compression encoding process, a process using a variable-length code on the obtained disparity information about the individual pictures.

9. The transmitting apparatus according to claim 8, wherein the compression encoding unit performs, as the compression encoding process, a process of obtaining difference data between a reference picture and a referenced picture among the obtained individual pictures, and performing variable-length encoding on the difference data.

10. The transmitting apparatus according to claim 9, wherein the compression encoding unit obtains difference data by regarding a preceding picture in display order as a referenced picture.

11. The transmitting apparatus according to claim 9, wherein the compression encoding unit obtains difference data by regarding a preceding picture in decoding order as a referenced picture.

12. The transmitting apparatus according to claim 9, wherein the disparity information inserting unit further inserts, when inserting the disparity information into a certain picture in the video stream, identification information identifying whether the inserted disparity information is intra data or difference data.

13. The transmitting apparatus according to claim 11, wherein the disparity information inserting unit
    inserts the disparity information for an I picture, a P picture, and a referenced B picture in the video stream, and
    in a case where the inserted disparity information is difference data, further inserts information representing the number of pictures up to a referenced picture.

14. A transmitting method comprising:

a step of obtaining left-eye image data and right-eye image data which form a stereo image;

a step of obtaining, for each of certain pictures of the obtained image data, disparity information about one of a left-eye image and a right-eye image with respect to the other;

a step of performing a compression encoding process on the obtained disparity information;

a step of inserting the compression-encoded disparity information into a video stream which is obtained by encoding the obtained image data; and a step of transmitting a container of a certain format, the container including the video stream into which the disparity information has been inserted, wherein the step of obtaining disparity information includes obtaining first disparity information corresponding to a nearest object reproduction position in a picture display screen, and obtaining second disparity information corresponding to the farthest object reproduction position in the picture display screen, and wherein the first disparity information is obtained by partitioning the picture display screen into a plurality of partitioned areas using partition information, obtaining a first disparity value about each of the partitioned areas so as to have a plurality of first disparity values which is equal in number to a number of the partitioned areas, and selecting from the plurality of first disparity values a respective first disparity value having a minimum value as the first disparity information, and wherein a single second disparity value about the picture display screen in its entirety is obtained as the second disparity information without obtaining any second disparity values for the partitioned areas, and wherein the disparity information comprises a plurality of block-based disparity vectors and a plurality of group-based disparity vectors, the block-based disparity vectors including disparity vectors for respective blocks of pixels, and the group-based disparity vectors including disparity vectors for respective groups of the blocks, the groups of blocks being formed by grouping blocks according to display positions of the blocks.

* * * * *